US012624791B2

(12) United States Patent
Chen

(10) Patent No.: US 12,624,791 B2
(45) Date of Patent: May 12, 2026

(54) MULTI-LEGGED STAND

(71) Applicant: Shenzhen Haohualianhe Technology Co., Ltd., Shenzhen (CN)

(72) Inventor: Weihao Chen, Shenzhen (CN)

(73) Assignee: Shenzhen Haohualianhe Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/290,751

(22) Filed: Aug. 5, 2025

(65) Prior Publication Data

US 2026/0036251 A1     Feb. 5, 2026

(30) Foreign Application Priority Data

| | | |
|---|---|---|
| Aug. 5, 2024 | (CN) ......................... | 202411064508.8 |
| Aug. 5, 2024 | (CN) ......................... | 202411066324.5 |
| Sep. 12, 2024 | (CN) ......................... | 202411280256.2 |
| Jul. 11, 2025 | (CN) ......................... | 202510960661.7 |
| Jul. 21, 2025 | (CN) ......................... | 202511006737.9 |

(51) Int. Cl.
*F16M 11/24* (2006.01)
*F16M 11/20* (2006.01)
*G03B 17/56* (2021.01)

(52) U.S. Cl.
CPC ......... *F16M 11/245* (2013.01); *G03B 17/561* (2013.01)

(58) Field of Classification Search
CPC ........................... G03B 17/561; G03B 17/563
See application file for complete search history.

(56) References Cited

U.S. PATENT DOCUMENTS

| | | | | |
|---|---|---|---|---|
| 2,646,956 A * | 7/1953 | Cadwell | ............... | F16M 11/245 403/104 |
| 2,750,141 A * | 6/1956 | Tobias | ................. | F16M 11/245 248/414 |
| 3,618,885 A * | 11/1971 | Muller | ..................... | G10G 5/00 248/188.7 |
| 3,632,073 A * | 1/1972 | Nakatani | .............. | F16M 11/242 248/169 |
| 3,722,847 A * | 3/1973 | O'Connor | ............ | F16M 11/245 248/407 |
| 5,222,705 A * | 6/1993 | Gibran | ................. | F16M 11/046 403/328 |
| 8,939,602 B2 * | 1/2015 | Wessel | .................... | F21L 4/045 362/208 |
| 9,651,196 B1 * | 5/2017 | Mao | .......................... | A45F 5/10 |
| 9,907,194 B2 * | 2/2018 | Chen | ...................... | F16M 11/22 |
| 10,302,244 B2 * | 5/2019 | Lu | ......................... | F16M 11/247 |
| 11,149,901 B2 * | 10/2021 | Grabner | .................... | F16H 1/16 |

(Continued)

FOREIGN PATENT DOCUMENTS

CN          115479197 A     12/2022

*Primary Examiner* — Nkeisha Smith
(74) *Attorney, Agent, or Firm* — Cooper Legal Group, LLC

(57) ABSTRACT

A multi-legged stand, including: a support rod assembly, a sliding sleeve assembly, a connecting assembly, at least three support leg assemblies, and a preliminary opening assembly. The preliminary opening assembly is configured to, in response to a force-bearing portion being subjected to an external action, overcome the folding force and push open the at least three support leg assemblies, causing the at least three support leg assemblies to transition from the folded state to a preliminarily opened state relative to the support rod assembly.

24 Claims, 31 Drawing Sheets

(56)                    References Cited

U.S. PATENT DOCUMENTS

| | | | |
|---|---|---|---|
| 11,402,059 B2 * | 8/2022 | Yeomans | F16M 11/38 |
| 11,595,506 B2 * | 2/2023 | Kameli | H04M 1/11 |
| 11,606,946 B1 * | 3/2023 | Kowalski | A01K 97/10 |
| 11,835,208 B1 * | 12/2023 | Chen | F16M 11/245 |
| 11,971,134 B2 * | 4/2024 | Xia | F16M 11/36 |
| 12,104,742 B1 * | 10/2024 | Hu | H04N 23/66 |
| 12,158,234 B2 * | 12/2024 | Wang | F16M 11/205 |
| 2006/0202098 A1 * | 9/2006 | Hsieh | F16M 11/242 |
| | | | 248/404 |
| 2007/0012160 A1 * | 1/2007 | Sato | F16M 11/10 |
| | | | 84/421 |
| 2014/0151527 A1 * | 6/2014 | Sawhney | F16M 11/247 |
| | | | 248/125.1 |
| 2015/0076295 A1 * | 3/2015 | Fiorese | F16M 11/28 |
| | | | 248/161 |
| 2016/0230922 A1 * | 8/2016 | Caroom | F16B 1/00 |
| 2021/0123302 A1 * | 4/2021 | Caldwell | F16M 11/245 |
| 2023/0176454 A1 * | 6/2023 | Wang | F16M 11/06 |
| | | | 396/428 |
| 2025/0237934 A1 * | 7/2025 | Wang | G03B 17/561 |

* cited by examiner

MULTI-LEGGED STAND

CROSS-REFERENCE TO RELATED APPLICATIONS

The present application claims the priority and benefits of Chinese patent application No. 202510960661.7, filed on Jul. 11, 2025, Chinese patent application No. 202411280256.2, filed on Sep. 12, 2024, Chinese patent application No. 202411064508.8, filed on Aug. 5, 2024, Chinese patent application No. 202411066324.5, filed on Aug. 5, 2024, and Chinese patent application No. 202511006737.9, filed on Jul. 21, 2025. The entire contents of Chinese patent application No. 202510960661.7, Chinese patent application No. 202411280256.2, Chinese patent application No. 202411064508.8, Chinese patent application No. 202411066324.5, and Chinese patent application No. 202511006737.9 are hereby incorporated by reference in their entireties.

TECHNICAL FIELD

The present disclosure relates to the technical field of auxiliary equipment for electronic terminals and other devices, and more specifically to a multi-legged stand.

BACKGROUND

With the proliferation of mobile imaging technologies such as short video recording, live streaming, and time-lapse photography, multi-legged stands like tripods and quadpods have become essential tools for achieving stable captures. Categorized by imaging equipment type, these stands include models tailored for mobile phones, cameras, and other devices.

Contemporary multi-legged stands typically include a support rod assembly, at least three support leg assemblies, etc. Currently, the folding of the support leg assemblies on most stands relies predominantly on snap-fit mechanisms. This design forces users to operate with both hands: one hand must grip structural components like the support rod assembly, while the other manually unfolds each support leg assembly for splaying the support leg assemblies. Consequently, the deployment of the support leg assemblies proves notably inconvenient.

The above content serves solely to facilitate understanding of the technical solution of the present disclosure and does not constitute acknowledgment of said content as prior art.

SUMMARY OF THE DISCLOSURE

The present disclosure provides a multi-legged stand, including: a support rod assembly, a sliding sleeve assembly, a connecting assembly, and at least three support leg assemblies; wherein the support rod assembly extends along a length direction, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;

in a case where the at least three support leg assemblies are in a folded state relative to the support rod assembly, the at least three support leg assemblies are subjected to a folding force to keep folded relative to the support rod assembly;

wherein the multi-legged stand further includes a preliminary opening assembly movably connected to the support rod assembly; the preliminary opening assembly is configured to, in response to being subjected to an external action, overcome the folding force and push open the at least three support leg assemblies, causing the at least three support leg assemblies to transition from the folded state to a preliminarily opened state relative to the support rod assembly.

BRIEF DESCRIPTION OF THE DRAWINGS

To more clearly illustrate the technical solutions of the embodiments of the present disclosure, the following is a brief introduction to the drawings used in the embodiments. It is obvious that the following drawings only illustrate certain embodiments of the present disclosure and should not be regarded as limiting the scope thereof. For those skilled in the art, other related drawings can be obtained based on these drawings without creative labor.

Figure 1:
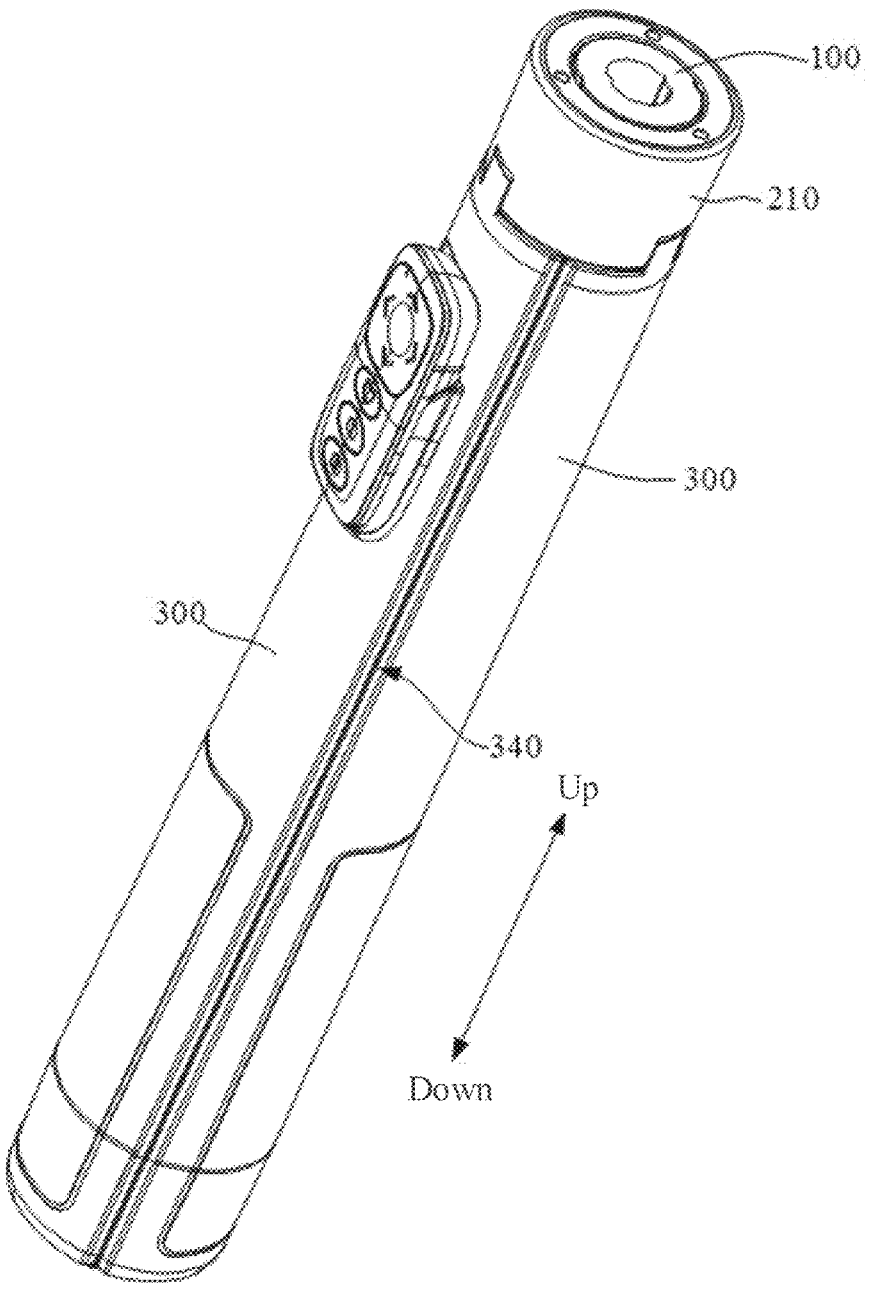
FIG. 1 is a structural schematic view of a multi-legged stand according to some embodiments of the present disclosure; where at least three support leg assemblies of the multi-legged stand are in a folded state.
Figure 2:
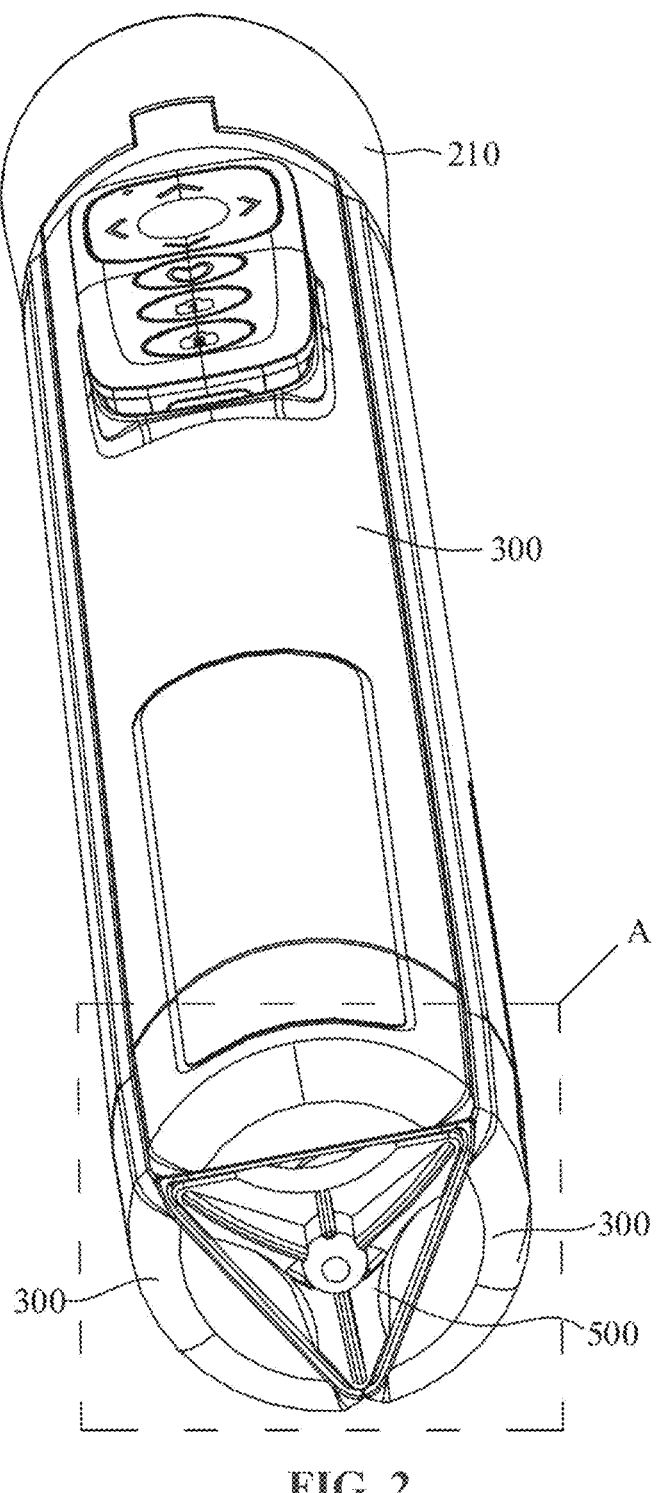
FIG. 2 is another structural schematic view of the multi-legged stand shown in FIG. 1 at another viewing angle.
Figure 3:
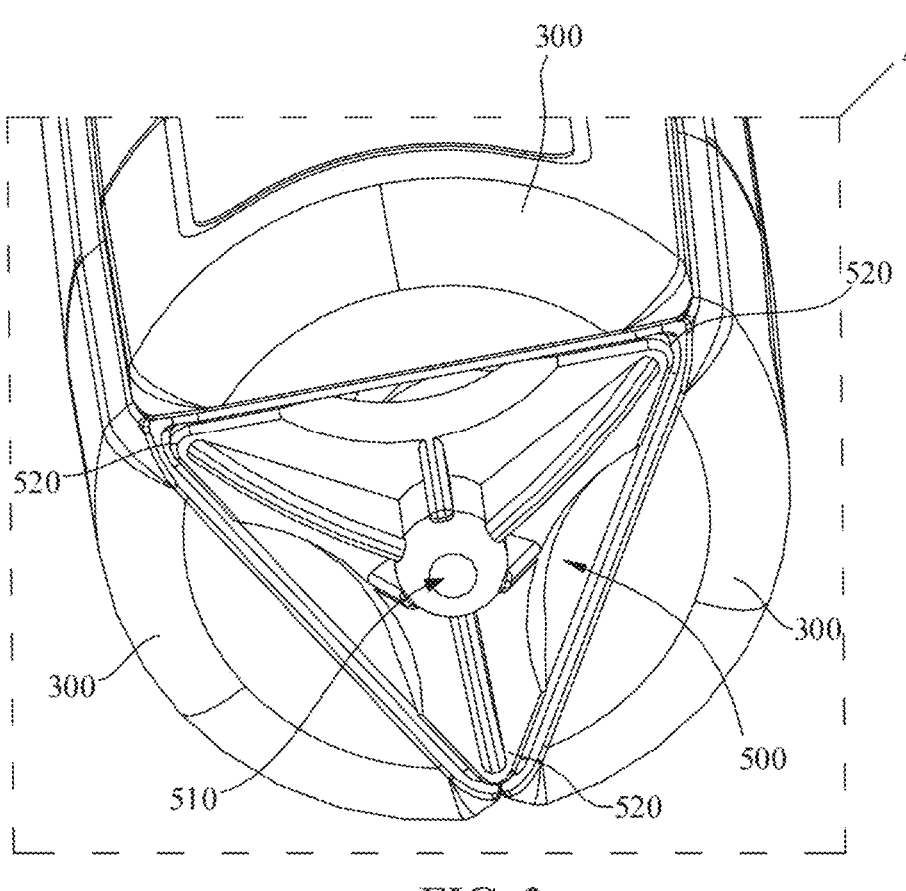
FIG. 3 is an enlarged view of the structure at position A in the multi-legged stand shown in FIG. 2.
Figure 4:
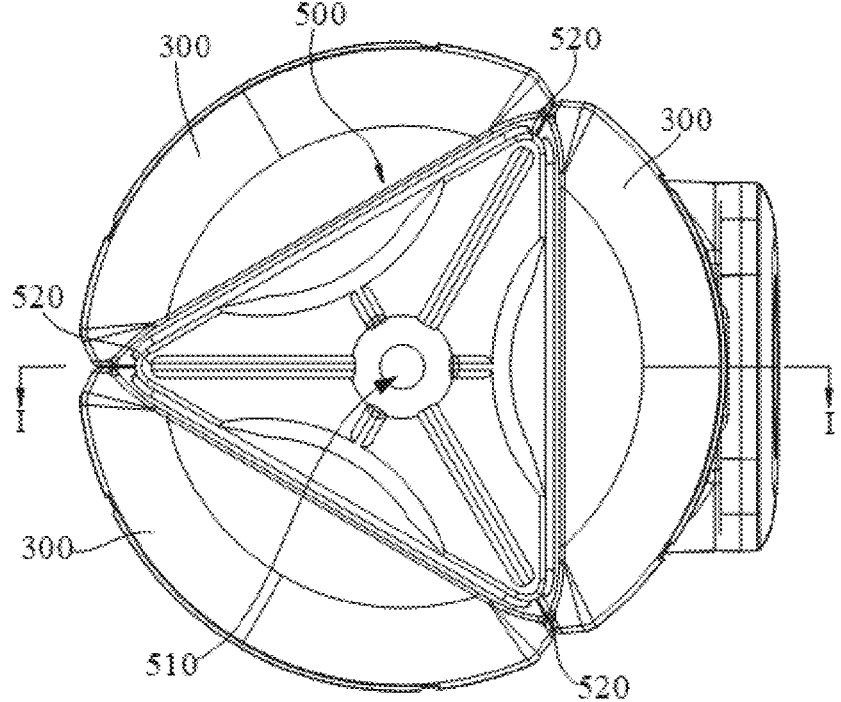
FIG. 4 is a bottom view of the multi-legged stand shown in FIG. 1.

The objectives, functional features, and advantages of the present disclosure will be further explained with reference to the accompanying drawings and in conjunction with the embodiments.

DETAILED DESCRIPTION

The following description will refer to the accompanying drawings of the embodiments of the present disclosure to provide a clear and complete description of the technical solutions of the embodiments of the present disclosure. It should be noted that the embodiments described herein are merely some embodiments of the present disclosure and not all embodiments. All other embodiments obtained by those skilled in the art without creative labor based on the embodiments of the present disclosure are within the scope of the present disclosure.

In the description of this specification, the terms "an embodiment", "some embodiments", "an example", "specific example", or "some examples" refer to the specific features, structures, materials, or characteristics described in connection with the embodiment or example, which are included in at least one embodiment or example of the present disclosure. In this specification, the illustrative use of the above terms is not necessarily directed to the same embodiment or example. Furthermore, the specific features, structures, materials, or characteristics described may be combined in any one or more embodiments or examples in an appropriate manner.

Furthermore, the technical solutions of different embodiments may be combined with each other, but such combination must be based on the ability of a person skilled in the art to implement them. If the combination of technical solutions results in contradictions or impossibility of implementation, such combination shall be deemed not to exist and shall not be included within the scope claimed by the present disclosure.

It should be noted that when any directional indications (such as up, down, left, right, front, back, etc.) are used in the embodiments of the present disclosure, such directional indications are only intended to explain the relative positions and movements of components in a specific orientation. When the specific orientation changes, the directional indications should also be adjusted accordingly.

In the embodiments of the present disclosure, unless otherwise explicitly specified and limited, the first feature being "on" or "under" the second feature may mean that a first feature and a second feature are in direct contact, or that the first and second features are in indirect contact through an intermediate medium. Furthermore, the first feature being "above", "on top of", or "on a top surface of" the second feature may mean that the first feature is directly above or diagonally above the second feature, or may simply indicate that the horizontal height of the first feature is higher than that of the second feature. The first feature being "below", "under", or "on a bottom surface of" the second feature may mean that the first feature is directly below or diagonally below the second feature, or simply indicates that the horizontal height of the first feature is less than that of the second feature.

In the embodiments of the present disclosure, unless otherwise explicitly specified and limited, terms such as "mounted", "connected", "coupled", and "fixed" should be interpreted broadly, for example, they may be fixed connections, removable connections, or integral structures; they may be mechanical connections, electrical connections, or connections that are capable of communicating with each other; they may be directly connected or indirectly connected through an intermediate medium, or they may represent an internal communication between two components or an interactive relationship between two components, unless otherwise explicitly limited. For those skilled in the art, the specific meaning of the above terms in the context of the present disclosure may be understood based on the specific circumstances.

Additionally, when the embodiments of the present disclosure include descriptions such as "first", "second", etc., such descriptions are solely for descriptive purposes and should not be interpreted as indicating or implying relative importance or the number of technical features indicated. Accordingly, features defined as "first", "second", etc., may explicitly or implicitly include at least one such feature. Furthermore, the term "and/or" throughout the document means that it includes three parallel options. For example, "A and/or B" includes option A, or option B, or both A and B.

The multi-legged stand proposed in the present disclosure may be applied to electronic terminals, photography devices, observation devices, measurement devices, etc. For example, the multi-legged stand may be configured to support and stabilize mobile phones, cameras, video cameras, telescopes, surveying instruments, and other devices that require stable support. When splayed, the multi-legged stand forms a stable geometric structure with the ground, providing a stable support platform for the aforementioned devices to meet precise operational requirements in various scenarios.

In view of the above issues, the present disclosure proposes a multi-legged stand designed to solve the technical problem of inconvenient splaying operation of the support leg assembly in existing multi-legged stands.

To solve the above technical problem, the present disclosure provides a multi-legged stand, including: a support rod assembly, a sliding sleeve assembly, a connecting assembly, and at least three support leg assemblies; wherein the support rod assembly extends along a length direction, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;

in a case where the at least three support leg assemblies are in a folded state relative to the support rod assembly, the at least three support leg assemblies are subjected to a folding force to keep folded relative to the support rod assembly;

wherein the multi-legged stand further includes a preliminary opening assembly movably connected to the support rod assembly; the preliminary opening assembly is configured to, in response to being subjected to an external action, overcome the folding force and push open the at least three support leg assemblies, causing the at least three support leg assemblies to transition from the folded state to a preliminarily opened state relative to the support rod assembly.

The advantage of this technical solution lies in the fact that the multi-legged stand is arranged with a preliminary opening assembly, which can convert an external action it receives into a force that pushes open at least three support leg assemblies, thereby achieving the preliminary opening of at least three support leg assemblies and facilitating their subsequent splaying.

In some embodiments, in a case where the at least three support leg assemblies are in the preliminarily opened state relative to the support rod assembly, a self-weight of a movable component promotes sliding of the sliding sleeve assembly, promoting the at least three support leg assemblies to splay relative to the support rod assembly; the movable component includes the sliding sleeve assembly, the at least three support leg assemblies, and the connecting assembly;

the sliding sleeve assembly includes a handheld portion configured for a top end of the support rod assembly to extend from the handheld portion, and the at least three support leg assemblies are rotatably connected to the handheld portion;

in a case where the handheld portion is manually lifted, the at least three support leg assemblies perform folding relative to the support rod assembly and are folded relative to the support rod assembly by the folding force.

The advantage of this technical solution lies in the fact that the multi-legged stand is arranged with a preliminary opening assembly, which can convert an external action that the force-bearing portion receives into a force that pushes open at least three support leg assemblies, thereby achieving the preliminary opening of at least three support leg assemblies and facilitating their subsequent splaying.

The present disclosure further provides a multi-legged stand, including: a support rod assembly, a sliding sleeve assembly, a connecting assembly, and at least three support leg assemblies; wherein the support rod assembly extends along a length direction, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;

in a case where the at least three support leg assemblies are in a folded state relative to the support rod assembly, the at least three support leg assemblies are subjected to a folding force to keep folded relative to the support rod assembly;

the sliding sleeve assembly includes a handheld portion configured for a top end of the support rod assembly to extend from the handheld portion, and the at least three support leg assemblies are rotatably connected to the handheld portion;

wherein the multi-legged stand further includes a preliminary opening assembly movably connected to the support rod assembly; the preliminary opening assembly includes a force-bearing portion;

the preliminary opening assembly is configured to, in response to the force-bearing portion being subjected to an external action, overcome the folding force and push open the at least three support leg assemblies, causing the at least three support leg assemblies to transition from the folded state to a preliminarily opened state relative to the support rod assembly;

in a case where the at least three support leg assemblies are in the preliminarily opened state relative to the support rod assembly, a self-weight of a movable component promotes sliding of the sliding sleeve assembly, promoting the at least three support leg assemblies to splay relative to the support rod assembly; the movable component includes the sliding sleeve assembly, the at least three support leg assemblies, and the connecting assembly;

in a case where the handheld portion is manually lifted, the at least three support leg assemblies perform folding relative to the support rod assembly and are folded relative to the support rod assembly by the folding force.

The advantage of this technical solution lies in the fact that the multi-legged stand is arranged with a preliminary opening assembly and arranged with a handheld portion on the sliding sleeve assembly, where the preliminary opening assembly includes a force-bearing portion protruding from the bottom ends of the support leg assemblies. The preliminary opening assembly can convert an external action that the force-bearing portion receives into a force that pushes open at least three support leg assemblies, thereby achieving the preliminary opening of at least three support leg assemblies and facilitating their subsequent splaying.

Additionally, after the support leg assemblies are preliminarily opened, the at least three support leg assemblies can be automatically splayed by gravity. When it is necessary to collapse the multi-legged stand, the user only needs to hold the handheld portion with one hand and lift it upward, and the at least three support leg assemblies will automatically fold under the combined effects of gravity and inertia, and remain folded against the support rod assembly by the folding force. That is, after the support leg assemblies are preliminarily opened, the user can splay or fold the multi-leg stand with one hand, greatly simplifying the splaying or folding steps of the multi-legged stand, reducing the difficulty of splaying or folding the multi-leg stand, and thus greatly improving the ease of splaying the multi-legged stand. Additionally, in certain situations, when the multi-legged stand is in the folded state, the user can hold the handheld portion with one hand and apply external action to the force-bearing portion through impact or other means, causing the support leg assemblies to preliminarily open. This allows the support leg assemblies to be preliminarily opened using a single-handed operation.

In the embodiments of the present disclosure, referring to FIGS. 1-6, 12-17, 25-28, 41, etc., the multi-legged stand includes a support rod assembly 100, a sliding sleeve assembly 200, a connecting assembly 400, and at least three support leg assemblies 300. The support rod assembly 100 extends along a length direction, and the sliding sleeve assembly 200 is slidably sleeved on a periphery of the support rod assembly 100 along the length direction of the support rod assembly 100. The at least three support leg assemblies 300 are rotatably connected to the sliding sleeve assembly 200, and the connecting assembly 400 is rotatably connected to the at least three support leg assemblies 300 and the support rod assembly 100. The connecting assembly 400 is configured to splay or fold the at least three support leg assemblies 300 in conjunction with the sliding sleeve assembly 200 sliding relative to the support rod assembly 100.

The number of the at least three support leg assemblies 300 may be selected and designed according to actual requirements. For example, the support leg assemblies 300 may be configured as three, four, five, etc., to form a three-legged stand, four-legged stand, five-legged stand, etc., provided that the number of the support leg assemblies 300 is greater than three. The specific number of the support leg assemblies 300 is not further limited herein. To reduce costs and improve aesthetics, the shapes and dimensions of the at least three support leg assemblies 300 are substantially similar.

For example, when the at least three support leg assemblies 300 are in a folded state relative to the support rod assembly 100, the at least three support leg assemblies 300 can be held by a user. For instance, when the support rod assembly 100 supports an electronic terminal, the user can hold the at least three support leg assemblies to take a selfie. In some cases, when the at least three support leg assemblies 300 are in a folded state relative to the support rod assembly 100, the connecting assembly 400 is folded relative to the support rod assembly 100, with the connecting assembly 400 disposed between the support rod assembly 100 and the corresponding support leg assembly 300.

When the multi-legged stand is applied to a smartphone, it may be configured as a remote-controlled selfie stick structure. For example, a mounting slot for a Bluetooth remote controller may be defined on one of the support leg assemblies 300. The Bluetooth remote controller may be fixedly or removably arranged in the mounting slot. In this way, the user can control the smartphone's camera via the Bluetooth remote controller to expand the usage scenarios of the multi-legged stand.

For example, the sliding sleeve assembly 200, the support rod assembly 100, the support leg assemblies 300, and the connecting assembly 400 form a planar four-bar linkage mechanism. Specifically, the planar four-bar linkage mechanism may be a crank-slider mechanism, a rocker-slider mechanism, etc. During a process where the support leg assemblies 300 transition from the folded state to the splayed state relative to the support rod assembly 100, the sliding sleeve assembly 200 slides relative to the support rod assembly 100; the extent to which the support leg assembly 300 extends relative to the support rod assembly 100 is variable, causing the sliding sleeve assembly 200 to occupy different positions on the support rod assembly 100.

The support rod assembly 100 extends longitudinally, providing positioning and guidance for the sliding of the sliding sleeve assembly 200, thereby enhancing the overall stability of the multi-legged stand. Generally, the cross-section of the support rod assembly 100 is circular to ensure smooth sliding of the sliding sleeve assembly 200. In one example, the support rod assembly 100 is configured as a length-adjustable rod to accommodate different support height requirements of users, thereby enhancing the product's versatility. In some embodiments, the support rod assembly 100 may be configured as a fixed-length rod. For example, the support rod assembly 100 includes multiple length-adjustable segments, with a first segment among them, and the sliding sleeve assembly 200 is slidably sleeved on the first segment.

For example, the support rod assembly 100 has a central axis line "a-a" extending along the length direction, and the sliding sleeve assembly 200 is slidably sleeved on the outer periphery of the support rod assembly 100 along the central axis line a-a.

An inner peripheral wall of the sliding sleeve assembly 200 is spaced apart from an outer peripheral wall of the support rod assembly 100, thereby reducing or eliminating friction between the support rod assembly 100 and the sliding sleeve assembly 200 to enable relative sliding between the sliding sleeve assembly 200 and the support rod assembly 100. In an example, a rolling element is arranged between the inner peripheral wall of the sliding sleeve assembly 200 and the outer peripheral wall of the support rod assembly 100. For example, the rolling element may be structures such as balls or rolling bearings, which may reduce friction while ensuring smooth sliding between the sliding sleeve assembly 200 and the support rod assembly 100. To ensure overall consistency, the cross-section of the sliding sleeve assembly 200 is generally circular.

Specifically, the support leg assembly 300 is pivotally connected to the sliding sleeve assembly 200. For example, a rotatable protrusion 370 may be arranged on a top of each support leg assembly 300, and a rotation notch 230 may be defined on the sliding sleeve assembly 200, such that the rotatable protrusion 370 is pivotally connected to the rotation notch 230 via a shaft or a lug. Of course, the support leg assembly 300 and the sliding sleeve assembly 200 may be rotatably connected by other means, which are not specifically limited herein. For example, the support leg assembly 300 may define a rotation notch 230, and the sliding sleeve assembly 200 may be arranged with a rotatable protrusion 370, etc.

The connecting assembly 400 may include at least three connecting rods or other connecting structures capable of splaying or folding relative to the support rod assembly 100; for example, the connecting assembly 400 may be a non-rod-shaped structure. By providing this tensioning structure, when the sliding sleeve assembly 200 slides along a second direction, the connecting assembly 400 can synchronously splay the at least three support leg assemblies 300. When the at least three support leg assemblies 300 are in the splayed state, the at least three support leg assemblies 300 can stand on a same support surface. The support surface may be the ground, a table surface, etc. When the sliding sleeve assembly 200 slides in an opposite direction of the second direction, the connecting assembly 400 can synchronously fold the at least three support leg assemblies 300. For example, the second direction is along the direction from the top end to the bottom end of the support rod assembly 100.

In some embodiments, refer again to FIGS. 1-6, 12-17, 25-28, 41, etc. When the at least three support leg assemblies 300 are folded relative to the support rod assembly 100, the support leg assemblies 300 are subjected to a folding force that keeps them folded relative to the support rod assembly 100. The multi-legged stand further includes a preliminary opening assembly 500, which is movably connected to the support rod assembly 100; the preliminary opening assembly 500 is configured to, when subjected to an external action, overcome the folding force and push open the at least three support leg assemblies 300, causing the at least three support leg assemblies 300 to transition from the folded state to a preliminarily opened state relative to the support rod assembly 100.

For example, during the transportation of the multi-legged stand, the support leg assemblies 300 remain in a stable folded configuration relative to the support rod assembly 100, and the support leg assemblies 300 cannot spread apart relative to the support rod assembly 100, e.g., the support leg assemblies 300 cannot spread apart relative to the support rod assembly 100 due to their own weight.

In common cases, when the at least three support leg assemblies 300 are in the preliminarily opened state relative to the support rod assembly 100, the at least three support leg assemblies 300 are further opened relative to the support rod assembly 100, causing the at least three support leg assemblies 300 to be splayed relative to the support rod assembly 100, thereby enabling the at least three support leg assemblies 300 to stand on the support surface. In other uncommon cases, the preliminarily opened state of the at least three support leg assemblies 300 relative to the support rod assembly 100 belongs to a state where the at least three support leg assemblies 300 are splayed relative to the support rod assembly 100. That is, in the preliminarily opened state of the at least three support leg assemblies 300 relative to the support rod assembly 100, the at least three support leg assemblies 300 can stand on the support surface.

The type of the folding force acting on the support leg assembly 300 to keep it folded relative to the support rod assembly 100 may be diverse, such as a snap-fitting force, a magnetic attraction force, an adhesive force, or a vacuum suction force. The folding force acting on the support leg assembly 300 may be partially or entirely derived from the connecting assembly 400, the support rod assembly 100, or the sliding sleeve assembly 200. That is, the support leg assembly 300 may be connected to at least one of the connecting assembly 400, the support rod assembly 100, and the sliding sleeve assembly 200 via interlocking (snap-fitting), magnetic attraction, adhesion, or vacuum suction. This allows the support leg assemblies 300 to remain stably folded in the folded state relative to the support rod assembly 100 through the folding force. In this way, during the transportation or placement of the multi-legged stand, the at least three support leg assemblies 300 can be prevented from spreading apart.

In one scenario, during the process where the at least three support leg assemblies 300 are switched from the folded state relative to the support rod assembly 100 to the preliminarily opened state relative to the support rod assembly 100, the folding force acting on the support leg assembly 300 is reduced or eliminated, allowing the support leg assemblies 300 to easily splay relative to the support rod assembly 100, thereby causing the support leg assemblies 300 to assume the splayed state relative to the support rod assembly 100.

In other cases, during the process where the at least three support leg assemblies 300 are switched from the folded state relative to the support rod assembly 100 to the preliminarily opened state relative to the support rod assembly 100, the folding force acting on the support leg assembly 300 remains unchanged. However, when the support leg assemblies 300 are preliminarily opened relative to the support rod assembly 100, the user can still easily use his/her hand or an external tool to further pry open the support leg assemblies 300 relative to the support rod assembly 100, thereby facilitating the splaying of the support leg assemblies 300 relative to the support rod assembly 100.

For better illustration, the present disclosure uses the orientation of the multi-legged stand during actual use as a reference. For example, when the multi-legged stand is placed on the ground for use, the top end is an end farthest from the ground, and the bottom end is an end closest to the ground.

The connection between the preliminary opening assembly 500 and the support rod assembly 100 may be a sliding connection, a screw-pair connection, a rotational connection, a cam-pair connection, etc. The connection between the preliminary opening assembly 500 and the support rod assembly 100 may be such that a first portion of the preliminary opening assembly 500 is slidably connected to the support rod assembly 100, and a second portion of the preliminary opening assembly 500 is rotatably connected to the support rod assembly 100; where the first portion is configured to be acted upon by an external action, while the second portion is configured to push open the at least three support leg assemblies. The two portions of the preliminary opening assembly 500 may be connected via threaded pairs, cam pairs, gear racks, crank-slide mechanisms, or other connection methods that convert a linear motion into a rotational motion. The connection between the preliminary opening assembly 500 and the support rod assembly 100 may be configured such that a first portion of the preliminary opening assembly 500 is rotatably connected to the support rod assembly 100, and a second portion of the preliminary opening assembly 500 is slidably connected to the support rod assembly 100; where the first portion is configured to be acted upon by an external action, while the second portion is configured to push open the at least three support leg assemblies. The two portions of the preliminary opening assembly 500 can convert a rotational motion into a linear motion through a crank-slide mechanism, cam pair, gear-rack, threaded pair, or other similar connection methods.

The motion of the preliminary opening assembly 500 relative to the support rod assembly 100 may be rotation, sliding, or a combination of rotation and sliding. The rotation of the preliminary opening assembly 500 relative to the support rod assembly 100 refers to at least one component motion of the preliminary opening assembly 500 being rotation relative to the support rod assembly 100; the sliding of the preliminary opening assembly 500 relative to the support rod assembly 100 refers to at least one component motion of the preliminary opening assembly 500 being sliding relative to the support rod assembly 100.

In some embodiments, the preliminary opening assembly 500 is connected to the support rod assembly 100 via a cam-pair mechanism. During the movement of the preliminary opening assembly 500 relative to the support rod assembly 100, the preliminary opening assembly 500 both translates relative to the support rod assembly 100 and rotates relative to the support rod assembly 100. Specifically, the support rod assembly 100 includes a connecting protrusion, and the preliminary opening assembly 500 defines a connecting groove (or, the support rod assembly 100 defines a connecting groove, and the preliminary opening assembly 500 includes a connecting protrusion). The connecting protrusion and the connecting groove are engaged, and the connecting protrusion and the connecting groove form a cam pair. The connecting protrusion can slide or roll within the connecting groove, causing the preliminary opening assembly 500 to both translate and rotate relative to the support rod assembly 100. Specifically, the connecting groove and the connecting protrusion form a cylindrical cam mechanism, such as the connecting groove extending along a spiral line. A external action overcomes the resistance (which includes the friction resistance between the connecting protrusion and the connecting groove) acting on the preliminary opening assembly 500, enabling the connecting protrusion to slide or roll along the connecting groove.

Furthermore, during the process where the preliminary opening assembly 500 translates relative to the support rod assembly 100 in a first direction and rotates relative to the support rod assembly 100, the translation of the preliminary opening assembly 500 relative to the support rod assembly 100 in the first direction assists in the preliminary opening of the support leg assemblies 300.

The structure of the preliminary opening assembly 500 may be diverse. It should be noted that in the present disclosure, the preliminary opening assembly 500 is movably connected to the support rod assembly 100. When the preliminary opening assembly 500 is an integral structure, the entire preliminary opening assembly 500 moves relative to the support rod assembly 100 to push open the support leg assembly 300. When the preliminary opening assembly 500 is composed of multiple portions, some portions of the preliminary opening assembly 500 may move relative to the support rod assembly 100 to push open the support leg assembly 300.

It can be understood that the external action includes a force acting along the first direction, which may include a pushing force pushing the preliminary opening assembly 500, or a pulling force pulling the preliminary opening assembly 500 along the sliding direction. Alternatively, the external action includes a torque acting around the rotational axis of the preliminary opening assembly. Specifically, the external action manifests as the user directly applying pressure, pulling force, rotational torque, etc., to the preliminary opening assembly 500; or the external action manifests as the support surface directly applying pressure, impact force, etc., to the preliminary opening assembly 500. The external action may be a top pressure or impact force exerted by the support surface on the preliminary opening assembly 500. It can be understood that the external action includes a force acting on the preliminary opening assembly 500 along the first direction, and/or the external action includes a rotational torque acting on the preliminary opening assembly 500 around a rotational axis. It can be understood that when the external action includes a force acting on the preliminary opening assembly 500 along the first direction, the entire or partial force of the external action is a force pushing the preliminary opening assembly 500 along the first direction; when the external action includes a rotational torque acting on the preliminary opening assembly 500 around the rotational axis, the entire or component torque of the external action is a torque around the rotational axis.

A common scenario, as illustrated in FIGS. 1-25, 26-30, etc., involves the user holding the sliding sleeve assembly 200 or the support rod assembly 100 and pressing or striking the preliminary opening assembly 500 of the multi-legged stand against the ground or another surface. In this case, the external action is the reaction force exerted by the ground or other surface on the preliminary opening assembly 500. In this scenario, the user holds a handheld portion 210 and presses the preliminary opening assembly 500 of the multi-legged stand downward against the ground or strikes it. The reaction force from the ground acts on the preliminary opening assembly 500, causing part or all of its structure to move upward. The preliminary opening assembly 500 can overcome the folding force and directly push open the at least three support leg assemblies 300, causing the at least three support leg assemblies 300 to transition from the folded state to the preliminarily opened state relative to the support rod assembly 100.

Another common scenario is illustrated in FIGS. 1-25, 26-30, and 31-41. The user holds the sliding sleeve assembly 200 or the support rod assembly 100 with one hand, while the other hand presses or rotates the preliminary opening assembly. The external action may be specifically manifested as a pressing force or rotational torque applied by the user to the preliminary opening assembly 500.

It should be noted that the magnitude of the external action required to cause the preliminary opening assembly 500 to push open the at least three support leg assemblies 300 may be designed based on the magnitude of the folding force acting on the at least three support leg assemblies 300. In other words, by designing the magnitude of the folding force acting on the at least three support leg assemblies 300 and the specific structure by which the at least three support leg assemblies 300 are folded relative to the support rod assembly 100, the magnitude of the external action may be designed. Here, the magnitude of the folding force and the external action are not specifically limited, as long as applying the external action to the preliminary opening assembly 500 can enable the preliminary opening assembly 500 to overcome the folding force and push open the at least three support leg assemblies 300.

The way the preliminary opening assembly 500 pushes open the at least three support leg assemblies 300 may vary. For example, the preliminary opening assembly 500 can rotate around the rotational axis to push open the at least three support leg assemblies 300. For example, the preliminary opening assembly 500 can slide along the first direction to push open the at least three support leg assemblies 300. A specific implementation method is to set inclined contact surfaces on the support leg assemblies 300, allowing the preliminary opening assembly 500 to gradually move upward along the contact surfaces to gradually open the at least three support leg assemblies 300. For example, an angle between the normal direction of the contact surface and the first direction is greater than 90°. For example, a portion of the preliminary opening assembly 500 may be slidably connected relative to the support rod assembly 100, while another portion rotates about the rotational axis to preliminarily open the at least three support leg assemblies 300.

For example, when the preliminary opening assembly 500 (or a portion thereof) rotates around the rotational axis relative to the support rod assembly 100, the rotational axis is along the length direction of the support rod assembly. When the preliminary opening assembly 500 (or a portion thereof) slides along the first direction, the first direction is along the length direction of the support rod assembly.

The preliminary opening assembly 500 can push open the support leg assemblies 300, i.e., the preliminary opening assembly 500 can convert the external action applied onto the preliminary opening assembly 500 to a force for pushing open the at least three support leg assemblies 300. In this way, by the preliminary opening assembly 500, the at least three support leg assemblies 300 can be preliminarily opened, thereby facilitating the subsequent automatic splaying of the at least three support leg assemblies 300 under the self-weight effect and inertial effect of a movable component. Compared to manually prying open the support leg assemblies to release the snap-fitting of the at least three support leg assemblies 300 and allow them to naturally splay, this method enables the at least three support leg assemblies 300 to splay more smoothly.

In an example, as shown in FIGS. 12 to 16, 27, and 28, during the process where the at least three support leg assemblies 300 are switched from the folded state to the preliminarily opened state relative to the support rod assembly 100, the rotation angle of the support leg assemblies 300 relative to the support rod assembly 100 is greater than or equal to 0.5°, such as 0.5°, 1°, 2°, 3°, 5°, etc. This results in a larger preliminary opening angle of the at least three support leg assemblies 300 in the preliminarily opened state, which is more conducive to further splaying of the at least three support leg assemblies 300, such as facilitating manual opening of the support leg assemblies 300 by the user, or further automatic splaying under the gravity effect and inertial effect of the movable component. Specifically, during the process where the at least three support leg assemblies 300 are switched from the folded state to the preliminarily opened state relative to the support rod assembly 100, the opening angle of the support leg assemblies 300 when they are preliminarily opened by the preliminary opening assembly 500 is greater than or equal to 2°.

In other examples, as shown in FIGS. 12 to 16, 27, and 28, during the process where the at least three support leg assemblies 300 are switched from the folded state to the preliminarily opened state relative to the support rod assembly 100, the rotation angle of the support leg assemblies 300 relative to the support rod assembly 100 is greater than or equal to 0.3°, such as 0.3°, 0.4°, 0.5°, etc.

In some embodiments, when the at least three support leg assemblies 300 are in the preliminarily opened state relative to the support rod assembly 100, the self-weight of the movable component promotes the sliding of the sliding sleeve assembly 200, causing the at least three support leg assemblies 300 to splay relative to the support rod assembly 100. The movable component includes the sliding sleeve assembly 200, the at least three support leg assemblies 300, and the connecting assembly 400; the sliding sleeve assembly 200 includes a handheld portion 210 configured for a top end of the support rod assembly 100 to extend therefrom, and the support leg assemblies 300 are rotatably connected to the handheld portion 210. The at least three support leg assemblies 300 are configured such that when the handheld portion 210 is lifted, the at least three support leg assemblies 300 fold relative to the support rod assembly 100 and are folded relative to the support rod assembly 100 by the folding force.

For example, the support leg assemblies 300 may be rotatably connected to a bottom end of the handheld portion 210.

For example, when the at least three support leg assemblies 300 are in the preliminarily opened state relative to the support rod assembly 100 and the extension direction of the support rod assembly is along the direction of gravity, the self-weight of the movable component can promote the sliding sleeve assembly 200 to slide downward, causing the at least three support leg assemblies 300 to splay relative to the support rod assembly 100.

The handheld portion 210 of the sliding sleeve assembly 200 is specifically shaped like a sleeve, and an outer peripheral wall of the handheld portion 210 forms part of the outer peripheral wall of the entire multi-legged stand. The length of the handheld portion 210 may be designed according to actual requirements. To facilitate the user's grip on the multi-legged stand, the length of the handheld portion 210 may be greater than or equal to 1 cm. For example, the length of the handheld portion 210 may be in a range from 2 cm to 6 cm, which may ensure that the length of the handheld portion 210 is sufficiently long to facilitate the user's grip. Since the handheld portion 210 has a certain thickness (the outer peripheral wall of the handheld portion 210 is radially spaced from the outer peripheral wall of the support rod assembly 100), the top end of the support leg assembly 300 is rotatably connected to the bottom end of the handheld portion 210, thereby providing a sufficient rotational space for the support leg assembly 300. Additionally, when the at least three support leg assemblies 300 are in the folded state, the outer peripheral walls of the support leg assemblies 300 may be designed to be flush with the outer peripheral wall of the handheld portion 210, which further ensures that the overall appearance of the multi-legged stand is succinct and flat.

It can be understood that there are multiple ways to promote the downward sliding of the sliding sleeve assembly 200 due to the self-weight of the movable component. For example, one implementation is that the downward sliding of the sliding sleeve assembly 200 can be achieved solely by the self-weight of the movable component. It should be noted that the sliding sleeve assembly 200, the at least three support leg assemblies 300, the support rod assembly 100, and the connecting assembly 400 may be designed after multiple experimental adjustments to meet the design requirement of automatically splaying the at least three support leg assemblies 300 using the gravitational force of the movable component. The weights of the sliding sleeve assembly 200, the at least three support leg assemblies 300, the support rod assembly 100, and the connecting assembly 400 are not specifically limited herein.

Another implementation is that a force-bearing portion of the preliminary opening assembly 500 strikes the support surface, relying on the self-weight and inertial effect of the movable component to cause the sliding sleeve assembly 200 to slide downward. It should be noted that the sliding sleeve assembly 200, the at least three support leg assemblies 300, the support rod assembly 100, and the connecting assembly 400 are designed to automatically splay the at least three support leg assemblies 300 using the gravity and inertial effect of the movable component.

After the at least three support leg assemblies 300 are preliminarily opened, the self-weight of the movable component drives the sliding sleeve assembly 200 to slide downward relative to the support rod assembly 100, the at least three support leg assemblies 300 move downward with the sliding sleeve assembly 200, causing the support leg assemblies 300 to rotate relative to the handheld portion 210 and splay relative to the support rod assembly 100, thereby automatically splaying the at least three support leg assemblies 300. In this way, after the at least three support leg assemblies 300 are preliminarily opened, the user only needs to hold the handheld portion 210 or the support rod assembly 100 with one hand to achieve the automatic splaying of the multi-legged stand, which is convenient and quick, significantly improving the ease of operation for opening the multi-legged stand.

In some cases where the at least three support leg assemblies 300 are folded relative to the support rod assembly, the user grips the handheld portion 210 or the support rod assembly 100, causing the force-bearing portion of the preliminary opening assembly 500 to strike the support surface, thereby preliminarily opening the at least three support leg assemblies 300. The sliding sleeve assembly 200 then slides downward due to the self-weight and inertial effect of the movable component. As the sliding sleeve assembly 200 slides downward, the at least three support leg assemblies 300 rotate relative to the handheld portion 210, and the support leg assemblies 300 splay relative to the support rod assembly 100, thereby causing the at least three support leg assemblies 300 to "automatically" splay. In this way, the user only needs to hold the handheld portion 210 or the support rod assembly 100 with one hand to achieve the automatic splaying of the multi-legged stand, which is convenient and quick, significantly improving the ease of operation for opening the multi-legged stand.

Furthermore, during the process of lifting the sliding sleeve assembly to fold the at least three support leg assemblies 300, the self-weight of the at least three support leg assemblies 300 promotes the folding of the at least three support leg assemblies 300, while the self-weight of the support rod assembly 100 also promotes the folding of the at least three support leg assemblies 300. It should be noted that the design of the sliding sleeve assembly 200, the at least three support leg assemblies 300, the support rod assembly 100, and the connecting assembly 400 ensures that during the process of lifting the handheld portion 210, the self-weight of the support rod assembly 100 promotes the folding of the at least three support leg assemblies 300.

During the folding of the at least three support leg assemblies 300, the inertial effect of the at least three support leg assemblies 300 promotes the folding of the at least three support leg assemblies 300, and the inertial effect of the support rod assembly 100 promotes the folding of the at least three support leg assemblies 300. It should be noted that the design of the sliding sleeve assembly 200, the at least three support leg assemblies 300, the support rod assembly 100, and the connecting assembly 400 ensures that during the process of lifting the handheld portion 210, the self-weight of the support rod assembly 100 promotes the folding of the at least three support leg assemblies 300.

Furthermore, when the user holds the handheld portion 210 and lifts the handheld portion 210, causing the at least three support leg assemblies 300 to fold relative to the support rod assembly 100, the self-weight of a support member 700 and the self-weight of an electronic terminal promote the folding of the at least three support leg assemblies 300 relative to the support rod assembly 100.

It can be understood "inertia" refers to the property of an object to remain at rest or in uniform motion in a straight line, and the inertial effect refers to an effect brought by the inertia property.

For example, when the user holds the handheld portion 210 and lifts the handheld portion 210 to cause the at least three support leg assemblies 300 to fold relative to the support rod assembly 100, the inertial effect of the support member 700 and the inertial effect of the electronic terminal promote the folding of the at least three support leg assemblies 300 relative to the support rod assembly 100. Specifically, when the user holds the sliding sleeve assembly and lifts the multi-legged stand to cause the at least three support leg assemblies 300 to fold relative to the support rod assembly 100, the sliding sleeve assembly 200 accelerates from rest to a certain velocity, while the support member 700 and the electronic terminal remain stationary. The support member 70 and the electronic terminal promote the folding of the at least three support leg assemblies 300 relative to the support rod assembly 100.

In this process, when the user lifts the handheld portion 210, the user essentially grips the handheld portion 210 and applies an upward lifting force to it. When it is necessary to fold the multi-legged stand, the user can lift the handheld portion 210 upward, causing the support rod assembly 100 to slide downward relative to the sliding sleeve assembly 200 under the combined effect of gravity and inertia of the support rod assembly 100, the support member 700, the electronic terminal, and other components. The support rod assembly 100, in conjunctions with the connecting assembly 400, folds the at least three support leg assemblies 300. Furthermore, under the combined effect of gravity and inertia, the at least three support leg assemblies 300 further promote the folding of the at least three support leg assemblies 300 themselves. In this way, when the user lifts the handheld portion 210, the at least three support leg assemblies 300 can fold relative to the support rod assembly 100, and finally, through the folding force, the at least three support leg assemblies 300 remain folded relative to the support rod assembly 100. Thus, the user only needs to hold the handheld portion 210 with one hand and lift it upward to achieve automatic folding of the multi-legged stand, which is convenient and quick, significantly enhancing the ease of operation for folding the multi-legged stand.

In an example, the folding force causing the support leg assemblies 300 to remain folded relative to the support rod assembly 100 is a suction force.

The type of the suction force causing the support leg assemblies 300 to remain folded relative to the support rod assembly 100 may vary, such as magnetic attraction, adhesive force, or vacuum suction force. That is, this suction force differs from a snap-fitting force, meaning the support leg assemblies 300 do not remain folded relative to the support rod assembly 100 through a snap-fitting mechanism. Thus, in the folded state, when an external action is applied to the force-bearing portion 510 of the preliminary opening assembly 500, the preliminary opening assembly 500 can overcome the suction force of the support leg assemblies 300 and directly push open the at least three support leg assemblies 300, causing the at least three support leg assemblies 300 to be in the preliminarily opened state relative to the support rod assembly 100. It can be understood that if the support leg assemblies 300 are folded relative to the support rod assembly 100 via a snap-fitting force, when an external action is applied to the force-bearing portion 510, it is necessary to first release the snap-fitting force of the support leg assemblies 300 before pushing open the at least three support leg assemblies 300. This would result in a more complex structure of the preliminary opening assembly 500 or require a larger external action to be applied. Therefore, when the folding force causing the support leg assembly 300 to remain folded relative to the support rod assembly 100 is set as a suction force, the preliminary opening assembly 500 can directly push open the at least three support leg assemblies 300, thereby simplifying the structure of the preliminary opening assembly 500. Additionally, setting the folding force as a suction force reduces the requirement for positioning accuracy, enabling the at least three support leg assemblies 300 to fold more tightly and reliably, thereby preventing incomplete folding due to misaligned latches.

In another example, as shown in FIGS. 5, 6, 15, 16, 20, and 23, the folding force causing the support leg assemblies 300 to remain folded on the support rod assembly 100 is magnetic attraction. By setting the folding force acting on the support leg assemblies 300 as magnetic attraction, compared to other methods, during a process where the at least three support leg assemblies 300 are switched from the folded state to the splayed state relative to the support rod assembly 100, the magnetic attraction force promotes the folding of the at least three support leg assemblies 300 relative to the support rod assembly 100 due to the effect of the magnetic field, thereby making the automatic folding of the at least three support leg assemblies 300 relative to the support rod assembly 100 faster and smoother, and ensuring that the at least three support leg assemblies 300 are ultimately folded more precisely relative to the support rod assembly 100.

In some embodiments, referring to FIGS. 2 to 8, FIGS. 12 to 18, and FIGS. 26 to 33, the preliminary opening assembly 500 includes a force-bearing portion 510 exposed relative to the support leg assemblies 300 in the folded state. The preliminary opening assembly 500 includes at least three actuating portions 520 disposed on a bottom end of the support rod assembly 100. The external action includes a force applied to the force-bearing portion 510 along the first direction. The at least three actuating portions 520 are configured to rotate around the rotational axis when the external action is applied, thereby preliminarily opening the at least three support leg assemblies 300. It can be understood that the entire external action is a force applied to the preliminary opening assembly 500 along the first direction, or a component of the external action is a force applied to the preliminary opening assembly 500 along the first direction.

In the embodiments, the number of the at least three actuating portions 520 may correspond to the number of the at least three support leg assemblies 300. Of course, the number of the actuating portions 520 may be greater than the number of the support leg assemblies 300. The shape and form of the actuating portion 520 may vary widely, such as a protrusion, an angular portion of a polygon, or a flange of a cam. When an external action is applied to the force-bearing portion 510, by rotating the at least three actuating portions 520 around the rotational axis, the at least three support leg assemblies 300 are pushed open, thereby more effectively converting the external action into a pushing opening force exerted by the preliminary opening assembly 500 on the support leg assemblies 300. This results in a larger preliminary opening angle of the at least three support leg assemblies 300 being pushed open by the preliminary opening assembly 500, thereby facilitating further automatic splaying of the support leg assemblies.

In other embodiments, contact surfaces corresponding to the actuating portions 520 may be arranged on the support leg assemblies 300, with the contact surfaces inclined. When an external action is applied to the force-bearing portion 510, the at least three actuating portions 520 slide along the first direction to gradually push open the at least three support leg assemblies 300; for example, the angle between the normal direction of the contact surface and the first direction is greater than 90°.

To facilitate opening operations for the multiple support legs, in some embodiments, when the support leg assemblies 300 are in the folded state, the force-bearing portion 510 protrudes from the bottom ends of the support leg assembly 300. In this way, the user can hold the handheld portion 210 of the sliding sleeve assembly 200 with one hand and press or strike the force-bearing portion 510 against the ground or support surface. After the preliminary opening of the multiple support leg assemblies 300 by the preliminary opening assembly 500, the multiple support leg assemblies 300 can be rapidly splayed by gravity and inertial effect, thereby achieving a single-handed quick-opening operation for the multi-legged stand.

It can be understood that when the at least three support leg assemblies 300 are in the folded state, the bottom ends of the support leg assemblies 300 extend beyond the bottom end of the support rod assembly 100 and cover part of the preliminary opening assembly 500. The force-bearing portion 510 of the preliminary opening assembly 500 protrudes from the bottom end of the support leg assemblies 300 (the force-bearing portion 510 is located below the bottom ends of the support leg assemblies 300). The force-bearing portion 510 may be flat, curved, partially spherical, etc., and the force-bearing portion 510 may be part of the preliminary opening assembly 500. The size of the force-bearing portion 510 is not specifically limited.

For example, as shown in FIGS. 7, 8, 16 to 20, 29, and 41, the preliminary opening assembly 500 includes an actuating member 540, which has a polygonal structure, and the at least three actuating portions 520 are at least three angular portions of the polygonal structure. The multi-legged stand is typically a tripod or quadpod. To maintain overall consistency, the area enclosed by the bottom surfaces of the at least three support leg assemblies 300 is roughly triangular, rectangular, or other polygonal shapes. By configuring the actuating member 540 as a polygonal structure, it can better adapt to the space enclosed by the bottom surfaces of the at least three support leg assemblies 300. Additionally, by configuring the actuating portions 520 as angular portions of the polygonal structure, the angular portions can better push open the support leg assemblies 300 when the actuating member 540 rotates.

In an example, referring to FIGS. 2 to 6, 12 to 16, 20, 23, 28, and 41, in the folded state, the at least three support leg assemblies 300 are arranged around the outer periphery of the support rod assembly 100, and the number of the at least three actuating portions 520 corresponds to the number of the at least three support leg assemblies 300. Each actuating portion 520 is disposed between adjacent support leg assemblies 300. The inner surface of the support leg assembly 300 has a contact surface 310 located between adjacent actuating portions 520. The contact surface 310 is configured to contact its corresponding actuating portion 520 when the actuating portions 520 rotate and gradually open the support leg assemblies 300.

In the embodiments, the contact surfaces 310 may be flat or convex arcuate surfaces. It can be understood that, when the at least three support leg assemblies 300 are in the folded state relative to the support rod assembly 100, the vertical distance from the rotational axis to each contact surface 310 is less than the distance from the rotational axis to the junction of the adjacent support leg assemblies 300. More specifically, the multi-legged stand further includes an anti-slip pad 380, which is disposed on the bottom end of each support leg assembly 300, and the contact surface 310 is disposed on the anti-slip pad 380.

In the folded state, each actuating portion 520 is positioned between corresponding adjacent support leg assemblies 300, i.e., the distance from a top of the actuating portion 520 to the rotational axis is greater than the distance from the rotational axis to the contact surface 310. In this way, after the at least three actuating portions 520 rotate, the actuating portions 520 move along the contact surfaces 310 to gradually push open the at least three support leg assemblies 300. In this manner, the process of the at least three actuating portions 520 pushing open the at least three support leg assemblies 300 is smoother, and the at least three actuating portions 520 do not interfere with the folding of the at least three support leg assemblies 300.

Figure 6:
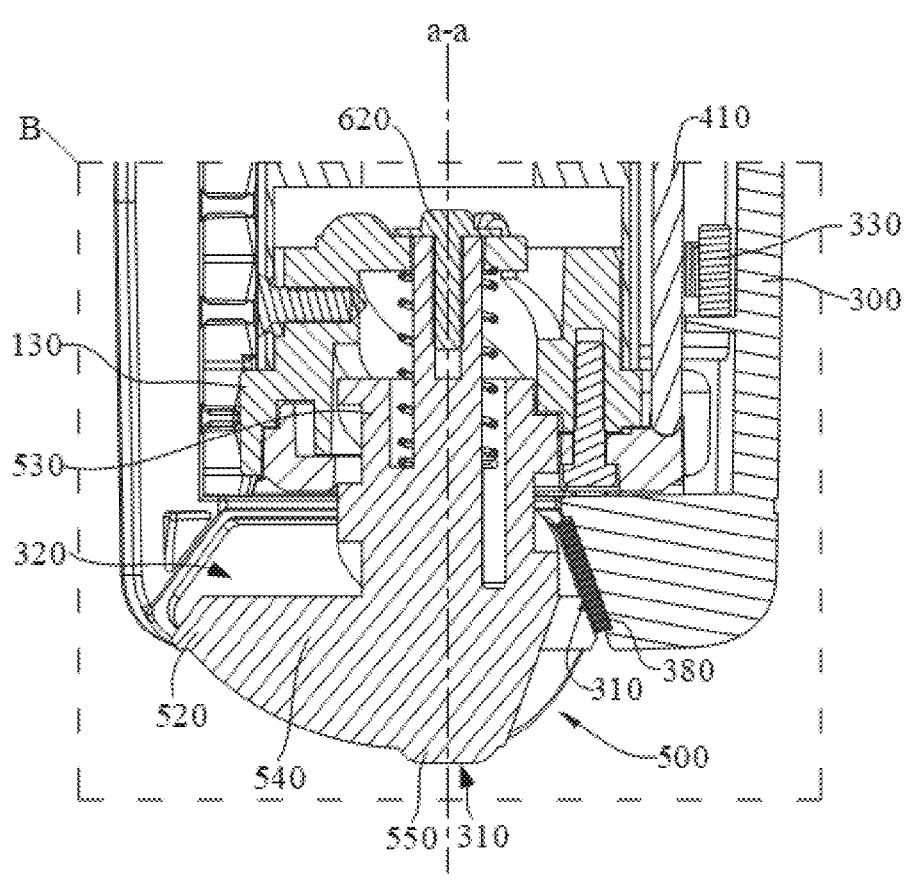
FIG. 6 is an enlarged view of the structure at position B shown in FIG. 5.
Figure 16:
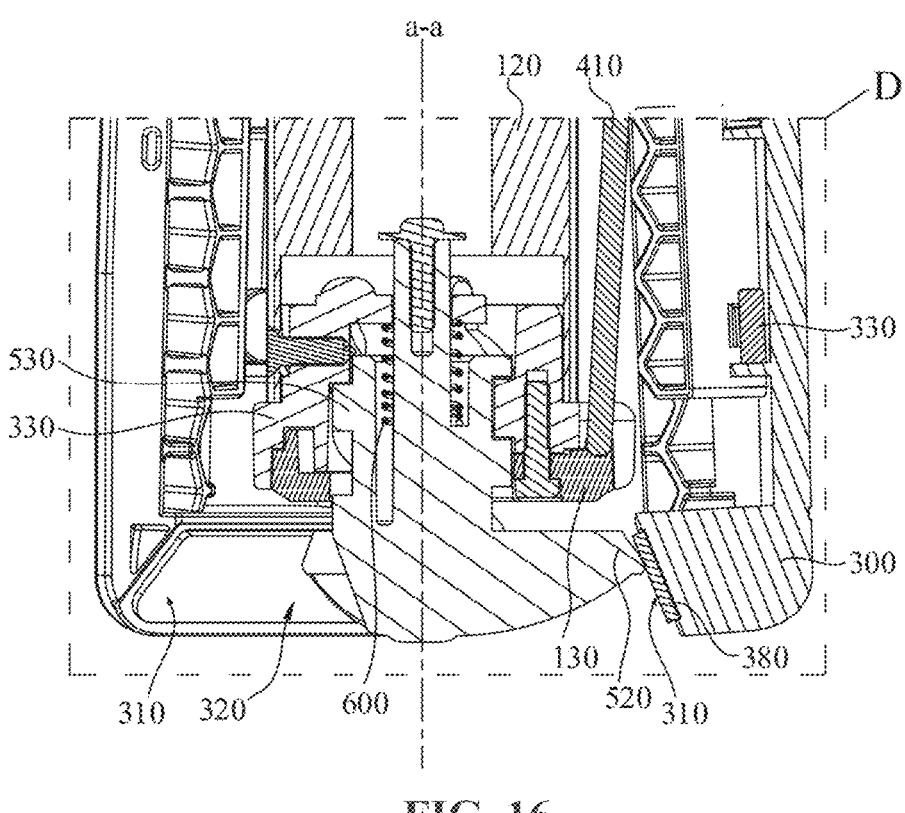
FIG. 16 is an enlarged view of the structure at position D shown in FIG. 15.

Furthermore, as shown in FIGS. 6 and 16, the contact surfaces 310 of the at least three support leg assemblies 300 enclose to define a rotational space 320, and the cross-sectional area of the rotational space 320 decreases gradually from bottom to top. That is, each contact surface 310 is inclined, and the angle between the external normal line of the contact surface 310 and the first direction is greater than 90°. Through this arrangement, the at least three actuating portions 520 can simultaneously rotate and slide in the first direction to push open the at least three support leg assemblies 300, making the process of pushing open the at least three support leg assemblies 300 by the actuating portions 520 smoother. In other words, this makes the preliminary opening of the multi-legged stand more effortless. Furthermore, with this usage method, the user can use various methods such as twisting the preliminary opening assembly, pressing the preliminary opening assembly, and pressing or impacting the support surface against the preliminary opening assembly to cause the preliminary opening assembly to preliminarily open the support leg assemblies, thereby diversifying the methods of preliminarily opening and making it more convenient for the user to use the multi-legged stand.

Figure 29:
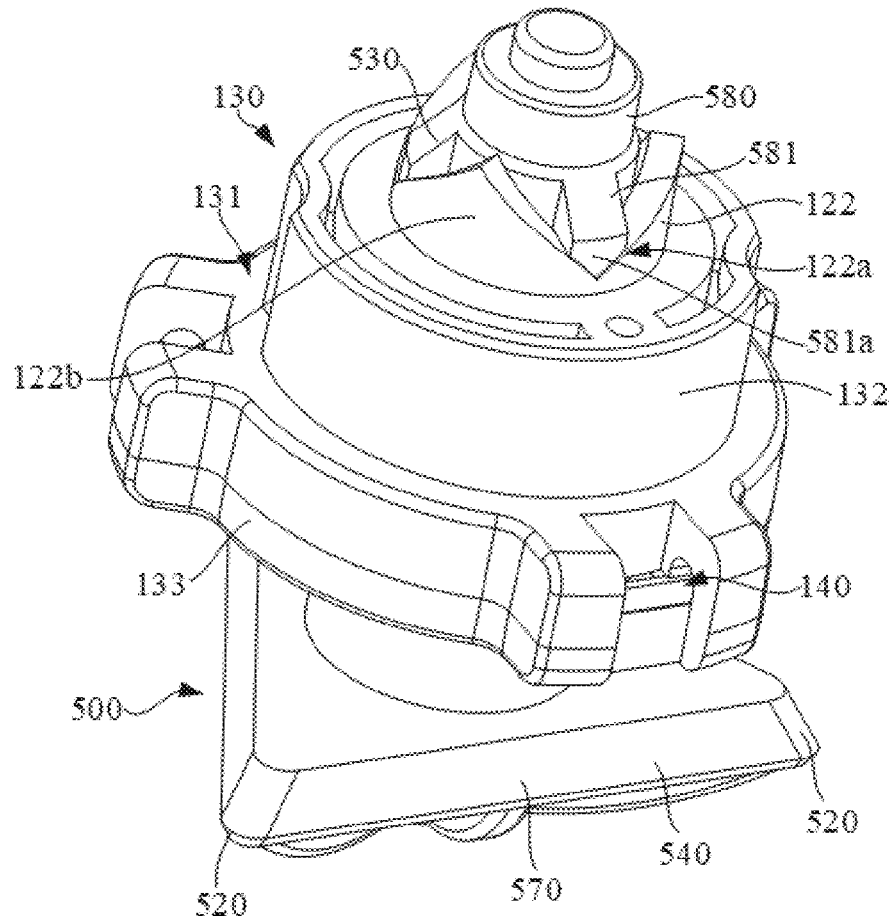
FIG. 29 is an assembled schematic view of a mounting member and a preliminary opening assembly of the multi-legged stand shown in FIG. 27.

Furthermore, as shown in FIGS. 16 and 29, the contact surfaces 310 of the at least three support leg assemblies 300 enclose to define a rotational space 320, and the cross-sectional area of the rotational space 320 decreases gradually from the bottom to the top. That is, each contact surface 310 is inclined, and the angle between the external normal line of the contact surface 310 and the first direction is greater than 90°. Through this design, the at least three actuating portions 520 can rotate to push open the at least three support leg assemblies 300, and the at least three actuating portions 520 can further slide in the first direction to push open the at least three support leg assemblies 300. Users can use various methods such as twisting the preliminary opening assembly, pressing the preliminary opening assembly, and pressing or impacting the support surface against the preliminary opening assembly to preliminarily open the support leg assemblies, thereby diversifying the methods of preliminarily opening and making it more convenient for the user to use the multi-legged stand.

Figure 31:
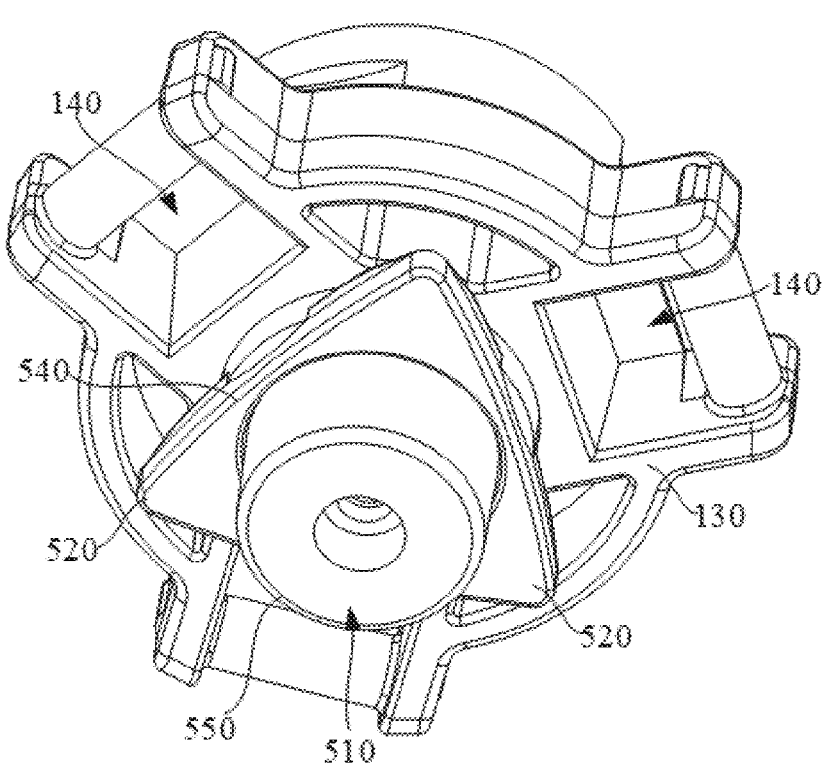
FIG. 31 is an assembled schematic view of a mounting member and a preliminary opening assembly of a multi-legged stand according to further other embodiments of the present disclosure.
Figure 32:
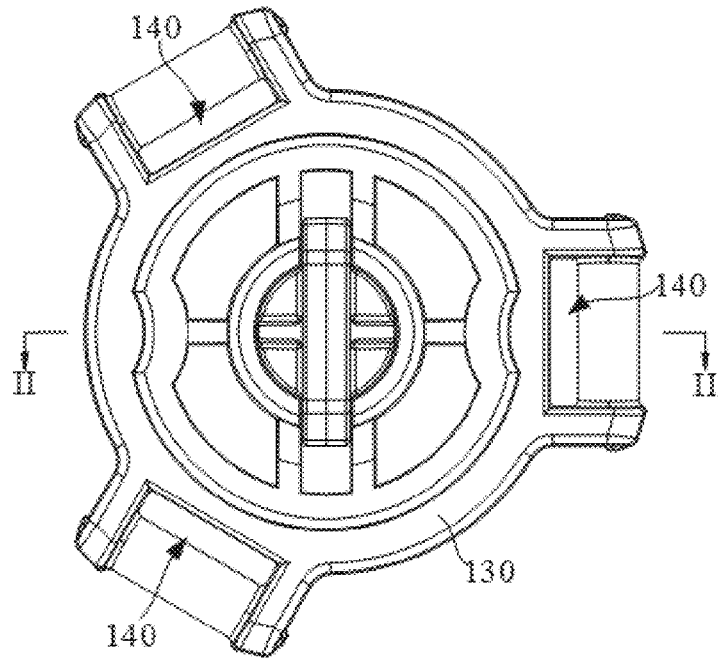
FIG. 32 is a top view of the structure shown in FIG. 31.
Figure 33:
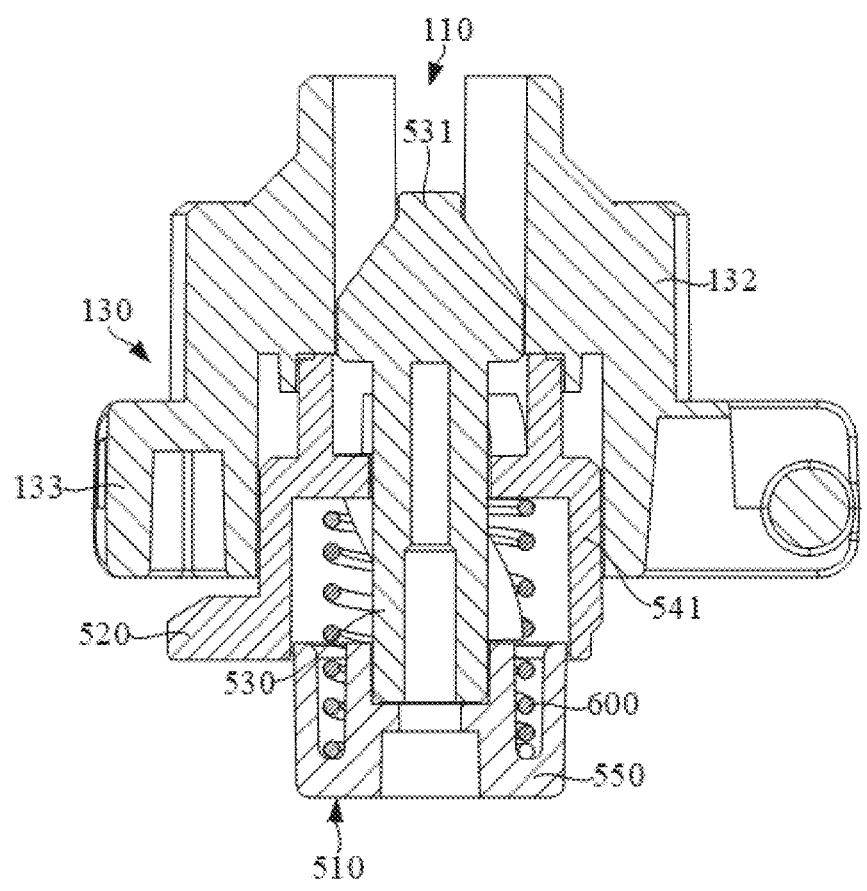
FIG. 33 is a cross-sectional view of the structure shown in FIG. 32 along an II-II line.
Figure 34:
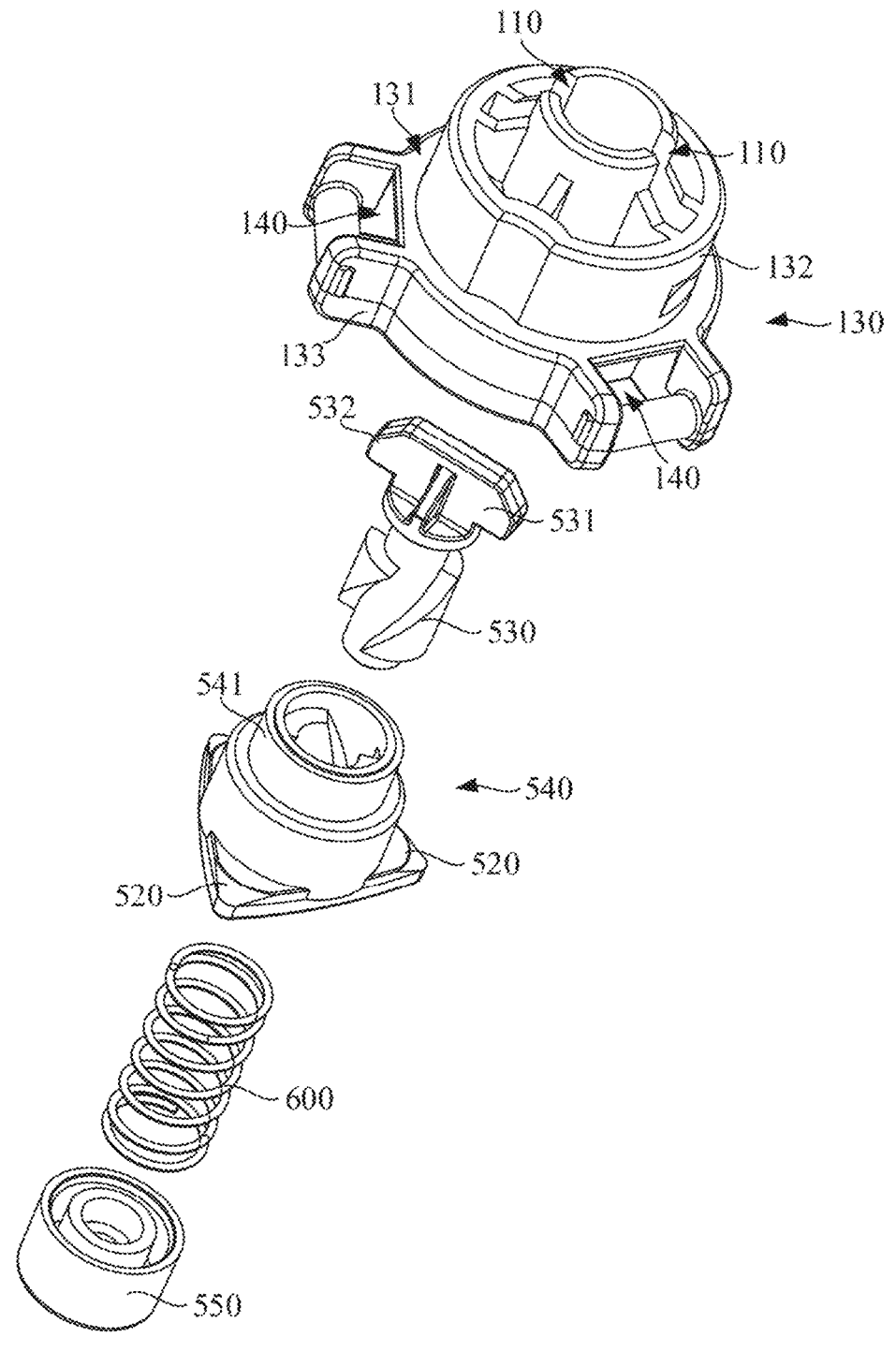
FIG. 34 is an exploded view of the structure shown in FIG. 31.
Figure 35:
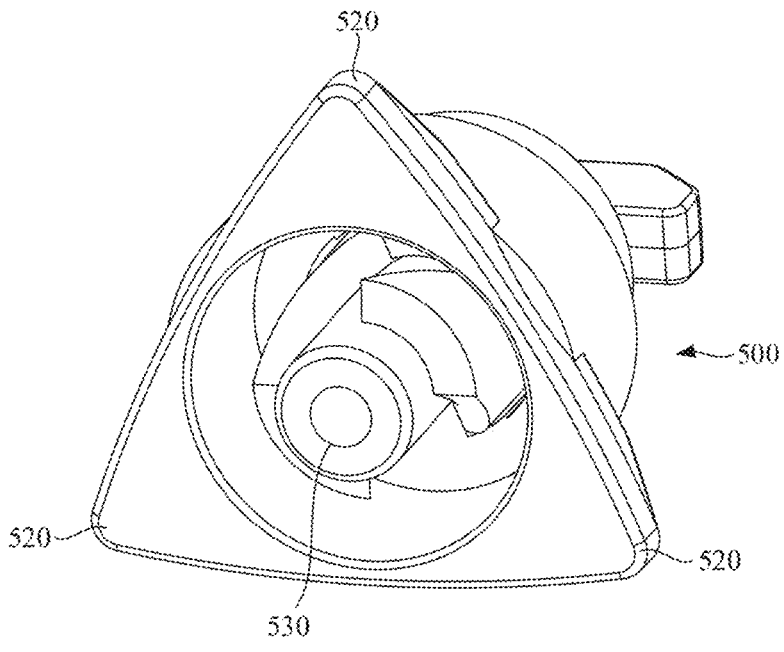
FIG. 35 is a structural schematic view of a preliminary opening assembly in the structure shown in FIG. 31.
Figure 36:
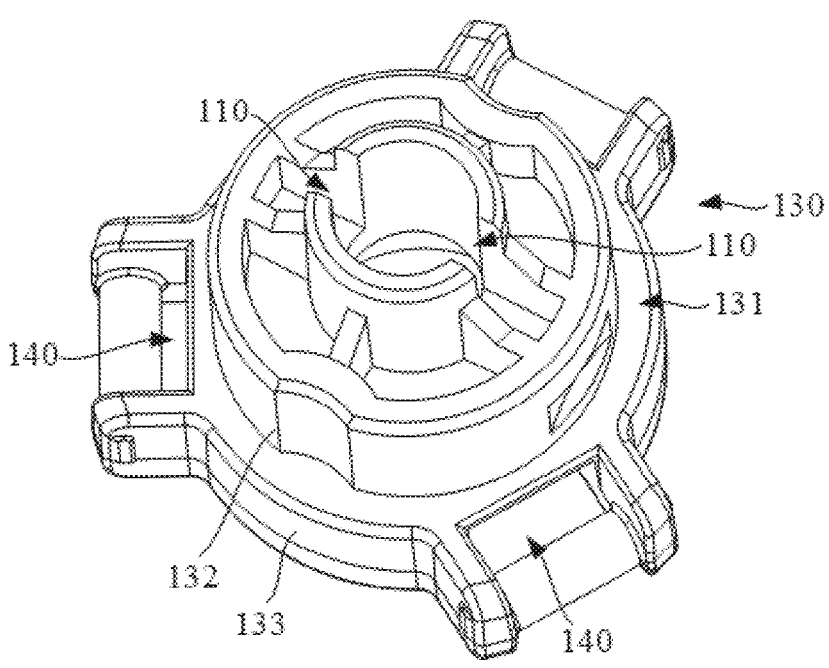
FIG. 36 is a structural schematic view of a mounting member in the structure shown in FIG. 31.
Figure 37:
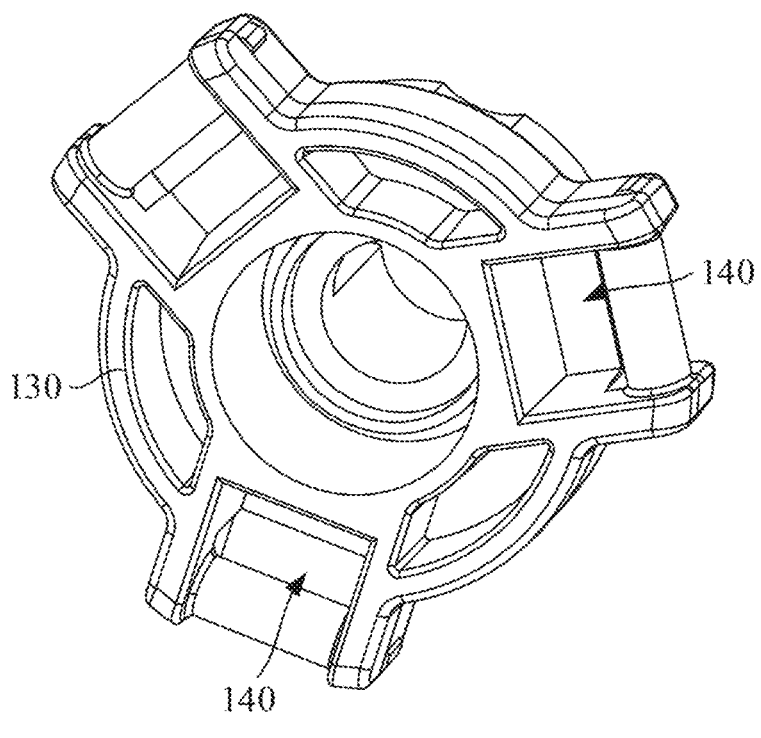
FIG. 37 is a structural schematic view of the mounting member shown in FIG. 36 at another viewing angle.
Figure 38:
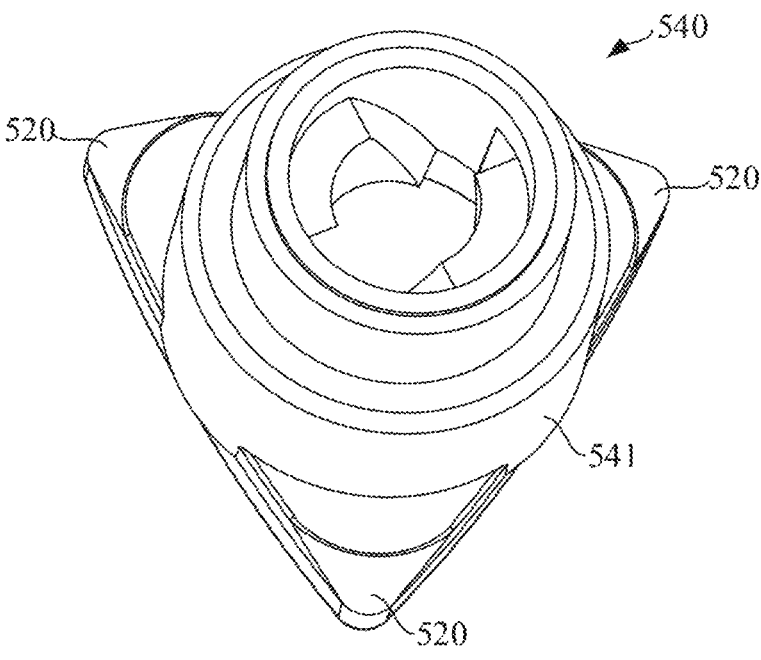
FIG. 38 is a structural schematic view of an actuating portion of the preliminary opening assembly shown in FIG. 35.
Figure 39:
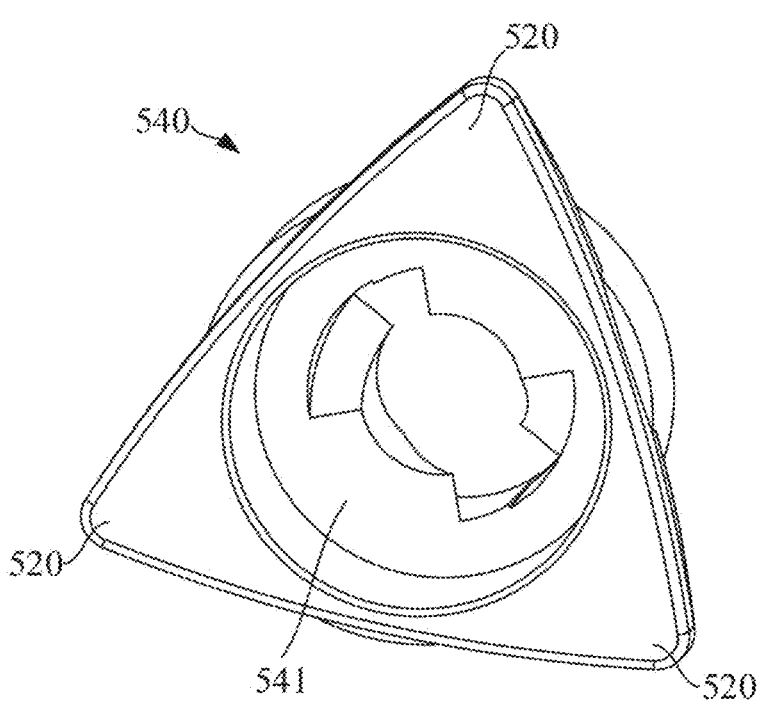
FIG. 39 is a structural schematic view of the actuating portion shown in FIG. 38 at another viewing angle.
Figure 40:
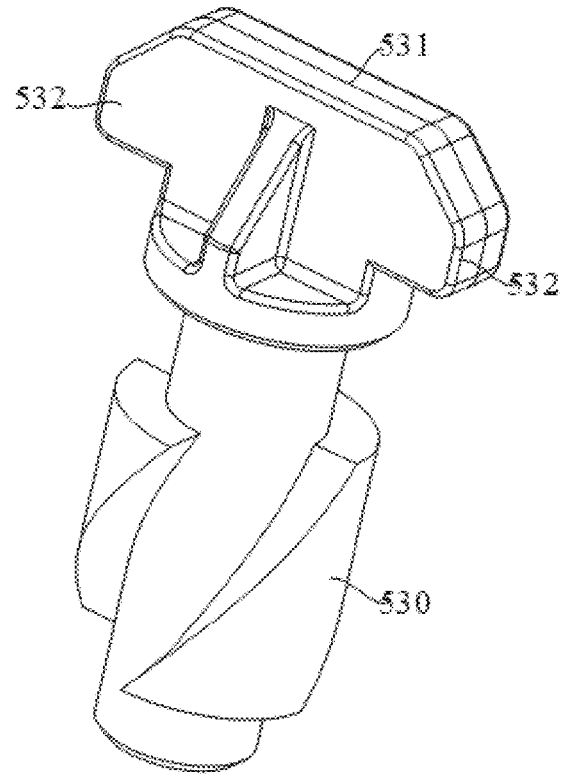
FIG. 40 is a structural schematic view of a movable member of the preliminary opening assembly shown in FIG. 35.
Figure 41:
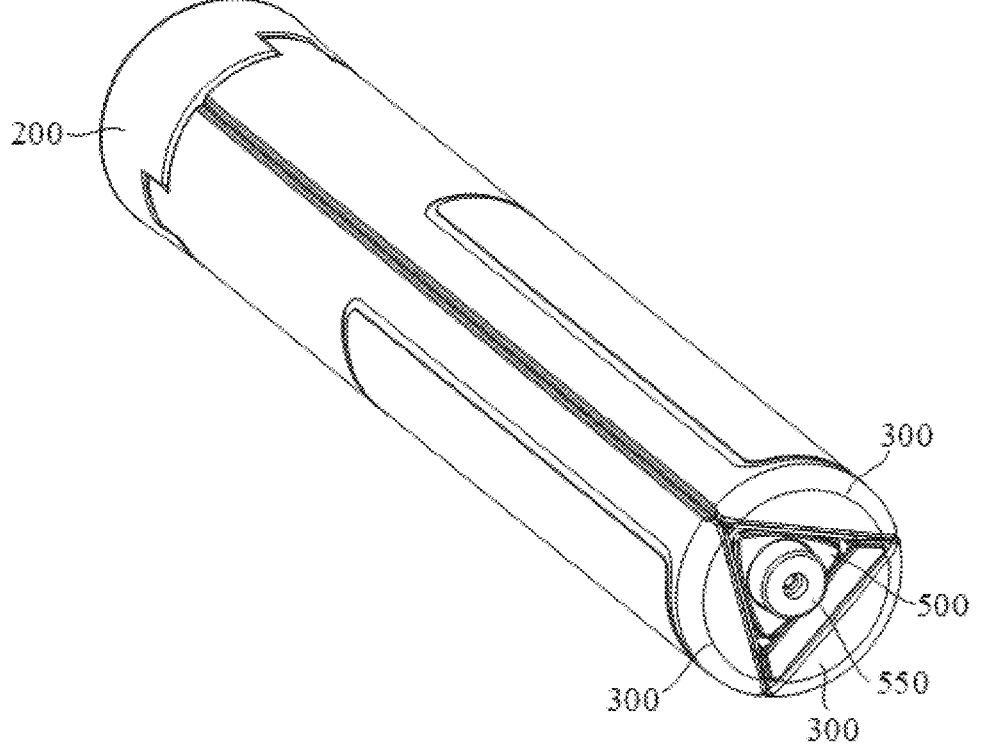
FIG. 41 is a structural schematic view of the structure shown in FIG. 31 being applied to a multi-legged stand, where at least three support leg assemblies of the multi-legged stand are in a folded state.

In some embodiments, as shown in FIG. 31, the preliminary opening assembly 500 includes a movable member 530 and an actuating member 540, with the at least three actuating portions 520 arranged on the actuating member 540. When the preliminary opening assembly 500 is subjected to an external action, the movable member 530 slides relative to the support rod assembly 100, causing the actuating portions 520 to rotate and gradually preliminarily open the at least three support leg assemblies 300.

The connection method between the movable member 530 and the actuating member 540 may be adjusted and selected according to the sliding position of the movable member 530 relative to the support rod assembly 100. For example, when the movable member 530 slides axially relative to the support rod assembly 100, the movable member 530 and the actuating member 540 may be in a screw-type engagement. When the movable member 530 slides radially relative to the support rod assembly 100, the movable member 530 and the actuating member 540 form a structure similar to a gear and rack. The movable member 530 and the preliminary opening assembly may be connected by other means, provided that the linear motion of the movable member 530 relative to the support rod assembly 100 can be converted into a peripheral rotational motion of the preliminary opening assembly. Another example is that the movable member 530 and the actuating member 540 or the support rod assembly 100 form a cam mechanism, a screw pair mechanism, a crank-slide mechanism, etc.

The movable member 530 is slidable relative to the support rod assembly 100 under the influence of an external action, either directly or indirectly, to transmit the external action to the actuating member 540 and apply a rotational force to the actuating member 540, thereby causing the actuating member 540 to rotate and preliminarily open the at least three support leg assemblies 300. For example, the actuating member 540 may be acted upon by directly or indirectly pressing the movable member 530, or the actuating member 540 may be acted upon by directly or indirectly acting on the movable member 530.

In some embodiments, as shown in FIGS. 5 to 8 and FIGS. 12 to 18, the preliminary opening assembly 500 mates with the support rod assembly 100 via a screw pair or a cam pair. When the preliminary opening assembly 500 is subjected to an external action, the preliminary opening assembly 500 simultaneously slides and rotates around the rotational axis relative to the support rod assembly 100. For example, when the preliminary opening assembly 500 is in meshing engagement with the support rod assembly 100 via a screw-pair mechanism, the preliminary opening assembly 500 performs a screw motion relative to the support rod assembly 100. The external action includes a force pushing the preliminary opening assembly 500 along the first direction, or the external action includes a torque around the rotational axis of the preliminary opening assembly; the first direction is along the rotational axis. It can be understood that the entire or component force of the external action is a force pushing the preliminary opening assembly 500 along the first direction, or the entire or component torque of the external action is a torque around the rotational axis. In the embodiments, during the rotation of the preliminary opening assembly 500 from an initial position to a second position, the preliminary opening assembly 500 pushes open the at least three support leg assembly 100, causing the at least three support leg assemblies 300 to transition from the folded state to the preliminarily opened state.

In the embodiments, the preliminary opening assembly 500 includes a movable member 530, an actuating member 540, and a force-bearing member 550. The movable member 530 and the force-bearing member 550 are fixedly connected to opposite sides of the actuating member 540. A bottom end of the force-bearing member 550 forms a force-bearing portion 510. The movable member 530 is in meshing engagement with the bottom end of the support rod assembly 100 via a screw pair or a cam pair. The multi-legged stand further includes an elastic member 600, which is configured to provide an elastic force to the movable member 530, such that after the external action is removed, the elastic force drives the preliminary opening assembly 500 to return to the initial position. For example, the multi-legged stand further includes an elastic member 600, which is configured to provide a downward elastic force to the movable member 530, such that after the external action is removed, the elastic force drives the preliminary opening assembly 500 to return downward to the initial position.

In some embodiments, threads that can mutually mate with each other may be provided on the movable member 530 and the support rod assembly 100 to achieve a screw connection between the movable member 530 and the bottom end of the support rod assembly 100. For example, the threads provided on the movable member 530 and the support rod assembly 100 may be rectangular threads or triangular threads, etc. The movable member 530 may specifically be a threaded shaft or a threaded hole.

The movable member 530 and the force-bearing member 550 may be fixedly connected to the actuating member 540 through integral molding, or they may be fixedly connected through separate molding, such as welding, adhesive bonding, or snap-fitting. To enhance structural strength and simplify mounting, in one example, the movable member 530, the actuating member 540, and the force-bearing member 550 are integrally formed. The actuating member 540 may be plate-shaped, block-shaped, hemispherical, etc. By fixedly connecting the movable member 530, the actuating member 540, and the force-bearing member 550, the movable member 530 can be spirally or cam-engaged with the bottom end of the support rod assembly 100. When an external action is applied to the bottom end of the force-bearing member 550, the entire preliminary opening assembly 500 can be lifted upward while rotating, thereby driving the at least three actuating portions 520 to rotate and push open the at least three support leg assemblies 300. This configuration allows the preliminary opening assembly 500 to simultaneously slide and rotate around the rotational axis when subjected to an external action, and this simple and reliable structure facilitates the preliminary opening of the multi-legged stand.

In some embodiments, to facilitate the preliminary opening assembly 500 colliding with the support surface, the force-bearing member 550 may be a protruding column, a protrusion, etc. When the at least three support leg assemblies 300 are in the folded state, the bottom end of the force-bearing member 550 protrudes from the bottom ends of the support leg assemblies 300 in the folded state.

Figure 8:
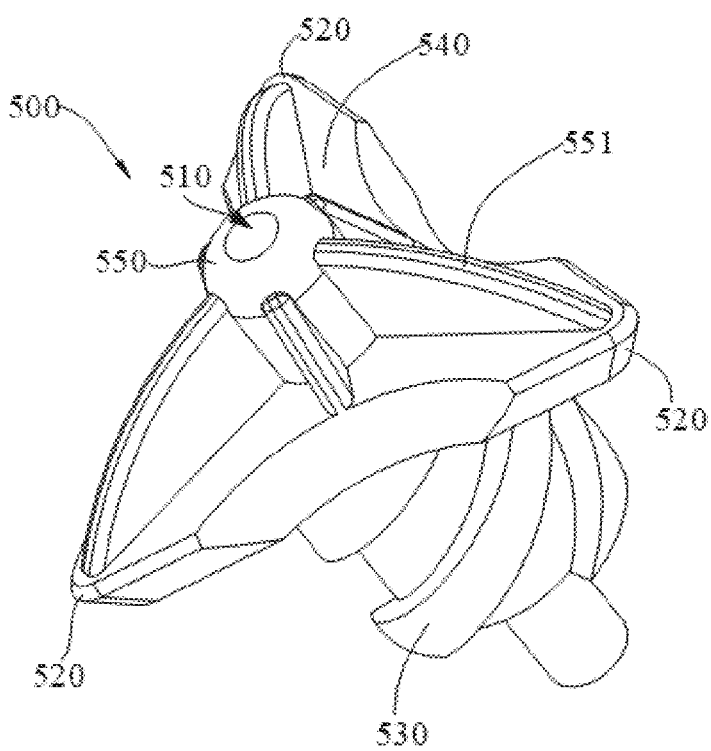
FIG. 8 is a structural schematic view of the preliminary opening assembly shown in FIG. 7 at another viewing angle.

Referring to FIG. 8, the user may further rotate the force-bearing member 550 by applying a torque around its rotational axis, thereby achieving the preliminary opening of the multi-legged stand. In this way, the user can select different opening methods according to actual needs. For example, in scenarios where it is inconvenient to press or strike the preliminary opening assembly 500, the user can rotate the preliminary opening assembly 500 to preliminarily open the at least three support leg assemblies 300, thereby enhancing the product's applicability. To facilitate rotation of the preliminary opening assembly 500, finger gripping slots or gripping spaces may be provided on the force-bearing member 550 or the actuating member 540, allowing the user to grip the preliminary opening assembly 500 and rotate it to achieve the preliminary opening of the at least three support leg assemblies 300.

Specifically, the force-bearing member 550 is arranged with three adjustment plates 551, which are centered symmetrically about the rotational axis of the force-bearing member 550. The three adjustment plates 551 are respectively connected to the corresponding three actuating members 540, and each adjacent two adjustment plates 551 define a grip space. The user's three fingers can be placed into the three grip spaces. The step of preliminarily opening the at least three support leg assemblies 300 relative to the support rod assembly 100 may include: rotating the user's arm to apply a rotational torque around the rotational axis of the preliminary opening assembly 500, causing the three adjustment plates 551 to rotate around the rotational axis of the preliminary opening assembly 500, thereby rotating the preliminary opening assembly 500 and causing the at least three support leg assemblies 300 to be preliminarily opened relative to the support rod assembly 100.

The elastic member 600 may be a reset spring, such as a compression spring, torsion spring, or conical spring, and the elastic member 600 may be a rubber airbag or rubber elastic member, provided that it can provide elastic force to the movable member 530. Specifically, the elastic member 600 is sandwiched between the preliminary opening assembly 500 and the support rod assembly 100, and the elastic recovery direction of the elastic member 600 is set along the extension direction of the rotational axis. By arranging the elastic member 600, the preliminary opening assembly 500 can automatically return to the initial position via the elastic force after the external action is removed, without requiring manual reset of the preliminary opening assembly 500. It can be understood that the external action shall be greater than a sum of the elastic force exerted by the elastic member 600 on the preliminary opening assembly 500 and the friction force between the sliding sleeve assembly 200 and the support rod assembly 100, such that the preliminary opening assembly 500 can move upward relative to the support rod assembly 100.

In some embodiments, the movable member 530 includes a mounting column 533, and the threads of the preliminary opening assembly 500 are arranged on the mounting column 533. The support rod assembly 100 defines a mounting cavity 103, where the mounting column 533 of the movable member 530 is arranged in the mounting cavity 103, and the threads of the support rod assembly 100 are arranged on the cavity wall of the mounting cavity 103. The mounting column 533 defines an accommodation cavity 502, which is in communication with one end of the mounting column 533, and the at least three actuating members 540 are connected to the mounting column 533. The mounting column 533 has a first abutment wall, which is disposed within the accommodation cavity 502. The support rod assembly 100 has a second abutment wall, which is disposed within the mounting cavity 103. The elastic member 600 is a reset spring, which may be a cylindrical spring or a tower spring. A first end of the reset spring is received within the accommodation cavity 502, with the first end abutting against the first abutment wall and a second end abutting against the second abutment wall. During the process of the preliminary opening assembly 500 rotating from the initial position to the second position, the mounting column 533 moves toward the second abutment wall, and the reset spring is compressed. It can be understood that the mounting column 533 is arranged in the mounting cavity 103, and the first end of the reset spring is received in the accommodation cavity 502, such that the reset spring is at least partially received within the accommodation cavity 502, thereby ensuring a compact overall structure of the multi-legged stand. For example, the cylindrical spring may be a circular cylindrical spring, a square cylindrical spring, a polygonal cylindrical spring, etc., and the tower spring may be a conical spring, a frustoconical spring, a polygonal tower spring, etc. The force exerted by the reset spring on the preliminary opening assembly 500 is a force acting on the preliminary opening assembly 500 along the rotational axis, and this force is a thrust exerted by the reset spring on the preliminary opening assembly 500. It should be understood that the external action includes a thrust acting on the preliminary opening assembly 500 along the rotational axis, and/or, the external action includes a rotational torque acting on the preliminary opening assembly 500 around the rotational axis. It can be understood that the first end of the reset spring is received in the accommodation cavity, thereby restricting the reset spring to remain within the preliminary opening assembly, ensuring that the reset spring does not easily bend or disengage from its operational position during extension or compression. It can be understood that the reset spring is a cylindrical spring or a tower spring, enabling the reset spring to be easily compressed and preventing the reset spring from obstructing the movement of the preliminary opening assembly.

In other embodiments, the mounting column 520 has a first end surface, and the accommodation cavity 502 is in communication with the first end surface. When the preliminary opening assembly 500 is in the second position, the first end surface is spaced apart from the second abutment wall, and the reset spring 610 is mostly received within the accommodation cavity 502.

Figure 7:
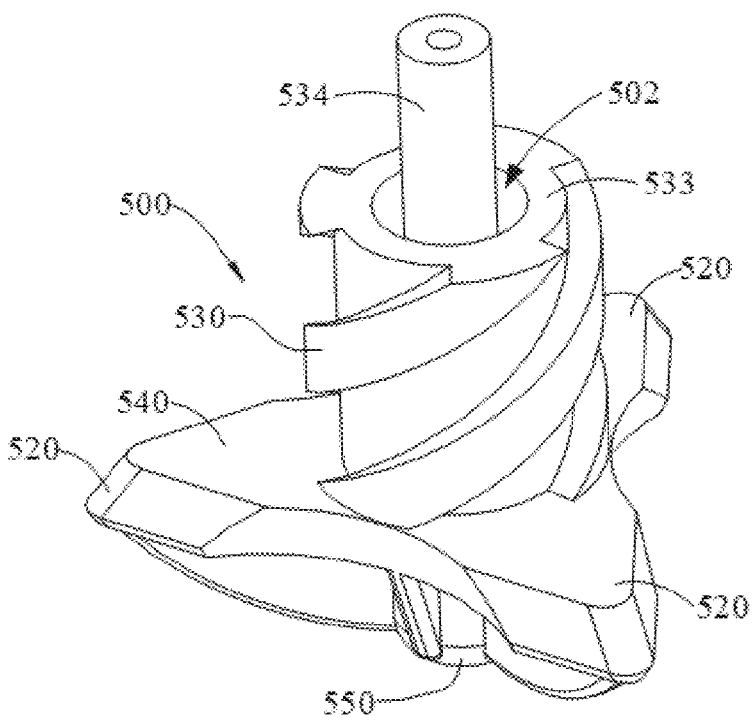
FIG. 7 is a structural schematic view of a preliminary opening assembly in the multi-legged stand shown in FIG. 4.
Figure 9:
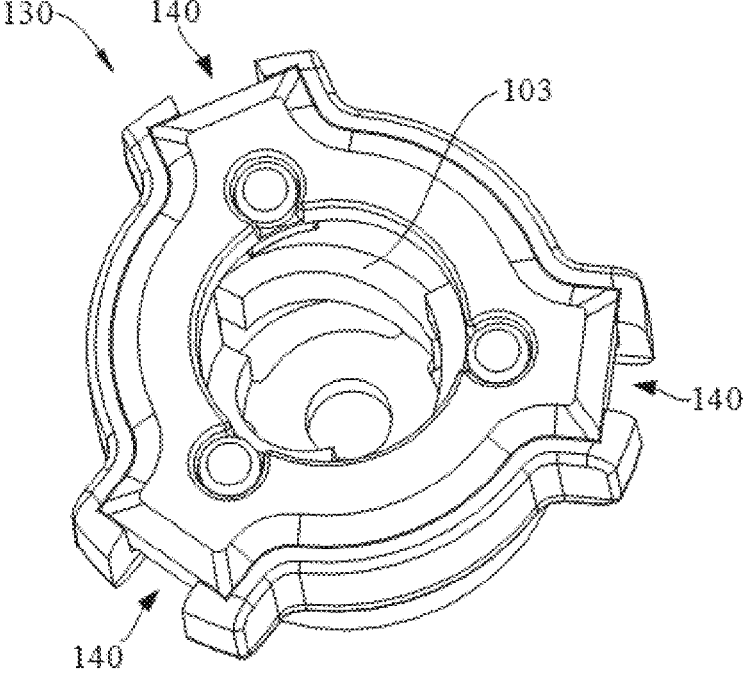
FIG. 9 is a structural schematic view of a mounting member shown in FIG. 5.
Figure 10:
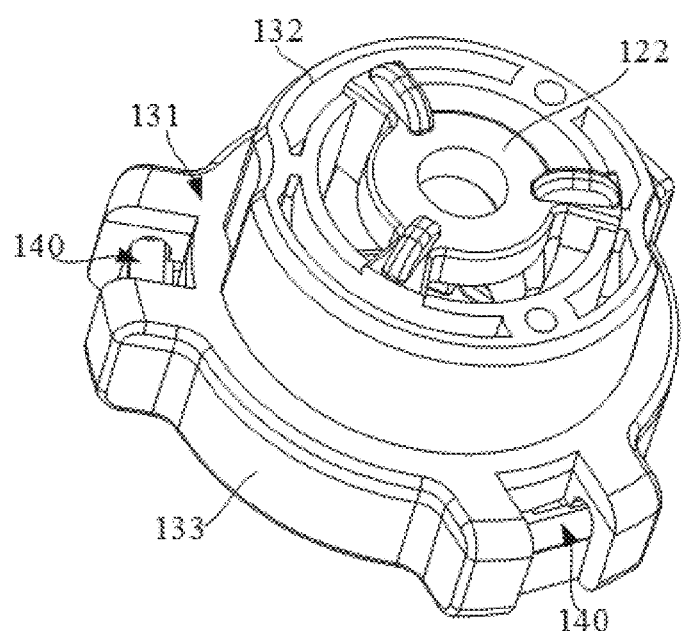
FIG. 10 is a structural schematic view of the mounting member shown in FIG. 9 at another viewing angle.
Figure 11:
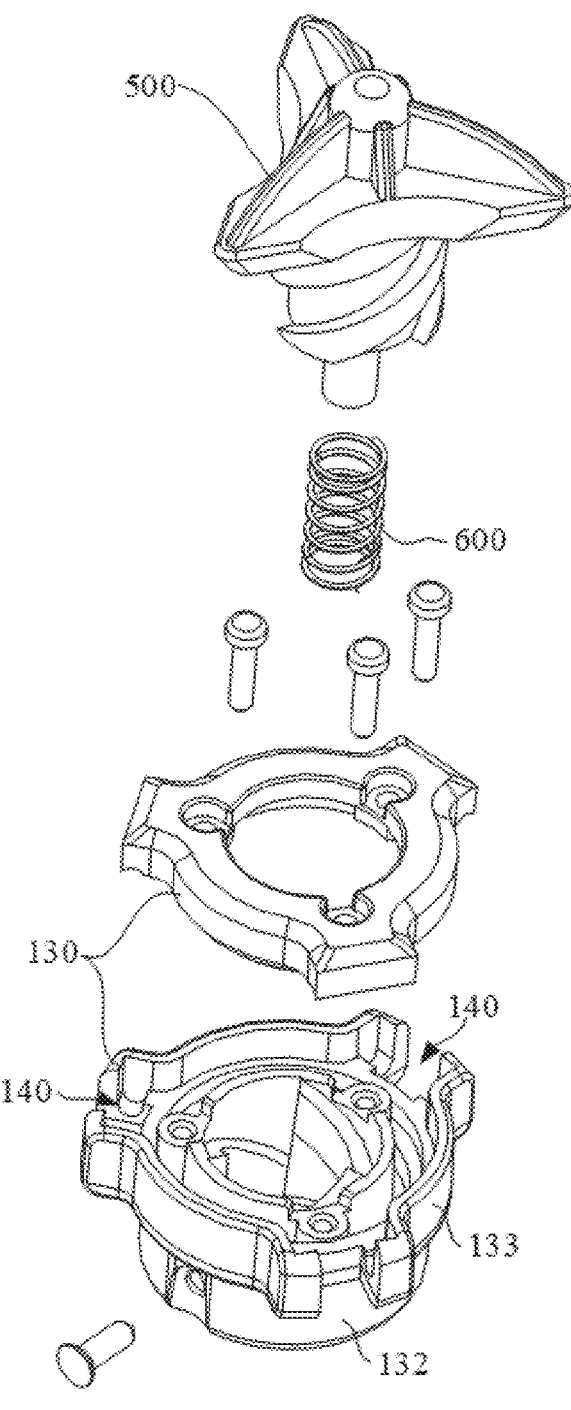
FIG. 11 is an exploded schematic view of a mounting member, a preliminary opening assembly, an elastic member, and other structures shown in FIG. 2.
Figure 12:
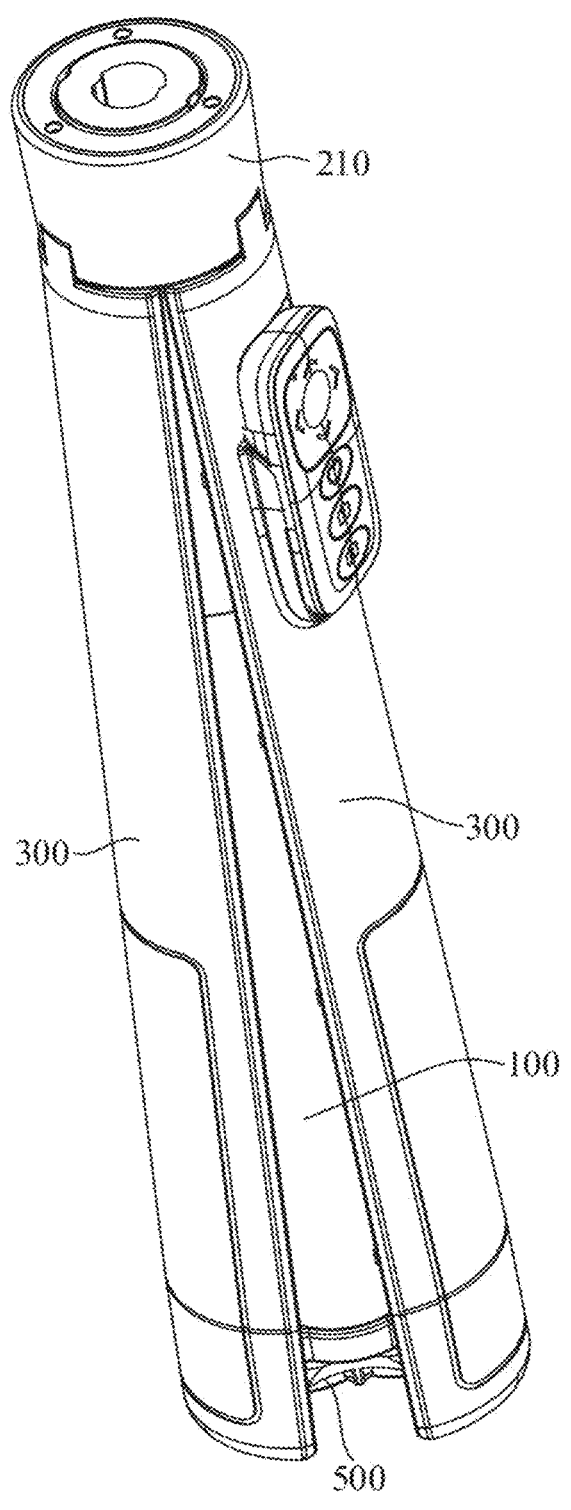
FIG. 12 is a structural schematic view of the multi-legged stand shown in FIG. 1 when the at least three support leg assemblies are in a preliminarily opened state.
Figure 13:
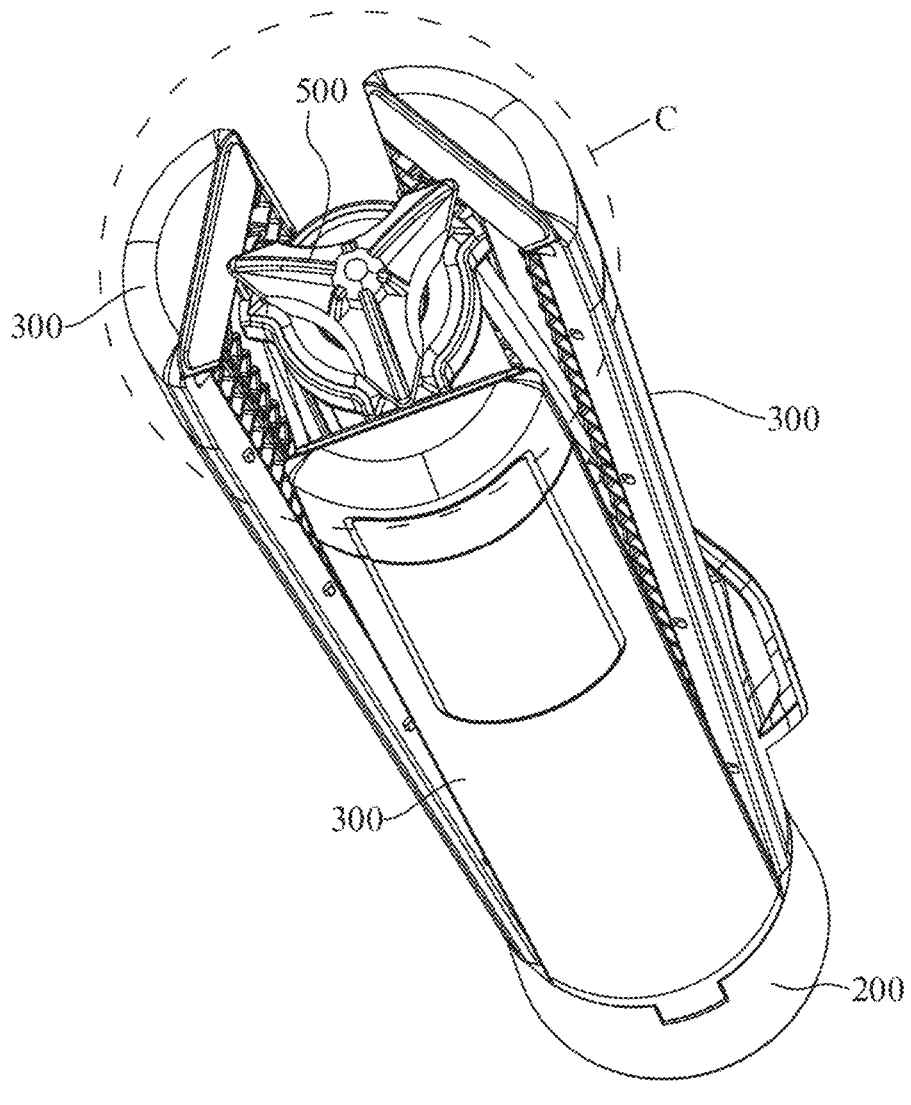
FIG. 13 is a structural schematic view of the multi-legged stand shown in FIG. 12 at another viewing angle.
Figure 14:
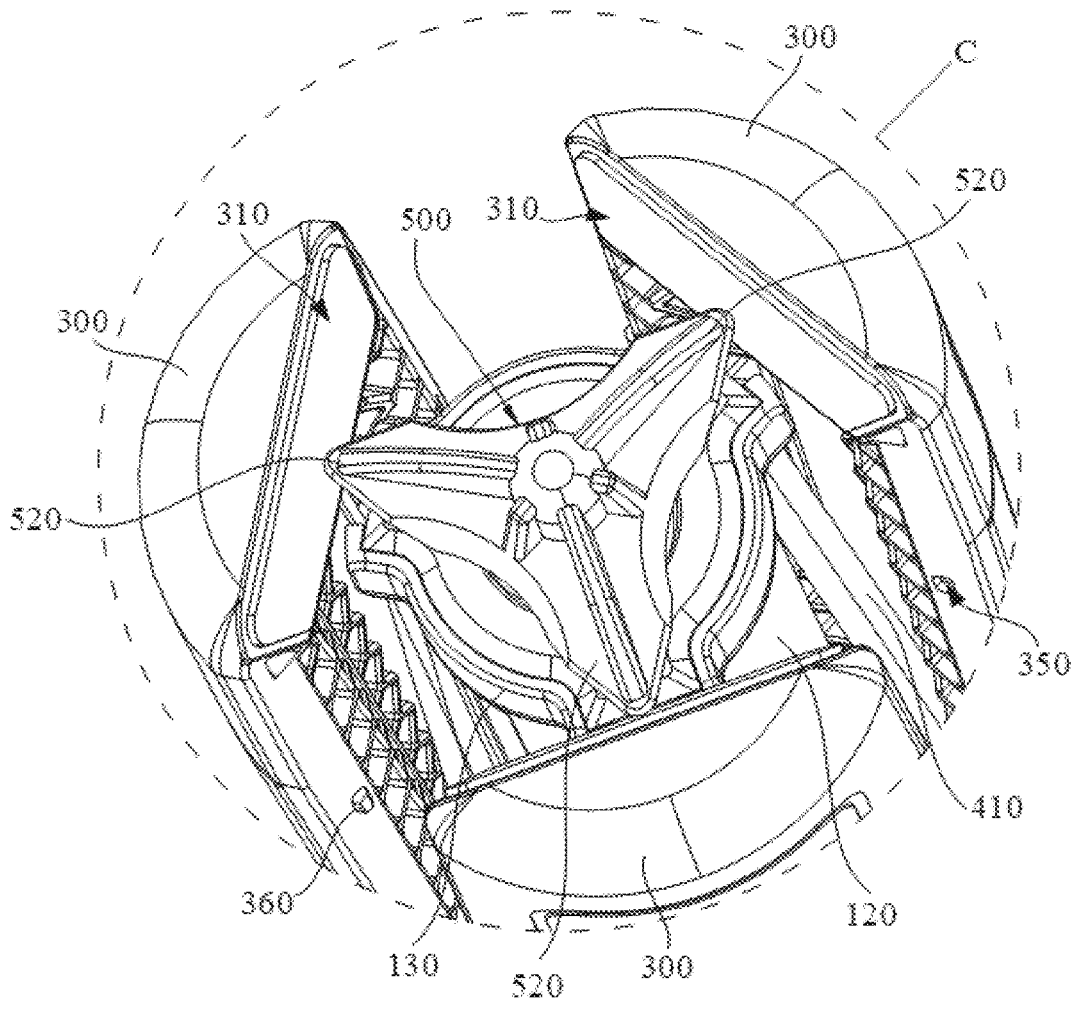
FIG. 14 is an enlarged view of the structure at position C shown in FIG. 13.

Referring to FIGS. 6, 7, and 9, the movable member 530 further includes a connecting column 534, which is connected to the mounting column 533. An end of the connecting column 534 is received within the accommodation cavity 502, and the reset spring is sleeved on the connecting column 534. The support rod assembly 100 includes a retaining portion 122, which defines a through hole 103. The connecting column 534 passes through the through hole 103. The retaining portion 122 is arranged with the second abutment wall and configured to retain the connecting column when the preliminary opening assembly is in the initial position. The multi-legged stand further includes a first fastener 620, which is securely connected to the connecting column 534. A first head portion of the first fastener 620 and the mounting column of the preliminary opening assembly 500 are disposed on opposite sides of the retaining portion 122. During the process of the preliminary opening assembly 500 returning from the second position to the initial position, the reset spring acts on the preliminary opening assembly 500, causing the first head portion of the first fastener 620 to move toward the retaining portion 122. When the preliminary opening assembly 500 is in the initial position, the first head portion of the first fastener 620 abuts against the retaining portion 122 to retain the connecting column. It can be understood that the retaining portion retaining the connecting column is specifically that the first head portion of the first fastener 620 abuts against the retaining portion 122, thereby allowing the preliminary opening assembly 500 to be arranged in a restricted manner on the support rod assembly 100. This prevents the preliminary opening assembly 500 from detaching from the support rod assembly 100 under the action of the reset spring. The reset spring is sleeved on the connection column 534 to prevent the reset spring from exiting the accommodation cavity 502, ensuring that the reset spring does not bend or disengage from its operational position during extension or compression, thereby maintaining the compact structure of the multi-legged stand.

As can be understood, one end of the connecting column 534 is received in the accommodation cavity 502, the second abutment wall is disposed within the accommodation cavity, and the first end of the reset spring 610 is received in the accommodation cavity 502, thereby ensuring a compact structure of the multi-legged stand.

The fasteners mentioned in the present disclosure may be threaded fasteners or riveted fasteners, such as screws, rivets, etc.

In some embodiments, referring to FIGS. 26-30, the preliminary opening assembly 500 is slidably arranged on the support rod assembly 100. Applying an external action to the preliminary opening assembly 500 can cause it to slide relative to the support rod assembly 100 along the first direction. The preliminary opening assembly 500 includes at least three contact-push portions 570, with the at least three contact-push portions 570 corresponding to the at least one of the support leg assemblies 300 in a one-to-one correspondence. During the process of the preliminary opening assembly 500 moving relative to the support rod assembly, the contact-push portions 570 push open the corresponding support leg assemblies 300, causing the at least three support leg assemblies 300 to be switched from the folded state to the preliminarily opened state relative to the support rod assembly 100. During the process of the preliminary opening assembly 500 moving from the initial position to a third position, the contact-push portions 570 push the corresponding support leg assemblies 300 to cause the at least three support leg assemblies 300 to be switched from the folded state to the preliminarily opened state relative to the support rod assembly 100. It should be understood that the initial position of the preliminary opening assembly 500 may refer to a specific position or a position range; the third position of the preliminary opening assembly 500 may refer to a specific position or a position range, such as any position that allows the support leg assemblies to be preliminarily opened relative to the support rod assembly.

It can be understood that the preliminary opening assembly 500 is slidable relative to the support rod assembly 100 to cause the at least three support leg assemblies 300 to be preliminarily opened relative to the support rod assembly 100, thereby allowing at least three support leg assemblies 300 to more easily splay relative to the support rod assembly 100, and thus facilitating the use of the multi-legged stand.

Understandably, during the process of the contact-push portion 570 pushing open the corresponding support leg assembly 300 to cause the at least three support leg assemblies 300 to be switched from the folded state to the preliminarily opened state relative to the support rod assembly 100, the contact-push portion 570 slides relative to the support rod assembly 100 and pushes open the corresponding support leg assembly 300, causing the at least three support leg assemblies 300 to be switched from the folded state to the preliminarily opened state relative to the support rod assembly 100.

For example, the sliding direction of the preliminary opening assembly 500 is along the length direction of the support rod assembly 100, more specifically, the sliding direction of the preliminary opening assembly 500 is along the central axis of the support rod assembly 100.

In some embodiments, the preliminary opening assembly 500 includes a movable member 530 and an actuating member 540, with the actuating member 540 connected to the movable member 530, e.g., the actuating member 540 is integrally connected to the movable member 530, and the contact-push portions 570 are provided on the actuating member 540.

Figure 30:
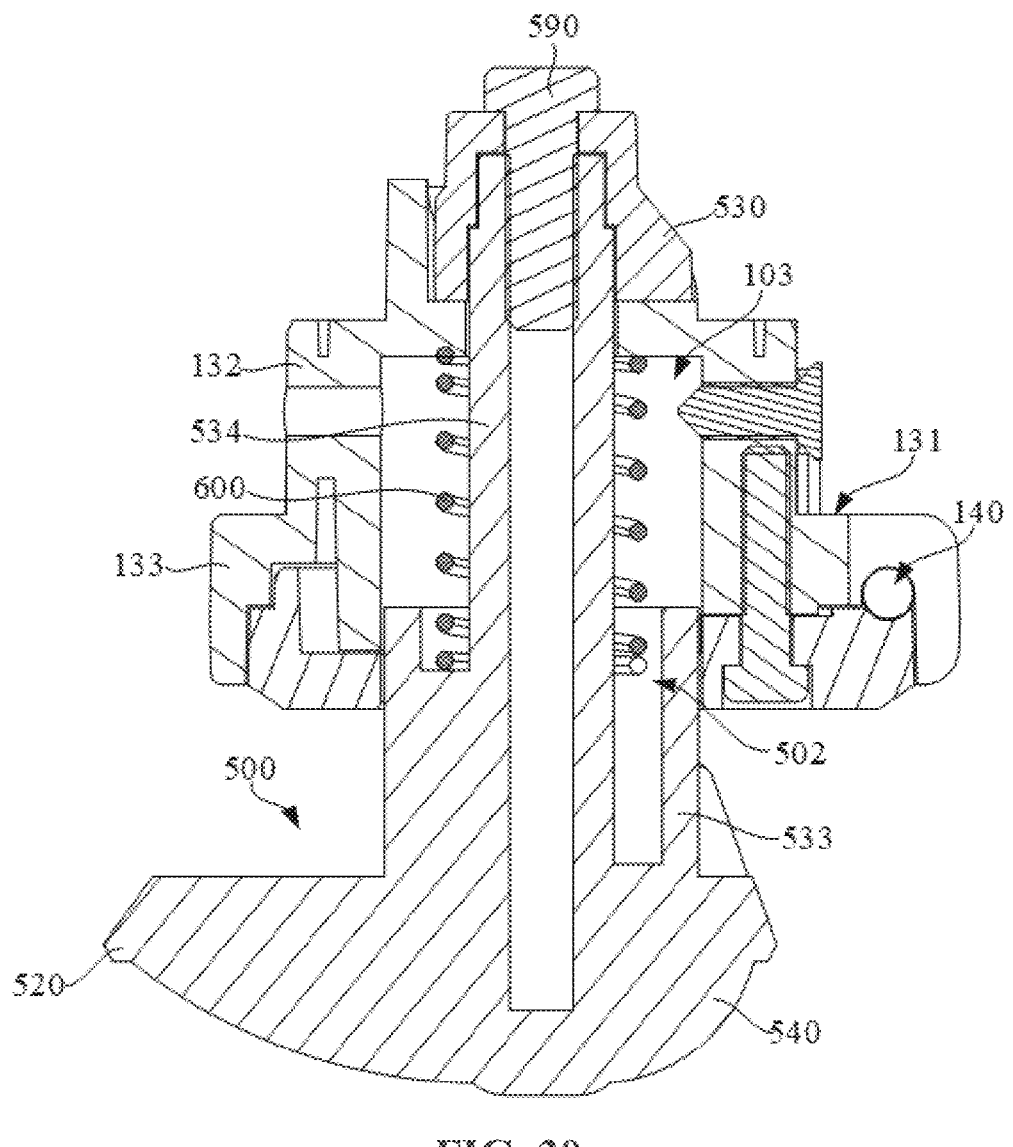
FIG. 30 is a cross-sectional view of the multi-legged stand shown in FIG. 29.

In some embodiments, referring to FIG. 30, etc., the support rod assembly 100 defines a mounting cavity 103, and the movable member 530 slidably mates with the mounting cavity 103 of the support rod assembly 100; or, the movable member 530 defines a mounting cavity 103, and the support rod assembly 100 mates with the mounting cavity 103 of the preliminary opening assembly 500.

Specifically, in the case where the preliminary opening assembly 500 is slidable relative to the support rod assembly 100, the external action includes a force acting on the preliminary opening assembly 500 along the first direction, and applying a force to the preliminary opening assembly 500 can cause it to translate along the first direction relative to the support rod assembly 100. It can be understood that the translational direction of the preliminary opening assembly 500 may be along the first direction, or the translational direction of the preliminary opening assembly 500 may be in the opposite direction of the first direction.

In some embodiments, the external action includes a force acting on the preliminary opening assembly 500 and along the first direction. It can be understood that applying a force in the first direction to the preliminary opening assembly 500 causes the preliminary opening assembly 500 to slide, thereby causing the contact-push portion 570 to push the corresponding support leg assembly 300, such that the at least three support leg assemblies 300 are switched from the folded state to the preliminarily opened state relative to the support rod assembly 100. It can be understood that the external action is entirely a force acting on the preliminary opening assembly 500 and along the first direction, or a component force of the external action is a force acting on the preliminary opening assembly 500 and along the first direction. More specifically, the force may be a thrust directed toward the support rod assembly 100. The user may manually press the preliminary opening assembly 500, or the preliminary opening assembly 500 may collide with the support surface to achieve pressing of the preliminary opening assembly 500. The force may be a pulling force away from the support rod assembly 100, and the user may pull the preliminary opening assembly 500. Understandably, the force shall overcome the resistance encountered by the preliminary opening assembly 500 (which includes the friction resistance between the preliminary opening assembly 500 and the support rod assembly 100) to enable the preliminary opening assembly 500 to translate relative to the support rod assembly 100 in the first direction.

For example, the first direction is along the length direction of the support rod assembly 100. For instance, the preliminary opening assembly 500 is arranged on the bottom end of the support rod assembly 100, and the first direction is a direction in which the bottom end of the support rod assembly 100 points toward the top end.

In some embodiments, referring to FIG. 30, etc., the multi-legged stand further includes an elastic member 600, which is configured to act on the movable member 530, causing the preliminary opening assembly 500 to return to the initial position; the elastic member 600 may be a reset spring, which is sleeved on the movable member 530. It can be understood that the elastic member 600 can cause the preliminary opening assembly 500 to return to its initial position, thereby preventing the preliminary opening assembly 500 from obstructing the folding of the support leg assemblies 300 relative to the support rod assembly 100, specifically, preventing the contact-push portions 570 of the preliminary opening assembly 500 from obstructing the folding of the support leg assemblies 300 relative to the support rod assembly 100. For example, the reset spring may be a cylindrical spring, a tower spring, a torsion spring, etc. In some cases, the reset spring is a cylindrical spring or a tower spring. The reset spring acts on the preliminary opening assembly 500 by exerting a force along the translational direction of the preliminary opening assembly 500. This force is either a pulling force or a pushing force (thrust) exerted by the reset spring on the preliminary opening assembly 500.

In some embodiments, referring to FIG. 30, the movable member 530 includes a mounting column 533, and the support rod assembly 100 defines a mounting cavity 103. The mounting column 533 is slidably arranged in the mounting cavity 103, and the at least three contact-push portions 570 are connected to the mounting column 533. The mounting column 533 has a first abutment wall, which is disposed within the mounting cavity 103, and the support rod assembly 100 has a second abutment wall. The reset spring is a cylindrical spring or a tower spring, with its first end abutting against the first abutment wall 503 and its second end abutting against the second abutment wall. During the process of the preliminary opening assembly 500 sliding to preliminarily open the support leg assemblies 300, the mounting column 533 moves toward the second abutment wall, and the reset spring is compressed. It can be understood that the mounting column 533 is slidably arranged in the mounting cavity 103, and the reset spring is a cylindrical spring or a tower spring, enabling the reset spring to be easily compressed and preventing it from obstructing the translational motion of the preliminary opening assembly 500. For example, the cylindrical spring may be a circular cylindrical spring, a square cylindrical spring, a polygonal cylindrical spring, etc., and the tower spring may be a conical spring, a frustoconical spring, a polygonal tower spring, etc. The force exerted by the reset spring on the preliminary opening assembly 500 is a force acting on the preliminary opening assembly 500 along its translational direction, and this force is a thrust exerted by the reset spring on the preliminary opening assembly 500. It should be understood that external actions include a thrust acting on the preliminary opening assembly 500 along the translational direction.

In some embodiments, referring to FIG. 30, the mounting column 533 defines an accommodation cavity 502, which is in communication with one end of the mounting column 533, and the second abutment wall is disposed in the accommodation cavity 502. The first end of the reset spring is received in the accommodation cavity 502. It can be understood that the first end of the reset spring is received within the accommodation cavity 502, such that the reset spring is at least partially received within the accommodation cavity 502, thereby ensuring a compact overall structure of the multi-legged stand. Furthermore, the first end of the reset spring is received within the accommodation cavity 502, thereby restricting the reset spring to remain within the preliminary opening assembly 500. This prevents the reset spring from bending or disengaging from its operational position during extension or compression.

In some embodiments, referring to FIG. 30, the movable member 530 further includes a connecting column 534, which is connected to the mounting column 533, and the reset spring is sleeved on the connecting column 534. The support rod assembly 100 includes a retaining portion 122. When the preliminary opening assembly 500 is in the initial position, the retaining portion 122 retains the connecting column 534 to prevent the preliminary opening assembly 500 from separating from the support rod assembly 100. The movable member 530 further includes a stop member 580 arranged on the connecting column 534. When the preliminary opening assembly 500 is in its initial position, the stop member 580 abuts against the retaining portion 122 to achieve the retaining portion 122 retaining the connecting column 534. During the process of the preliminary opening assembly 500 returning to its initial position, the reset spring acts on the preliminary opening assembly 500 to cause the stop member 580 to move toward the retaining portion 122. It can be understood that the retaining portion 122 retains the connecting column 534 of the preliminary opening assembly 500, thereby allowing the preliminary opening assembly 500 to be arranged in a restricted manner on the support rod assembly 100. This prevents the preliminary opening assembly 500 from detaching from the support rod assembly 100 under the action of the reset spring. The reset spring is sleeved on the connecting column 534, ensuring that the reset spring does not easily bend or disengage from its operational position during extension or compression, and thus contributing to a compact structure of the multi-legged stand.

For example, the preliminary opening assembly 500 further includes a fourth fastener 590, which passes through the stop member 580 and is securely connected to the connecting column 534. The fourth fastener 590 is configured to mount the stop member 580 on the connecting column 534. For example, the connecting column 534 is slidably arranged on the support rod assembly, which has a through hole. The connecting column 534 is slidably arranged in the through hole of the support rod assembly, enabling the preliminary opening assembly to be slidably arranged on the support rod assembly. Specifically, the through hole is disposed on a first mounting portion 132 of the mounting member 130.

In some embodiments, referring to FIG. 30, etc., when the preliminary opening assembly 500 is in its initial position, the connecting column 534 directly or indirectly abuts against the retaining portion 122.

In some embodiments, referring to FIG. 30, etc., an end of the connecting column 534 is received in the accommodation cavity 502, and the mounting member 130 is arranged with the retaining portion 122. When the preliminary opening assembly 500 is in its initial position, the retaining portion 122 retains the connecting column 534.

In some embodiments, referring to FIG. 30, etc., the preliminary opening assembly 500 further includes a force-bearing member 550, which has a force-bearing portion 510. The external action includes a force acting on the preliminary opening assembly 500 along the first direction. Applying pressure along the first direction to the force-bearing portion 510 causes the preliminary opening assembly 500 to translate along the first direction relative to the support rod assembly 100, thereby allowing the preliminary opening assembly 500 to slide and preliminarily open the support leg assemblies 300. It can be understood that the user can apply pressure to the force-bearing portion 510, thereby preliminarily opening the support leg assemblies 300 relative to the support rod assembly 100, facilitating the use of the multi-legged stand. For example, the user presses the force-bearing portion 510 with his/her hand, or the user strikes the support surface to apply pressure to the preliminary opening assembly 500.

In some embodiments, referring to FIGS. 29 and 30, the preliminary opening assembly 500 can rotate relative to the support rod assembly 100 around the rotational axis, with the first direction along the rotational axis. The preliminary opening assembly 500 includes at least three actuating portions 520. The ability of the preliminary opening assembly 500 to rotate around the rotational axis relative to the support rod assembly 100 allows the actuating portions 520 to push open the corresponding support leg assemblies 300, thereby causing the at least three support leg assemblies 300 to be switched from the folded state to the preliminarily opened state relative to the support rod assembly 100. The external action includes a rotational torque acting on the preliminary opening assembly 500 and rotating around the rotational axis. It can be understood that the number of the actuating portions 520 is the same as the number of contact-push portions 570. In some embodiments, during the rotation of the preliminary opening assembly 500 from the initial position to the second position, the preliminary opening assembly 500 pushes open the at least three support leg assembly 100, causing the at least three support leg assemblies 300 to be switched from the folded state to the preliminarily opened state relative to the support rod assembly 100. It can be understood that the initial position of the preliminary opening assembly 500 may refer to a specific position or a position range; the second position of the preliminary opening assembly 500 may refer to a specific position or a position range. For example, any position that allows the support leg assemblies 300 to be in the preliminarily opened state may be considered the second position of the preliminary opening assembly 500.

In some embodiments, the at least three actuating portions 520 are arranged in an alternating pattern with the at least three contact-push portions 570, with each actuating member 520 located between corresponding two adjacent contact-push portions 570, and each contact-push portion 570 located between corresponding two adjacent actuating portions 520.

In some implementations, referring to FIGS. 29 and 30, during the rotation of the preliminary opening assembly 500 relative to the support rod assembly 100, the preliminary opening assembly 500 may remain in any one of at least three retained positions, with the number of the retained positions being the same as the number of support leg assemblies 300; any one of the at least three retained positions is the initial position.

It should be understood that any one of the at least three retained positions is the initial position, i.e., the preliminary opening assembly 500 in any retained position is equivalent to the preliminary opening assembly 500 in the initial position. The rotation of the preliminary opening assembly 500 causes the actuating portion 520 to actuate the corresponding support leg assembly 300, or the translation of the preliminary opening assembly 500 in the first direction causes the contact-push portion 570 to push the corresponding support leg assembly 300.

It can be understood that the support leg assembly 300 corresponding to the actuating portion 520 of the preliminary opening assembly 500 is different when the preliminary opening assembly 500 is in different corresponding retained positions, and the support leg assembly 300 corresponding to the contact-push portion 570 of the preliminary opening assembly 500 is different when the preliminary opening assembly 500 is in different corresponding retained positions, For example, the number of the support leg assemblies 300 may be 3, 4, 5, etc., and the number of the retained positions may be 3, 4, 5, etc.

It can be understood that the retained position may refer to a specific position or a position range. During the rotation of the preliminary opening assembly 500 relative to the support rod assembly 100, the preliminary opening assembly 500 remains at the retained position without any external action being applied to it. Alternatively, during the rotation of the preliminary opening assembly 500 relative to the support rod assembly 100, when the rotational torque of the external action is less than the holding torque of the preliminary opening assembly 500, the preliminary opening assembly 500 remains in the retained position.

In some embodiments, referring to FIGS. 29 and 30, the multi-legged stand further includes an elastic member 600, which may be a reset spring. The elastic member 600 acts on the preliminary opening assembly 500 to cause it to return to the initial position. The movable member 530 includes a first snap-fitting portion 581, and the support rod assembly 100 includes a second snap-fitting portion 122a. The first snap-fitting portion 581 can be snap-fitted at different positions on the second snap-fitting portion 122a to keep the preliminary opening assembly 500 at different retained positions. When the external action is applied to the preliminary opening assembly 500 to rotate it relative to the support rod assembly 100, the preliminary opening assembly 500 slides relative to the support rod assembly 100 while the reset spring extends or retracts, causing the first snap-fitting portion 581 to disengage or engage with the second snap-fitting portion 122a. When the preliminary opening assembly 500 stops rotating relative to the support rod assembly 100, the reset spring acts on the preliminary opening assembly 500 to cause the first snap-fitting portion 581 to engage with the second snap-fitting portion 122a, and the reset spring causes the preliminary opening assembly 500 to return to its initial position.

It can be understood that the reset spring, on the one hand, causes the first snap-fitting portion 581 to be snap-fitted with the second snap-fitting portion 122a, and on the other hand, the extension and retraction deformation of the reset spring facilitates the first snap-fitting portion 581 to disengage from the second snap-fitting portion 122a. During the process of the first snap-fitting portion 581 being snap-fitted with the second snap-fitting portion 122a or during the process of the first snap-fitting portion 581 disengaging from the second snap-fitting portion 122a, the reset spring undergoes extension and retraction deformation. The multiple functions of the reset spring contribute to the compact structure of the multi-legged stand.

It is understood that the first snap-fitting portion 581 may be snap-fitted on at least three positions on the second snap-fitting portion 122a, enabling the preliminary opening assembly 500 to be maintained in the at least three retained positions.

For example, the first snap-fitting portion 581 is arranged on the stop member 580 of the preliminary opening assembly 500, and the second snap-fitting portion 122a is arranged on the mounting member 130 of the support rod assembly 100, more specifically, the second snap-fitting portion 122a is arranged on the retaining portion 122.

In some embodiments, referring to FIG. 29, etc., the first snap-fitting portion 581 includes at least one first snap-fitting protrusion, and the second snap-fitting portion 122a includes at least three second snap-fitting grooves. The at least one first snap-fitting protrusion can be retained in different second snap-fitting grooves to retain the first snap-fitting portion 581 at different positions of the second snap-fitting portion 122a. The second snap-fitting grooves are each open-sided with its cross-section reducing from the top end to the bottom end to facilitate the disengagement of the first snap-fitting protrusion from the second snap-fitting grooves during the rotation of the preliminary opening assembly 500 relative to the support rod assembly 100. During the rotation of the preliminary opening assembly 500 relative to the support rod assembly 100, causing the first snap-fitting protrusion to disengage from the second snap-fitting groove, the first snap-fitting protrusion slides past the inner walls of the second snap-fitting groove. When the preliminary opening assembly 500 stops rotating relative to the support rod assembly 100, the elastic member acts on the preliminary opening assembly 500 to cause the at least one first snap-fitting protrusion to engage into a corresponding second snap-fitting groove.

It can be understood that the second snap-fitting groove is open-sided with its cross-section reducing from the top end to the bottom end, facilitating the disengagement of the first snap-fitting protrusion from the second snap-fitting grooves during the process of applying the external action to the preliminary opening assembly 500 to rotate it relative to the support rod assembly 100. For example, the second snap-fitting grooves are V-shaped.

In other embodiments, the first snap-fitting portion 581 includes at least three first snap-fitting grooves, and the second snap-fitting portion 122a includes at least one second snap-fitting protrusion. The at least one second snap-fitting protrusion can be retained in different first snap-fitting grooves to retain the first snap-fitting portion 581 at different positions on the second snap-fitting portion 122a. The first snap-fitting groove is open-sided with its cross-section reducing from the top end to the bottom end. During the process of applying the external action to the preliminary opening assembly 500 to rotate the preliminary opening assembly 500 relative to the support rod assembly 100, the second snap-fitting protrusion slides past the inner wall of the first snap-fitting groove. It can be understood that the first snap-fitting groove is open-sided with its cross-section reducing from the top end to the bottom end to facilitate the second snap-fitting protrusion disengaging from the first snap-fitting groove during the process of applying the external action to the preliminary opening assembly 500 to rotate the preliminary opening assembly 500 relative to the support rod assembly 100. During the rotation of the preliminary opening assembly 500 relative to the support rod assembly 100, causing the second snap-fitting protrusion to disengage from the first snap-fitting groove, the second snap-fitting protrusion slides past the inner wall of the first snap-fitting groove. When the preliminary opening assembly 500 stops rotating relative to the support rod assembly 100, the reset spring acts on the preliminary opening assembly 500 to cause the at least one second snap-fitting protrusion to engage into a corresponding first snap-fitting groove. For example, the first snap-fitting groove is V-shaped.

In some embodiments, as shown in FIG. 29, the support rod assembly 100 includes at least three partitioning protrusions 122b, which are arranged in an alternating pattern with the at least three second snap-fitting grooves 122a. A space between each adjacent two partitioning protrusions 122b defines a corresponding second snap-fitting groove. The partitioning protrusion 122b gradually narrows along the first direction, and a first side portion 581a of the first snap-fitting protrusion gradually narrows in the opposite direction of the first direction, such that when the preliminary opening assembly 500 stops rotating relative to the support rod assembly 100, the at least one first snap-fitting protrusion is engaged into a corresponding second snap-fitting groove. The first side portion 581*a* of the first snap-fitting protrusion is disposed on a side of the first snap-fitting protrusion adjacent to the partitioning protrusion 122*b*.

It can be understood that the partitioning protrusion 122*b* and the first side portion of the first snap-fitting protrusion both gradually taper, facilitating the insertion of the first snap-fitting protrusion into the second snap-fitting groove. It can be understood that the inner wall of the second snap-fitting groove is on the partitioning protrusion, and the retaining portion includes the partitioning protrusion 122*b*.

It can be understood that when the preliminary opening assembly 500 is rotated relative to the support rod assembly 100 to an arbitrary angle, under the action of the reset spring, the first snap-fitting protrusion of the preliminary opening assembly 500 can all be locked into and disengaged from the second snap-fitting groove. For example, when the preliminary opening assembly 500 is rotated to a certain angle, the first snap-fitting protrusion aligns precisely with the second snap-fitting groove, and under the action of the reset spring, the first snap-fitting protrusion of the preliminary opening assembly 500 engages into the second snap-fitting groove. In another example, when the preliminary opening assembly 500 is rotated to another angle, the second snap-fitting protrusion is not aligned with the second snap-fitting groove; under the action of the reset spring, the first snap-fitting protrusion of the preliminary opening assembly 500 is engaged into the second snap-fitting groove. During this process, the preliminary opening assembly 500 keeps rotating.

In some embodiments, referring to FIG. 29, etc., the preliminary opening assembly 500 includes a stop member 580, and the support rod assembly 100 includes a retaining portion 122. When the preliminary opening assembly 500 is in the initial position, the retaining portion 122 retains the stop member 580 to prevent the preliminary opening assembly 500 from separating from the support rod assembly 100. The stop member 580 includes a first snap-fitting portion 581, and the retaining portion 122 includes a second snap-fitting portion 122*a*. The second snap-fitting portion 122*a* retains the first snap-fitting portion 581 to ensure that the retaining portion 122 retains the stop member 580. It can be understood that the first snap-fitting portion 581 and the second snap-fitting portion 122*a* are configured both to keep the preliminary opening assembly 500 in different retained positions and to prevent the preliminary opening assembly 500 from detaching from the support rod assembly 100, thereby making the structure of the multi-legged stand compact.

In some embodiments, as shown in FIG. 29, during the rotation of the preliminary opening assembly 500 relative to the support rod assembly 100, the preliminary opening assembly 500 can remain in any one of the at least three retained positions, with the number of retained positions being the same as the number of support leg assemblies 300; any one of the at least three retained positions is the initial position.

It should be understood that any one of the at least three retained positions is the initial position, i.e., the preliminary opening assembly 500 in any retained position is equivalent to the preliminary opening assembly 500 in the initial position. The translation of the preliminary opening assembly 500 in the first direction causes the contact-push portion 570 to push the corresponding support leg assembly 300.

Referring to FIG. 29, the user may further operate the force-bearing member 550 (in the form of a knob), i.e., apply a torque to the force-bearing member 550 around its rotational axis, to achieve the preliminary opening of the multi-legged stand. In this way, the user can select different opening methods according to actual needs. For example, in scenarios where it is inconvenient to press or strike the preliminary opening assembly 500, the user can rotate the preliminary opening assembly 500 to preliminarily open the at least three support leg assemblies 300, thereby enhancing the product's applicability. To facilitate rotation of the preliminary opening assembly 500, finger gripping slots or gripping spaces may be provided on the force-bearing member 550 or the actuating member 540, allowing the user to grip the preliminary opening assembly 500 and rotate it to achieve the preliminary opening of the at least three support leg assemblies 300.

Specifically, the force-bearing member 550 is arranged with three adjustment plates 551, which are centered symmetrically about the rotational axis of the force-bearing member 550. The three adjustment plates 551 are respectively connected to the corresponding three actuating members 540, and each adjacent two adjustment plates 551 define a grip space. The user's three fingers can be placed into the three grip spaces. The step of preliminarily opening the at least three support leg assemblies 300 relative to the support rod assembly 100 may include: rotating the user's arm to apply a rotational torque around the rotational axis of the preliminary opening assembly 500, causing the three adjustment plates 551 to rotate around the rotational axis of the preliminary opening assembly 500, thereby rotating the preliminary opening assembly 500 and causing the at least three support leg assemblies 300 to be preliminarily opened relative to the support rod assembly 100.

In some embodiments, referring to FIG. 1-25 or 30, the preliminary opening assembly 500 is rotatably arranged on the support rod assembly 100 in a restricted manner, such that the preliminary opening assembly 500 cannot exceed the initial position or the second position. For example, when the preliminary opening assembly 500 is in the initial position, the preliminary opening assembly 500 directly or indirectly abuts against the support rod assembly 100. For example, when the preliminary opening assembly 500 is in the second position, the preliminary opening assembly 500 directly or indirectly abuts against the support rod assembly 100.

In other embodiments, referring to FIGS. 31 to 35, the preliminary opening assembly 500 includes a movable member 530 and an actuating member 540. The movable member 530 is slidable relative to the support rod assembly 100 to drive the actuating member 540 to rotate around the rotational axis, where the movable member 530 is slidable along the rotational axis. The movable member 530 is directly or indirectly acted upon by an external action to slide relative to the support rod assembly 100. The external action includes a force pushing the preliminary opening assembly 500 in the first direction, where the first direction is along the rotational axis; it should be understood that the entire or a component force of the external action is a force pushing the preliminary opening assembly 500 in the first direction. In some embodiments, as the actuating member 540 rotates from the initial position to the second position, the actuating member 540 pushes open the at least three support leg assembly 100, causing the at least three support leg assemblies 300 to transition from the folded state to the preliminarily opened state.

In some embodiments, the preliminary opening assembly 500 further includes a force-bearing member 550, which is in peripheral limited engagement around the rotational axis of the movable member 530. The actuating member 540 is arranged with at least three actuating portions 520, and the bottom end of the force-bearing member 550 forms a force-bearing portion 510; the movable member 530 is in a screw-type engagement with the actuating member 540, such that when the force-bearing portion 510 is subjected to an external action, the movable member 530 slides along the rotational axis, thereby driving the actuating member 540 to rotate around the rotational axis.

In some embodiments, the multi-legged stand further includes an elastic member 600, which is configured to provide elastic force to the movable member 530, such that the movable member 530 returns to the initial position via the elastic force after the external action is removed. For example, the movable member 530 is in sliding cooperation with the support rod assembly 100 in an up-down direction, and the elastic member 600 is configured to provide a downward elastic force to the movable member 530, such that when the external action is removed, the elastic force drives the movable member 530 to return to the initial position in a downward direction.

In some embodiments, the movable member 530 and the support rod assembly 100 may be provided with a slide groove and a slide rail that are mutually mating to achieve peripheral positioning and sliding of the movable member 530 and the support rod assembly 100. Since the movable member 530 is peripherally limited relative to the support rod assembly 100 around the rotational axis, when the force-bearing portion 510 is subjected to an external action, the movable member 530 slides without rotating, thereby driving the actuating member 540 to rotate. By designing the movable member 530 and the actuating member 540 as separate structures and having them screw-fit together, the external action applied to the force-bearing portion 510 can cause the actuating member 540 to rotate without sliding, thereby reducing motion resistance and making the preliminary opening operation of the multi-legged stand more effortless. When the user indirectly presses the movable member 522 through the force-bearing member, the force-bearing member does not rotate, reducing friction between the force-bearing member and the user's hand.

Specifically, threads that mate with each other may be provided on the movable member 530 and the actuating member 540 to achieve a screw-type engagement between the movable member 530 and the actuating member 540. For example, the threads on the movable member 530 and the actuating member 540 may be rectangular threads or triangular threads, etc. For example, the movable member 530 is a threaded shaft, and the actuating member 540 has a threaded hole for the threaded shaft to pass through, with the threaded shaft threadedly engaging in the threaded hole. Specifically, the actuating member 540 includes a rotating shaft and an actuating plate, with the actuating plate connected to one end of the rotating shaft. At least three angular portions of the actuating plate form the at least three actuating portions 520. The rotating shaft defines the threaded hole, and the rotating shaft is rotatably connected to the bottom end of the support rod assembly 100. The movable member 530 passes through the actuating plate and is in screw-type engagement with the threaded hole. For example, the actuating plate is disposed below the support rod assembly 100.

For ease of assembly, the force-bearing member 550 may be separately formed from the movable member 530. In this case, the force-bearing member 550 and the movable member 530 may be fixedly connected by screws, snap-fitting, or other means. The force-bearing member 550 may have various forms, such as a columnar structure or a hemispherical structure, which is not specifically limited herein.

The elastic member 600 may be a reset spring, such as a compression spring, a torsion spring, or a conical spring, and the elastic member 600 may be a rubber airbag or a rubber elastic member, provided that it can provide elastic force to the movable member 530 (e.g., downward elastic force to the movable member 530). Specifically, the elastic member 600 is sandwiched between the force-bearing member 550 and the actuating member 540, and the elastic recovery direction of the elastic member 600 is set along the extension direction of the rotational axis. By arranging the elastic member 600, the preliminary opening assembly 500 can automatically return to its initial position via the elastic force after the external action is removed, without requiring manual reset of the preliminary opening assembly 500. It can be understood that the external action shall be greater than a sum of the elastic force exerted by the elastic member 600 on the preliminary opening assembly 500 and the friction force between the sliding sleeve assembly 200 and the support rod assembly 100, such that the movable member 530 can slide relative to the support rod assembly 100 and the actuating member 540 can rotate relative to the support rod assembly 100.

For example, the elastic member 600 is a reset spring, which is sleeved around the outer periphery of the movable member 530.

In other implementations, the movable member 530 is reset by other means, such as the user directly or indirectly pulling the movable member 530 to reset it. In other implementations, the movable member 530 is reset by its own weight, or the movable member 530 is reset by the combined weight of movable member 530 and the force-bearing member 550.

In some implementations, the movable member is indirectly subjected to an external action. The movable member is subjected to an external action through an intermediate member. When the user indirectly presses the movable member 530 through the intermediate member, the movable member 530 and the intermediate member do not rotate, reducing friction between the intermediate member and the user's hand. For example, the intermediate member may serve as the force-bearing member. Furthermore, since the movable member 530 and the actuating member 540 are separate structures, the actuating member 540 is not required to slide, thereby reducing movement resistance. This makes the operation of pushing the movable member 530 more effortless and convenient, thereby simplifying the preliminary opening operation of the multi-legged stand.

In other implementations, the movable member 530 is directly subjected to an external action. When the user directly presses the movable member 530, the movable member 530, which is configured to slide relative to the support rod assembly 100, indirectly drives the actuating member 540 to rotate. Compared to directly applying the external action to the actuating member 540 to cause it to rotate, the movable member 530 in this implementation does not rotate, thereby reducing friction between the movable member 530 and the user's hand.

Furthermore, as shown in FIGS. 33, 34, 38, and 39, the actuating member 540 further includes a rotatable portion 541, with the at least three actuating portions 520 connected to the rotatable portion 541. The rotatable portion 541 is rotatably connected to the bottom end of the support rod assembly 100, and the movable member 530 is in a screw-like engagement with the rotatable portion 541. The elastic member 600 is a reset spring, which is sleeved around the outer periphery of the movable member 530 and sandwiched between the force-bearing member 550 and the actuating member 540.

In some embodiments, the rotatable portion 541 may specifically be cylindrical, stepped cylindrical, or columnar in structure. The at least three actuating portions 520 may specifically be angular portions or protrusions protruding from the outer peripheral wall of the rotatable portion 541. To enhance structural strength, in some embodiments, the rotatable portion 541 is integrally formed with multiple actuating portions 520. To ensure the rotational reliability of the rotatable portion 541 with the support rod assembly 100, specifically, the bottom end of the support rod assembly 100 defines a mounting cavity, and the rotatable portion 541 is rotatably disposed within the mounting cavity. The elastic member 600 is configured as a reset spring, which is elastic, stable, low-cost, and easy to mount. The reset spring may be sandwiched between the force-bearing member 550 and the rotatable portion 541. For example, a groove may be defined on the force-bearing member 550, and a bearing wall may be arranged in the inner cavity of the rotatable portion 541, such that one end of the reset spring is embedded in the groove of the force-bearing member 550, and the other end bears against the bearing wall of the rotatable portion 541.

Furthermore, referring to FIGS. 33, 34, 36, 40, the movable member 530 includes a guide portion 531, which extends from the top end of the actuating member 540 and is slidably connected to the bottom end of the support rod assembly 100. One of the guide portion 531 and the support rod assembly 100 defines a guide slot 110, while the other is arranged with a protrusion 532 that can be slidably connected to the guide slot 110.

In some embodiments, the guide portion 531 extends outward and is exposed at the top surface of the actuating member 540 to be slidably connected to the bottom end of the support rod assembly 100. The protrusion 532 may be arranged on the outer peripheral wall of the guide portion 531, and the guide slot 110 may be defined on the bottom end of the support rod assembly 100; or the guide slot 110 may be defined on the outer peripheral wall of the guide portion 531, and the protrusion 532 may be arranged on the inner wall of the bottom end of the support rod assembly 100. Through the sliding cooperation between the protrusion 532 and the guide slot 110, the movable member 530 achieves sliding and peripheral positioning cooperation with the support rod assembly 100, i.e., the movable member 530 can only slide relative to the support rod assembly 100 and cannot rotate, thereby enabling the actuating member 540 to rotate peripherally when the movable member 530 slides. The form and number of the protrusions 532 are not specifically limited. For example, the protrusion 532 may be elongated, rectangular blocks, etc. To ensure guiding stability, for example, the protrusions 532 are provided in at least two, and the multiple protrusions 532 are peripherally spaced around the guide portion 531.

In some embodiments, the actuating member 540 is arranged on the bottom end of the support rod assembly 100, and the force-bearing portion protrudes from the bottom end of the actuating member 540 in the initial state. When the at least three support leg assemblies 300 are folded relative to the support rod assembly 100, the force-bearing member 526 is received within the space enclosed by the at least three support leg assemblies 300, and the force-bearing member 526 does not protrude from the bottom end of the support leg assemblies 300.

In this example, the multi-legged stand occupies a small volume in the folded state, making it more convenient to store and place the multi-legged stand; it further prevents external objects or people from accidentally touching the force-bearing member in the folded state, such as accidentally touching the force-bearing member and causing the support leg assembly 300 to preliminarily open. For example, in the stored state of the multi-legged stand, since the force-bearing member 526 does not protrude beyond the bottom end of the support leg assembly 300, users can more easily grip the bottom ends of the at least three support leg assemblies, making the multi-legged stand more convenient to use.

In this example, the actuating member 540 is arranged on the bottom end of the support rod assembly 100. In the initial state, the force-bearing member protrudes from the bottom end of the actuating member 540, making it easier for the user to press the movable member 522 to indirectly rotate the actuating member 540.

In this example, when the user presses the force-bearing portion of the force-bearing member 526, the force-bearing member 526 and the movable member 522 slide toward the sliding sleeve assembly; for example, when the support rod assembly is vertically oriented, pressing the force-bearing portion of the force-bearing member 526 causes the force-bearing member 526 and the movable member 522 to slide upward.

In some embodiments, as shown in FIGS. 1-4 and 26, the inner peripheral wall of the support leg assembly 300 is a concave arc surface that mates with the outer peripheral wall of the support rod assembly 100, and the outer peripheral wall of the support leg assembly 300 is a convex arc surface. The outer peripheral walls of the at least three support leg assemblies 300 together form the outer peripheral surface of the multi-legged stand. The at least three support leg assemblies 300 are assembled around the support rod assembly 100.

As a result, each of the support leg assemblies 300 is a generally arc-shaped plate, such that the at least three support leg assemblies 300 can more closely enclose the outer periphery of the support rod assembly 100 when in the folded state. The at least three support leg assemblies 300 are assembled around the support rod assembly 100, meaning that the outer peripheral walls of the at least three support leg assemblies 300 can generally enclose to form a cylindrical surface. In the folded state, the outer peripheral walls of the at least three support leg assemblies 300 collectively form the outer peripheral surface of the multi-legged stand, making it more convenient for users to hold the multi-legged stand. For example, users can hold the at least three support leg assemblies 300 to take photographs.

In combination with the aforementioned support leg assembly 300 with the contact surface 310, further referring to FIGS. 13, 14, 20, 23, 27, and 28, where each actuating portion 520 is located between adjacent support leg assemblies 300, in some embodiments, the contact surface 310 is a plane connecting two joint surfaces of the support leg assemblies 300. Thus, when the actuating member 520 rotates, it can smoothly transition from the joint surface between the adjacent two support leg assemblies 300 to the contact surface 310, enabling the at least three actuating portions 520 to smoothly push open the at least three support leg assemblies 300.

In some embodiments, as shown in FIGS. 5, 6, 9-11, 13-18, 29, and 27-36, the support rod assembly 100 includes a support rod body 120 and a mounting member 130 fixedly connected to the bottom end of the support rod body 120; the sliding sleeve assembly 200 is slidably sleeved on the support rod body 120; the preliminary opening assembly 500 is movably connected to the mounting member 130; the connecting assembly 400 is rotatably connected to the mounting member 130.

There are many ways to fixedly connect the mounting member 130 to the support rod body 120, e.g., the mounting member 130 and the support rod body 120 may be fixedly connected by screws, interference fit, rivets, etc. By providing the mounting member 130 for connecting the preliminary opening assembly 500 and the connecting assembly 400, the bottom connection structure of the support rod assembly 100 may be formed independently, thereby reducing manufacturing costs and facilitating the assembly of the preliminary opening assembly 500 with the support rod assembly 100. Additionally, since the support rod body 120 primarily serves a supporting and guiding function, and the mounting member 130 primarily serves a connecting function, the support rod body 120 and the mounting column may be made from different materials. For example, the support rod body 120 may be made from a metallic material to enhance its structural strength and reduce sliding friction with the sliding sleeve assembly 200, while the mounting member 130 may be made from a plastic material to reduce the manufacturing cost of the mounting member 130.

Figure 5:
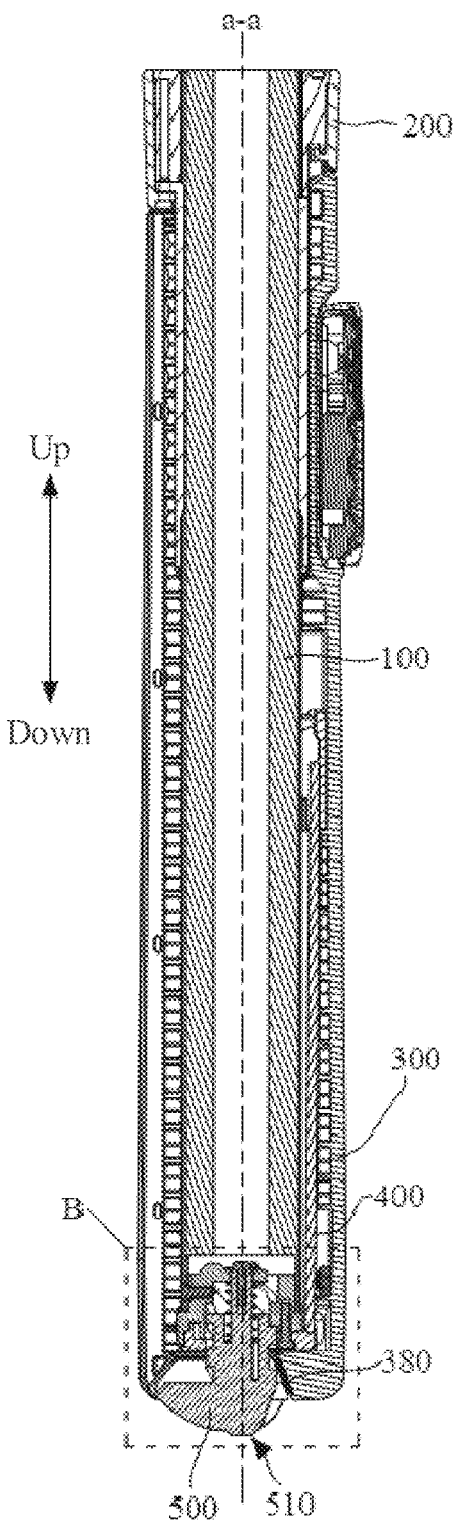
FIG. 5 is a cross-sectional view of the multi-legged stand shown in FIG. 4 along an I-I line.
Figures 18, 19:
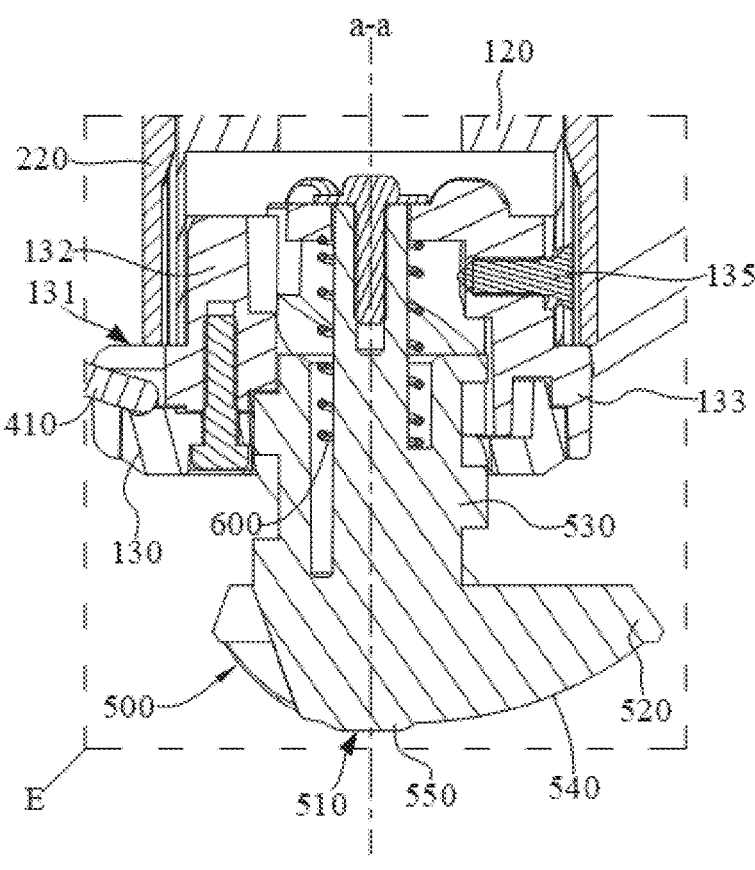
FIG. 18 is an enlarged view of the structure at position E shown in FIG. 17.
FIG. 19 is a structural schematic view of a sliding sleeve assembly in the multi-legged stand shown in FIG. 12.
Figure 20:
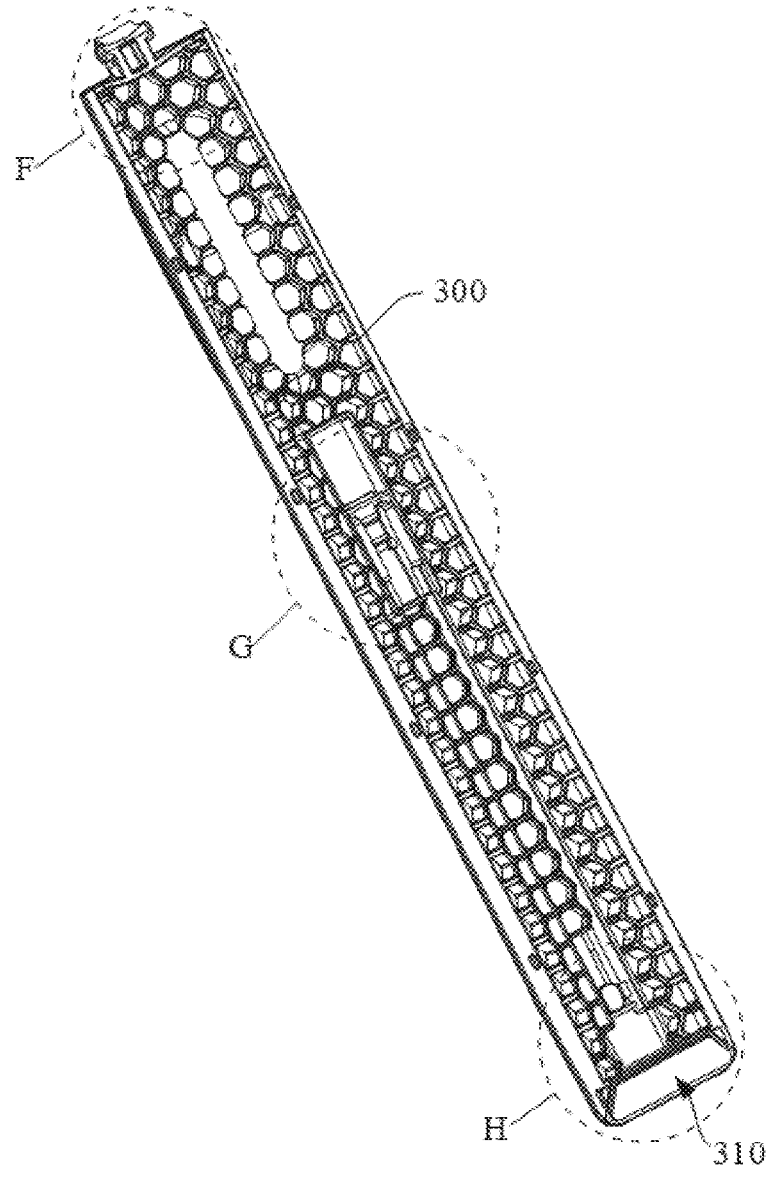
FIG. 20 is a structural schematic view of the support leg assembly in the multi-legged stand shown in FIG. 12.
Figure 21:
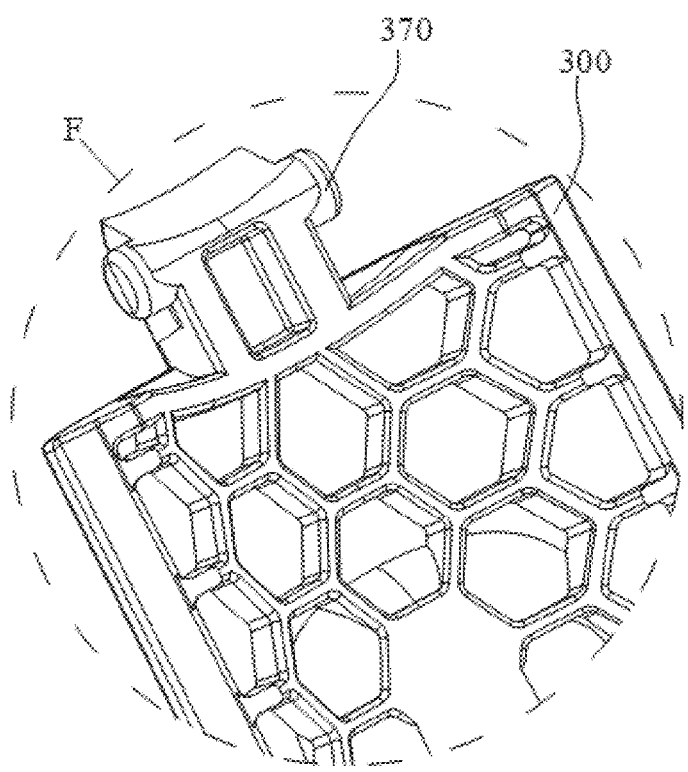
FIG. 21 is an enlarged view of the structure at position F shown in FIG. 20.
Figure 22:
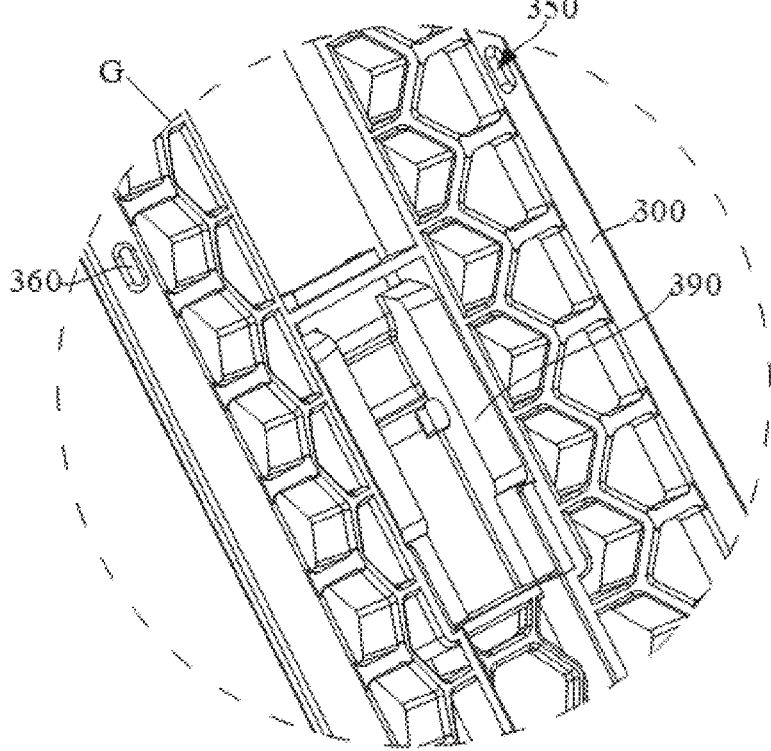
FIG. 22 is an enlarged view of the structure at position G shown in FIG. 20.
Figure 23:
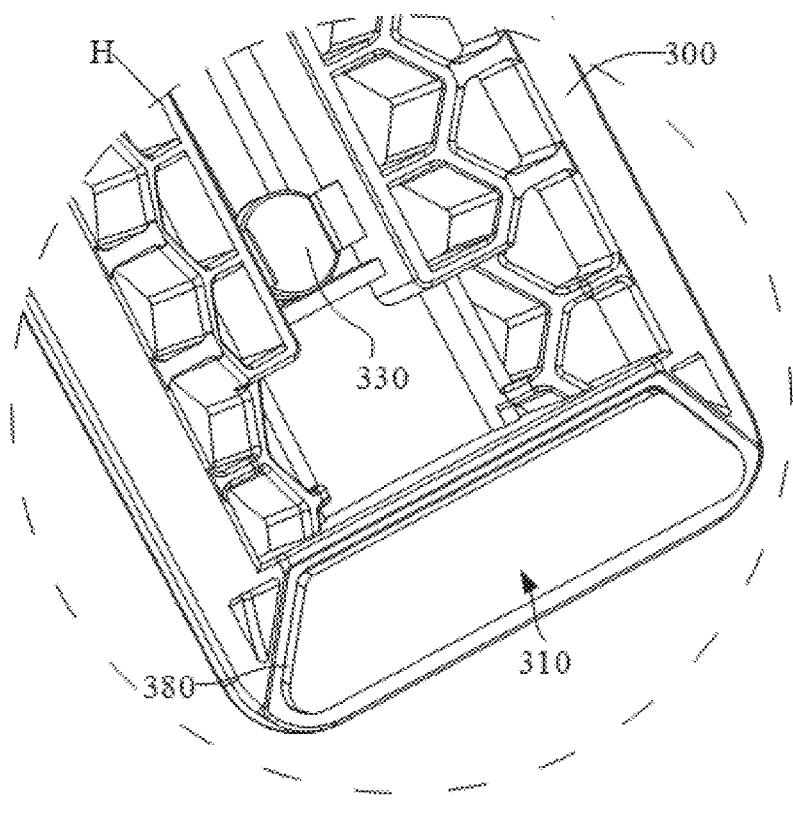
FIG. 23 is an enlarged view of the structure at position H shown in FIG. 20.
Figure 24:
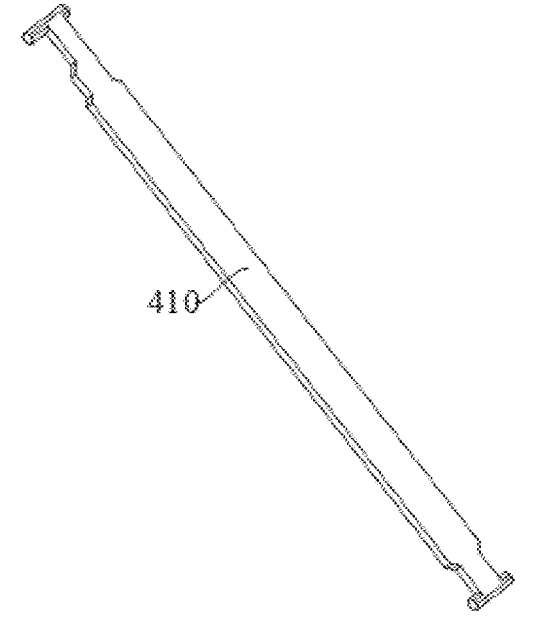
FIG. 24 is a structural schematic view of a connecting rod in the multi-legged stand shown in FIG. 12.

Specifically, referring to FIGS. 5, 6, and 18, the mounting member 130 includes a first mounting portion 132 and a second mounting portion 133 connected to each other. The first mounting portion 132 is embedded in the bottom end of the support rod body 120, and the second mounting portion 133 is exposed at the bottom end of the support rod body 120. The preliminary opening assembly 500 is movably connected to the first mounting portion 132, and the connecting assembly 400 is movably connected to the second mounting portion 133. This allows the first mounting portion 132, which is configured to connect the preliminary opening assembly 500, to be embedded at the bottom end of the support rod body 120, allowing the preliminary opening assembly 500 to be partially hidden relative to the support rod body 120, thereby reducing the overall length of the support rod assembly 100 and the preliminary opening assembly 500 after assembly, making the overall structure more compact, and preventing the preliminary opening assembly 500 from contacting the ground when the at least three support leg assemblies 300 are fully splayed to their maximum angle. To facilitate the rotational connection between the mounting member 130 and the connecting assembly 400, the connecting assembly 400 may include at least three connecting rods 410. The mounting member 130 includes first and second components connected to each other, and the connecting rods 410 are rotatably connected at a connection point between the first and second components, which may facilitate the assembly of the connecting rods 410 with the mounting member 130.

In some embodiments, as shown in FIGS. 12 to 19, the mounting member 130 includes an abutment surface 131 that protrudes from the outer peripheral wall of the support rod body 120, the sliding sleeve assembly 200 includes a handheld portion 210 configured to allow the top end of the support rod assembly 100 to extend therefrom, and the support leg assembly 300 is rotatably connected to the handheld portion 210. The sliding sleeve assembly 200 further includes a positioning cylinder 220 connected to the bottom end of the handheld portion 210, where the cross-sectional area of the positioning cylinder 220 is less than the cross-sectional area of the handheld portion 210, for the at least three support leg assemblies 300 to form an enclosure. The positioning cylinder 220 is slidably sleeved on the outer periphery of the support rod body 120. When the at least three support leg assemblies 300 are splayed to their maximum spread position relative to the support rod body 120, the positioning cylinder 220 abuts against the abutment surface 131, and the support rod assembly 100 and the preliminary opening assembly 500 are both located above the bottom ends of the support leg assemblies 300.

The cross-section of the positioning cylinder 220 may be circular, elliptical, or other shapes. The contact surface 131 may be a circular ring surface, an arc-shaped planar surface, or other shapes, as long as it can abut against the bottom end of the positioning cylinder 220. When the at least three support leg assemblies 300 are in the folded state, the handheld portion 210 of the sliding sleeve assembly 200 is exposed, and the positioning cylinder 220 is enclosed within the at least three support leg assemblies 300 to prevent the positioning cylinder 220 from interfering with the rotation of the at least three support leg assemblies 300. By ensuring that the positioning cylinder 220 abuts against the contact surface 131 of the mounting member 130, excessive splaying angles of the multi-legged stand may be prevented. In practice, the length of the positioning cylinder 220 may be designed to determine the maximum splaying angle of the at least three support leg assemblies 300, and no specific limitation is placed on the length of the positioning cylinder 220. Furthermore, when the at least three support leg assemblies 300 are splayed to their maximum angle relative to the support rod body 120, the support rod assembly 100 and the preliminary opening assembly 500 are both located above the bottom ends of the support leg assemblies 300, thereby preventing the preliminary opening assembly 500 from contacting the ground, which would cause the multi-legged stand to become unstable.

Referring to FIGS. 18 and 19, the support rod assembly 100 further includes a second fastener 135, which passes through the support rod body 120 and is securely connected to the first mounting portion 132. The sliding sleeve assembly 200 defines a sliding cavity 201 that is slidably adapted to the support rod assembly 100. The inner wall of the sliding cavity 201 is arranged with a sliding strip 211, which extends along the sliding direction of the sliding cavity 201. The outer wall of the support rod body 120 is recessed to define a sliding groove, which is adapted to the sliding strip 211. During the sliding of the sliding sleeve assembly 200 along the length direction of the support rod assembly 100, the sliding strip 211 slides within the sliding groove. The second fastener 135 includes a second head portion and a second rod portion connected to the second head portion. The second head portion is received within the sliding groove, and the second rod portion passes through the support rod body 120 and is securely connected to the first mounting portion 132. When the sliding sleeve assembly 200 is in abut against the support rod assembly 100, the second head portion is positioned within the sliding cavity 201, and the second head portion is disposed between the bottom end of the sliding strip 211 and the bottom end of the sliding sleeve assembly 200. It can be understood that the sliding sleeve assembly 200 abuts against the mounting member 130, preventing the multi-legged stand from splaying too widely, thereby avoiding deformation of the support leg assembly 300 and the connecting assembly 400, and thus preventing damage to the multi-legged stand during use.

As can be understood, the cooperation between the sliding strip 211 and the sliding groove enables the sliding sleeve assembly 200 to slide more stably relative to the support rod assembly 100. Placing the second head portion within the sliding groove reduces the likelihood of the second head portion scratching the user. Additionally, the sliding groove serves both to cooperate with the sliding strip 211 and to accommodate the second head portion, thereby making the structure of the support rod assembly 100 more compact. When the sliding sleeve assembly 200 abuts against the support rod assembly 100, the second head portion is positioned between the bottom end of the sliding strip 211 and the bottom end of the sliding sleeve assembly 200, preventing the second head portion from obstructing the sliding of the sliding sleeve assembly 200; additionally, the second head portion is received within the sliding cavity 201, further preventing the second head from scratching the user's hand. For example, there are two sliding strips 211 provided, with each sliding strip 211 located on opposite sides of the sliding cavity 201; there are two sliding grooves defined, with each sliding groove located on opposite sides of the support rod body 120. The number of the second fasteners 135 is two, with the second head portions of the two second fasteners 135 respectively received within the two sliding grooves. It can be understood that the sliding strips 211 and the sliding grooves each extend along the sliding direction of the sliding sleeve assembly 200.

Figure 15:
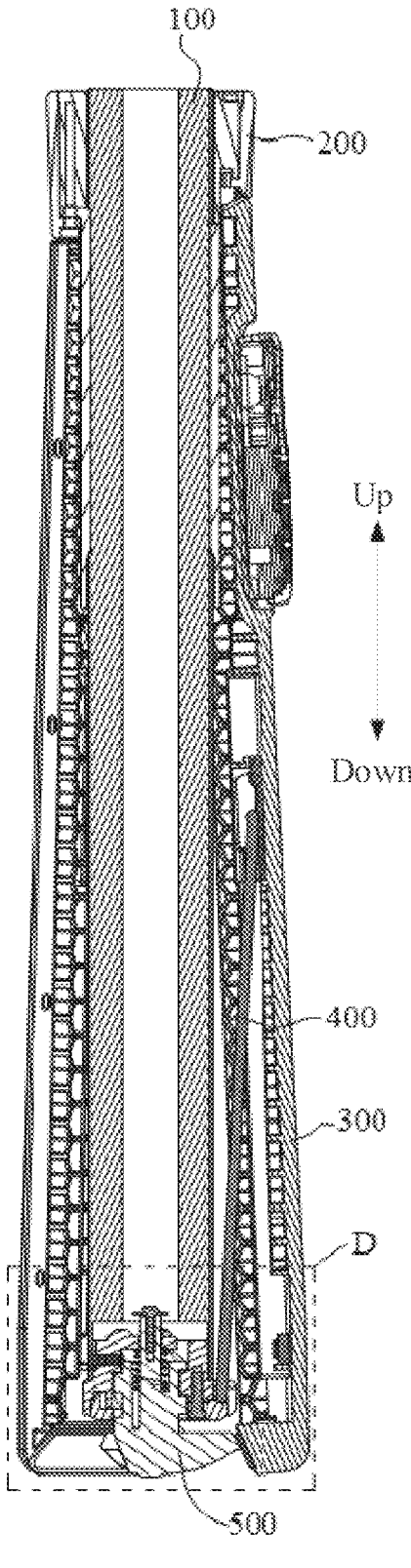
FIG. 15 is a cross-sectional view of the multi-legged stand shown in FIG. 12.
Figure 17:
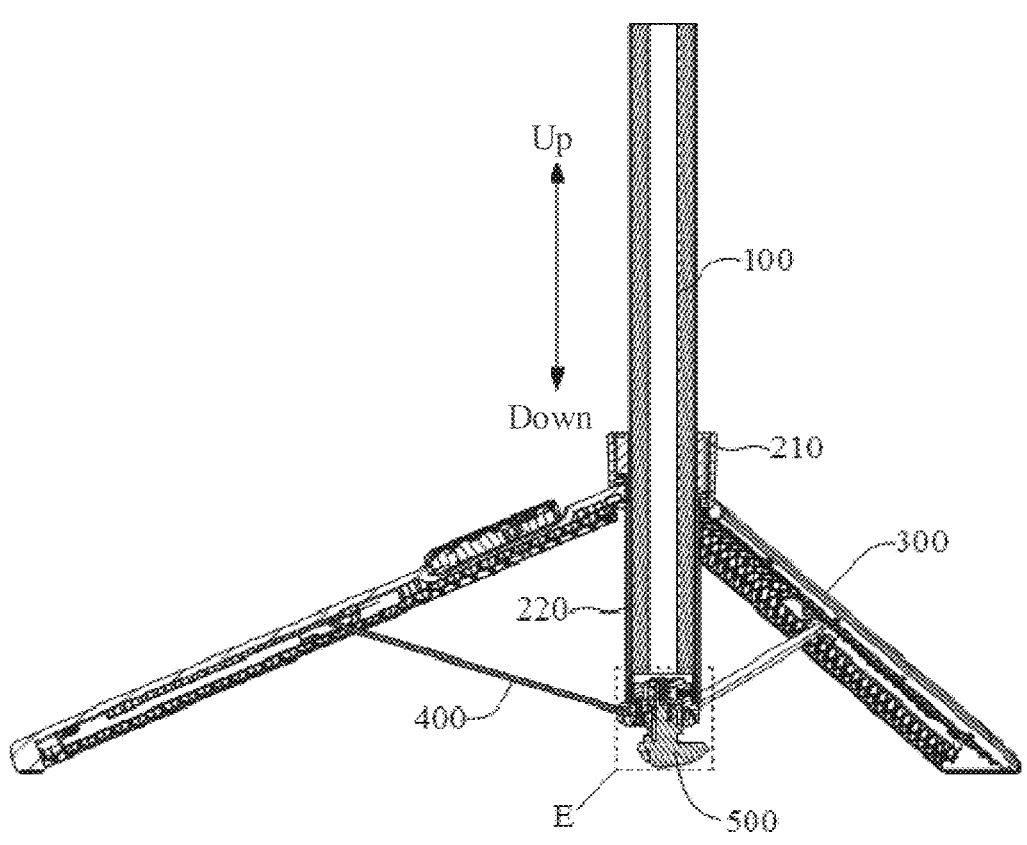
FIG. 17 is a structural schematic view of the multi-legged stand shown in FIG. 12 when the at least three support leg assemblies are in a splayed state.

In some embodiments, referring to FIGS. 5, 15, and 17, a sliding clearance exists between the outer peripheral wall of the support rod assembly 100 and the inner peripheral wall of the sliding sleeve assembly 200, which may reduce or eliminate the friction between the support rod assembly 100 and the sliding sleeve assembly 200, thereby enabling smoother and unobstructed sliding between them. As a result, the multi-legged stand can automatically open and close more quickly and conveniently.

To prevent shaking when the support rod assembly 100 and the sliding sleeve assembly 200 slide relative to each other, the clearance between the outer peripheral wall of the support rod assembly 100 and the inner peripheral wall of the sliding sleeve assembly 200 may be specifically designed. For example, in some embodiments, the sliding clearance between the outer peripheral wall of the support rod assembly 100 and the inner peripheral wall of the sliding sleeve assembly 200 is greater than or equal to 0.1 mm and less than or equal to 1.5 mm. In this way, while ensuring that the support rod assembly 100 and the sliding sleeve assembly 200 slide with a clearance fit, the shaking of the support rod assembly 100 and the sliding sleeve assembly 200 during relative sliding may be prevented, thereby making the automatic splaying and folding of the multi-legged stand more reliable.

As shown in FIGS. 5, 6, 15, 16, 20, and 23, in combination with the aforementioned embodiments, in some embodiments, the force causing the support leg assembly 300 to remain folded relative to the support rod assembly 100 is a magnetic attraction force.

During the process where the at least three support leg assemblies 300 are switched from the splayed state to the folded state relative to the support rod assembly 100, the magnetic attraction force is configured to promote the folding of the at least three support leg assemblies 300 relative to the support rod assembly 100. When the at least three support leg assemblies 300 are in the folded state relative to the support rod assembly 100, the magnetic attraction force is configured to keep the at least three support leg assemblies 300 folded relative to the support rod assembly 100.

In this example, by making the folding force acting on the support leg assemblies 300 magnetic attraction, compared to other methods, due to the effect of the magnetic field, during the process where the at least three support leg assemblies 300 are switched from the splayed state to the folded state relative to the support rod assembly 100, the magnetic attraction force promotes the folding and attachment of the at least three support leg assemblies 300 to the support rod assembly 100, thereby making the automatic folding and attachment of the at least three support leg assemblies 300 to the support rod assembly 100 faster and smoother, and ensuring that the at least three support leg assemblies 300 are attached more closely to the support rod assembly 100. Furthermore, since the folding force acting on the support leg assemblies 300 is magnetic attraction, compared to a folding force based on snap-fitting force, the support leg assemblies 300 may be more smoothly pushed open when the at least three actuating portions 520 rotate, thereby preventing unintended jamming occurrences.

In some embodiments, referring again to FIGS. 5, 6, 15-17, 20, 23, and 24, the connecting assembly 400 includes at least three connection rods 410 corresponding one-to-one with the support leg assemblies 300. An end of each connection rod 410 is rotatably connected to the bottom end of the support rod assembly 100, and the other end is rotatably connected to a corresponding support leg assembly 300. In the folded state, the support leg assembly 300 is magnetically connected to the connecting rod 410.

The connecting rod 410 is rotatably connected to the bottom end of the support rod assembly 100 and to the support leg assembly 300 via a shaft and a shaft hole. For example, a connection notch 140 is defined on the bottom end of the support rod assembly 100, allowing the connecting rod 410 to be hinged via a shaft or a lug at the connection notch 140. A connection portion 390 with a shaft hole is arranged on the inner wall of the support leg assembly 300, allowing the connecting rod 410 to be pivotally connected (hinged) to the shaft hole via a shaft or a lug. Of course, the connecting rod 410 may be pivotally connected to the support rod assembly 100 and the support leg assembly 300 via other methods, which are not specifically limited herein. Specifically, an end of the connecting rod 410 is rotatably connected to the support leg assembly 300, and the other end is rotatably connected to the bottom end of the support rod assembly 100. In this way, while enabling the sliding sleeve assembly 200 to splay or fold the at least three support leg assemblies 300 via the connecting assembly 400, the overall structure remains compact. For example, the top end of the connecting rod 410 is rotatably connected to the support leg assembly 300, and the bottom end is rotatably connected to the bottom end of the support rod assembly 100.

The connecting assembly 400 includes at least three connecting rods 410, and the at least three connecting rods 410 are correspondingly arranged with the support leg assemblies 300 in a one-to-one correspondence. This allows the connecting assembly 400 to synchronously splay or fold the at least three support leg assemblies 300 while keeping the structure of the connecting assembly 400 as simple as possible. Since the connecting rods 410 are closer to the support leg assemblies 300 than the support rod assembly 100, by magnetically connecting the support leg assembly 300 to the connecting rod 410, the magnetic surfaces of the support leg assembly 300 to the connecting rod 410 are closer compared to scheme where the support leg assembly 300 and the support rod assembly 100 are magnetically connected. This improves the magnetic attraction and folding effect of the at least three support leg assemblies 300, thereby effectively preventing them from accidentally spreading apart.

Specifically, the inner wall surface on the bottom end of the support leg assembly 300 is arranged with a magnetic attraction body 330, which is made of permanent magnetic material; the connecting rod 410 is at least partially made of soft magnetic material or permanent magnetic material. In the folded state, the magnetic attraction body 330 magnetically attracts the corresponding connecting rod 410.

The permanent magnetic material may include neodymium iron boron, ferrite magnets, aluminum-nickel-cobalt permanent magnetic alloys, iron-chromium-cobalt permanent magnetic alloys, permanent ferrite, rare earth permanent magnetic materials, and composite permanent magnetic materials, among others. For example, the soft magnetic material may include cast iron, silicon steel, low-carbon steel, alloy steel, soft magnetic ferrite, or cobalt alloys that can be attracted by the magnetic attraction body 330. The size, shape, and quantity of the magnetic attraction body 330 may be selected and designed according to requirements, and no specific limitations are imposed herein. The method of fixing the magnetic attraction body 330 to the inner wall surface of the support leg assembly 300 may vary. For example, the magnetic attraction body 330 may be fixed to the inner wall surface on the bottom end of the support leg assembly 300 through embedding, snapping, or adhesive bonding. This arrangement ensures that the magnetic attraction body 330 is aligned with the connecting rod 410, maximizing the magnetic attraction between the two and thereby enhancing the magnetic absorption effect. For example, the connecting rod 410 includes a soft magnetic body and a coating, with the soft magnetic body made of soft magnetic material and the coating applied to the soft magnetic body.

In some embodiments, referring to FIGS. 1-4 and 26, the inner peripheral wall of the support leg assembly 300 is a concave arc surface that mates with the outer peripheral wall of the support rod assembly 100, and the outer peripheral wall of the support leg assembly 300 is a convex arc surface. In the folded state, the side walls of adjacent support leg assemblies 300 are joined together. The outer peripheral walls of the at least three support leg assemblies 300 collectively form the outer peripheral surface of the multi-legged stand, and a connection point between the outer peripheral walls of each adjacent support leg assemblies 300 is recessed to define an anti-pinch groove 340.

As a result, each of the support leg assemblies 300 is a generally arc-shaped plate, such that the at least three support leg assemblies 300 can more closely enclose the outer periphery of the support rod assembly 100 when in the folded state. The side walls of adjacent support leg assemblies 300 are joined together, allowing the outer peripheral walls of the at least three support leg assemblies 300 to form a cylindrical surface. In the folded state, the outer peripheral walls of the at least three support leg assemblies 300 collectively form the outer peripheral surface of the multi-legged stand, making it more convenient for users to hold the multi-legged stand by hand. For example, users can hold the at least three support leg assemblies 300 by hand to take photographs. The connection point between the outer peripheral walls of each adjacent support leg assemblies 300 is recessed to define the anti-pinch groove 340, preventing the user from pinching their fingers when holding at least three support leg assemblies 300.

In some embodiments, as shown in FIGS. 12 to 14, 20, 22, and 28, each of the support leg assemblies 300 is an arc-shaped plate. When in the folded state, the side walls of adjacent support leg assemblies 300 are joined together. One of the side walls of adjacent support leg assemblies 300 defines multiple positioning slots 350 arranged at intervals along the extension direction of the support leg assembly 300, while the other side wall is arranged with multiple positioning protrusions 360 that are adapted to mate with the positioning slots 350 in a one-to-one correspondence. In this example, the outer peripheral walls of the at least three support leg assemblies 300 can substantially form a cylindrical surface, making it more convenient for users to hold the multi-legged stand. By allowing the mating side walls of adjacent support leg assemblies 300 to interlock via the positioning slots 350 and positioning protrusions 360, when the at least three support leg assemblies 300 are promoted in being folded by magnetic attraction, the alignment between adjacent support leg assemblies 300 becomes more precise and reliable. This allows the at least three support leg assemblies 300 to be folded such that their outer peripheral walls are approximately on the same cylindrical surface, thereby improving the surface flatness of the multi-legged stand after rapid folding.

In some embodiments, when the at least three support leg assemblies 300 are in the folded state, the height of the force-bearing portion 510 protruding from the support leg assemblies 300 is greater than or equal to 1 mm, such that when the force-bearing portion 510 is subjected to an external action, the rotation angle of the at least three actuating portions 520 is greater than or equal to 1 degree.

It can be understood that, in the folded state, the height by which the force-bearing portion 510 protrudes from the support leg assembly 300 is positively correlated with the rotation angle of the actuating portion 520 within a certain range. By limiting the height by which the force-bearing portion 510 protrudes from the protruding support leg assembly 300 in the folded state to be greater than or equal to 1 mm, when the force-bearing portion 510 is subjected to an external action, the rotational angle of the at least three actuating portions 520 is greater than or equal to 1 degree, which may prevent the preliminary opening angle of the multi-legged stand from being too small, i.e., ensuring that the angle at which the at least three actuating portions 520 push open the at least three support leg assemblies 300 is sufficiently large, thereby facilitating the automatic splaying of the at least three support leg assemblies 300 under the action of gravity.

Figure 25:
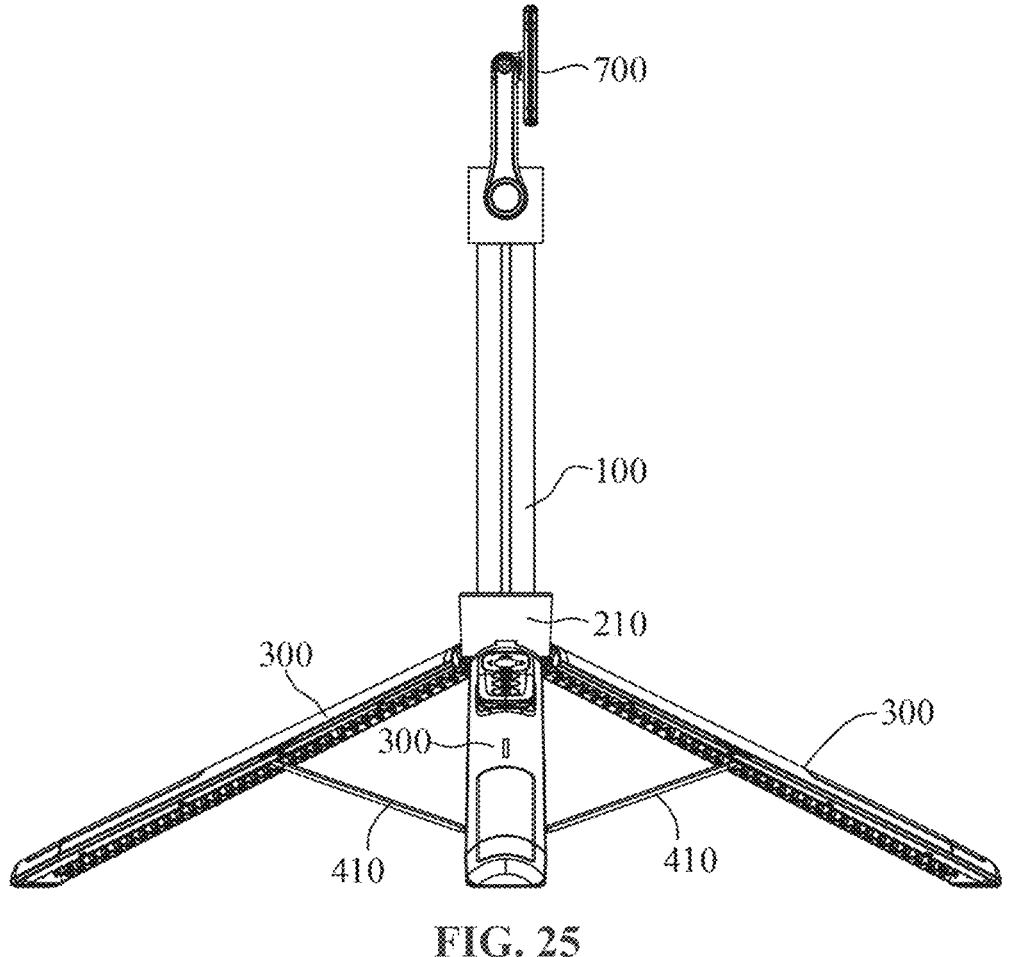
FIG. 25 is a structural schematic view of the multi-legged stand shown in FIG. 1, with a support member arranged thereon, when the at least three support leg assemblies are in a splayed state.
Figure 26:
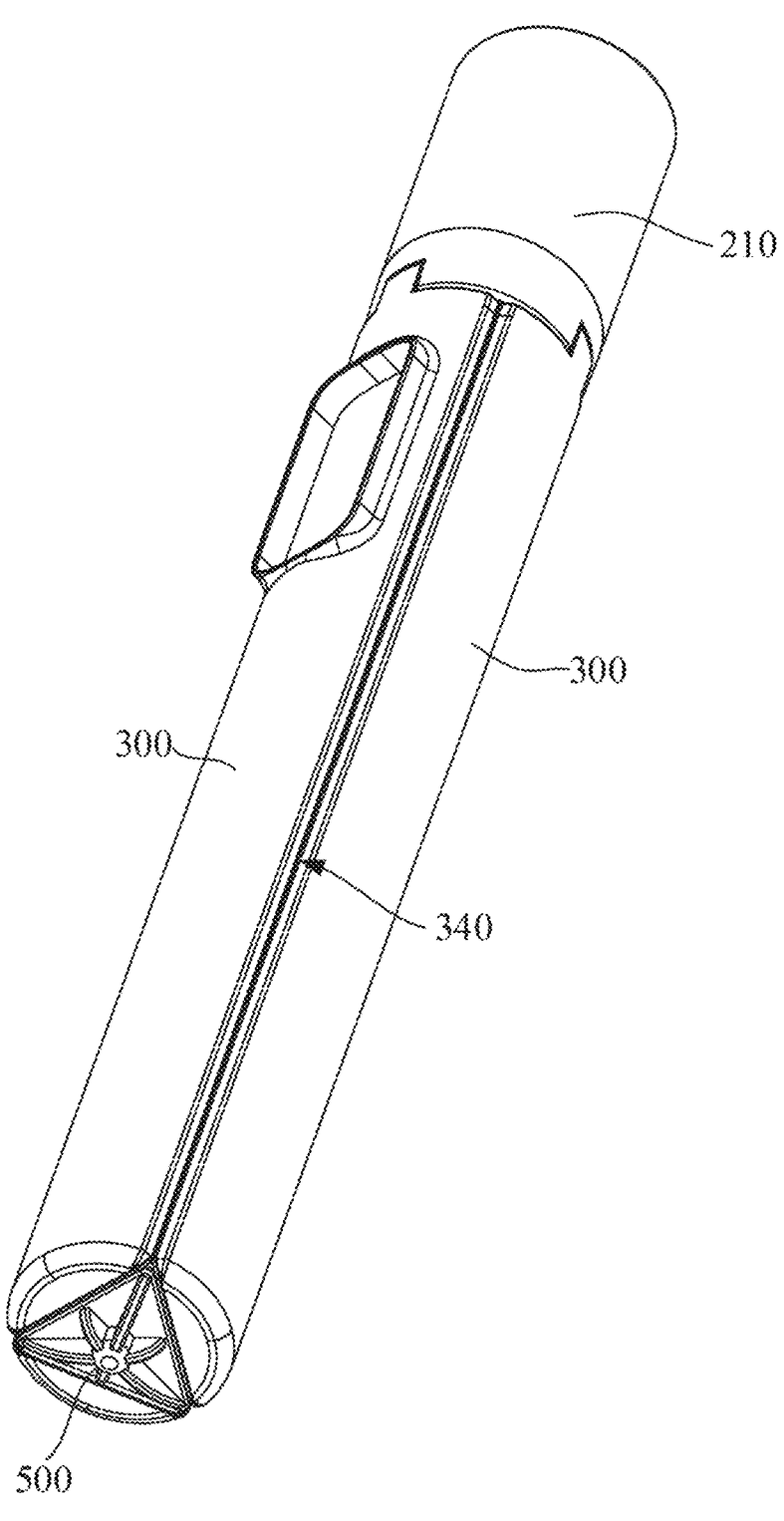
FIG. 26 is a structural schematic view of a multi-legged stand according to other embodiments of the present disclosure; where at least three support leg assemblies of the multi-legged stand are in a folded state.
Figure 27:
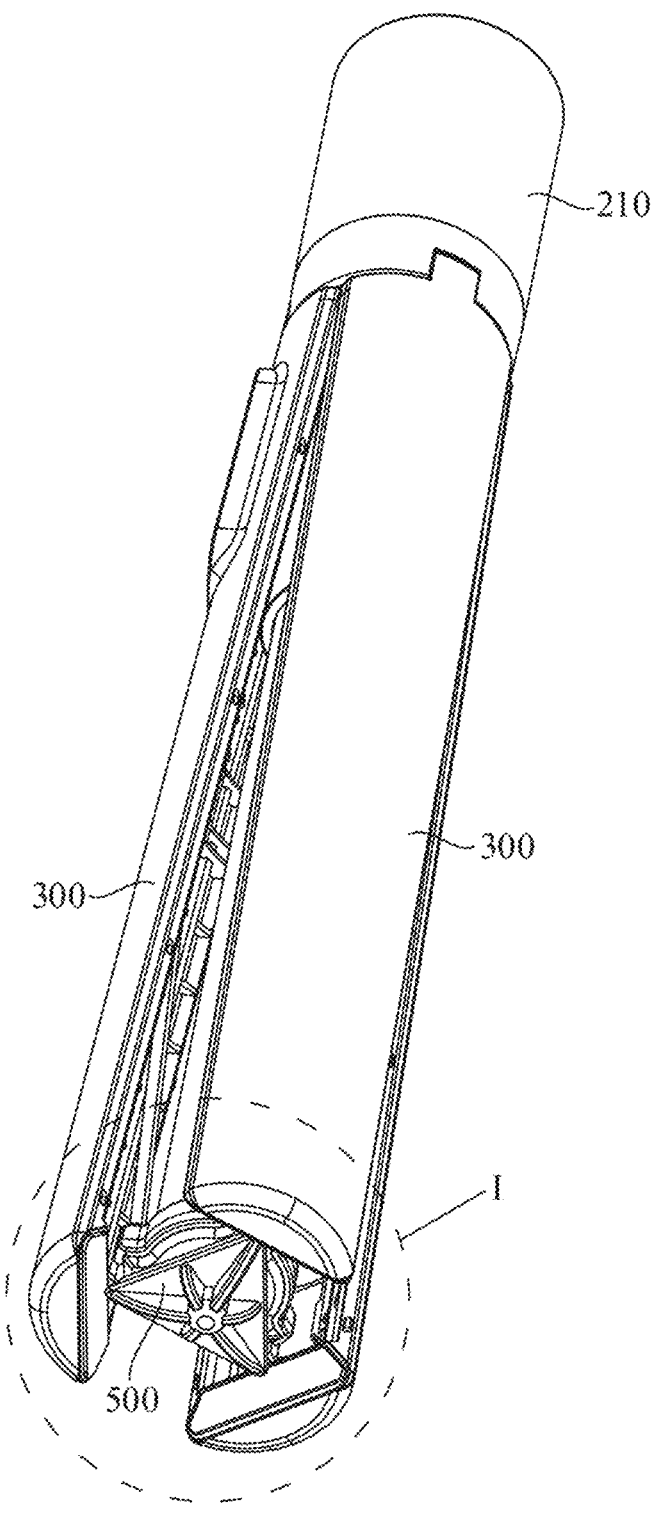
FIG. 27 is a structural schematic view of the multi-legged stand shown in FIG. 26 when the at least three support leg assemblies are in a preliminarily opened state.
Figure 28:
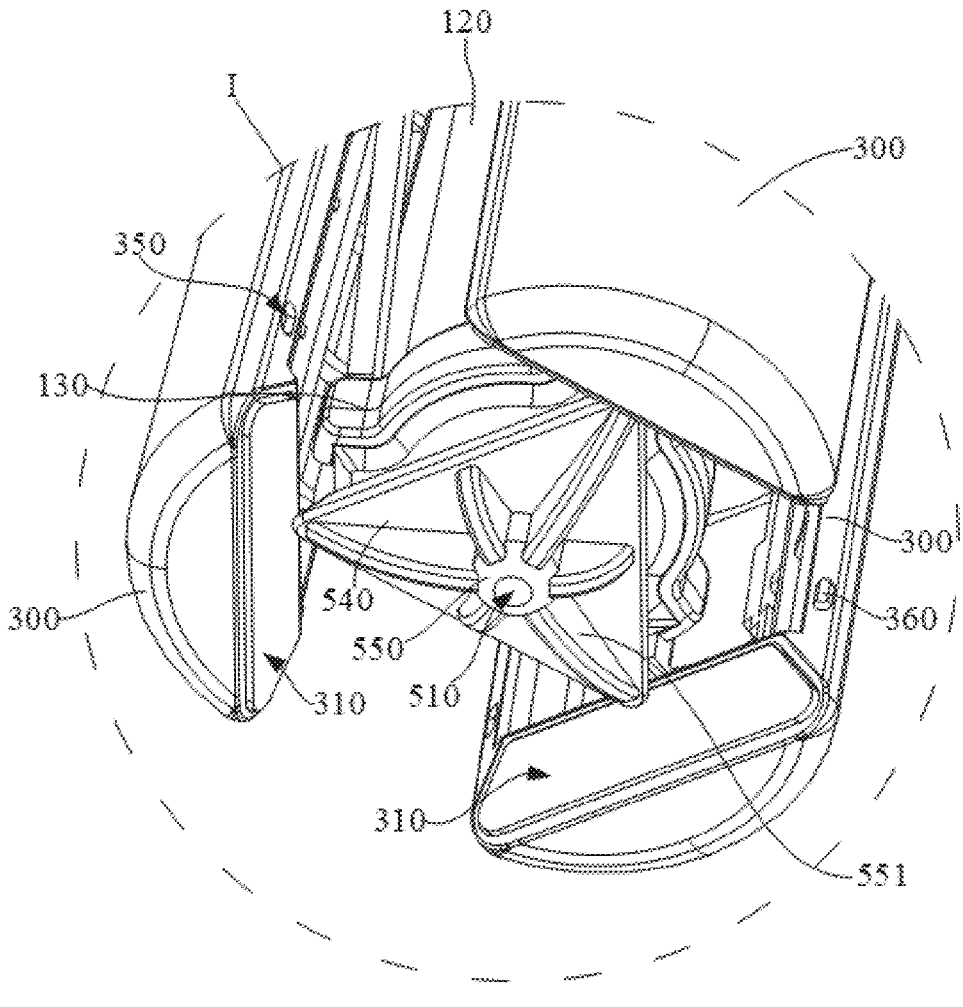
FIG. 28 is an enlarged view of the structure at position I shown in FIG. 27.

In some embodiments, referring to FIGS. 25-27, the multi-legged stand further includes a support member 700 for supporting an electronic terminal, the support member 700 being connected to the top end of the support rod assembly 100. When the at least three support leg assemblies 300 are in the splayed state, the support member 700 can extend from the top end of the handheld portion 210 to secure the electronic terminal. The electronic terminal may be a mobile phone, tablet, secondary camera, etc.

In other examples, the multi-legged stand is configured to support auxiliary photography equipment such as fill lights, remote controls, and secondary cameras.

In some embodiments, the support member 700 is configured to support an electronic terminal such as a mobile phone. To enhance the versatility of the multi-legged stand, the support rod assembly 100 may include multiple length-adjustable segments, allowing users to adjust the height of the support member 700 according to usage requirements. To facilitate adjustment of the angle of the electronic terminal, the support member 700 is rotatably connected to the top end of the support rod assembly 100, enabling adjustment of the usage angle and direction of the electronic terminal. For example, the support member 700 may be rotatably connected to the top end of the support rod assembly 100 around a horizontal axis to facilitate angle adjustment, with the horizontal axis perpendicular to the extension direction of the support rod assembly. Alternatively, the support member 700 may be rotatably connected to the top end of the support rod assembly 100 around a vertical axis to facilitate angle adjustment, with the vertical axis parallel to the extension direction of the support rod assembly. Alternatively, the support member 700 may be connected to the top of the support rod assembly 100 in a manner that allows it to rotate in all directions, enabling 360-degree adjustment of both direction and angle.

When the at least three support leg assemblies 300 are in the splayed state, the support member 700 extends from the top end of the handheld portion 210, allowing the user to secure the electronic terminal to the support member 700 for stable shooting. When the at least three support leg assemblies 300 are in the folded state, the support member 700 may be fully or partially hidden within the handheld assembly, thereby reducing the storage space of the multi-legged stand and achieving a more compact and aesthetically pleasing appearance. For example, the support member 700 includes a support body and a top plate. When the at least three support leg assemblies 300 are in the folded state, the support body is fully contained relative to the support rod assembly 100, and the top plate covers the open top of the support rod assembly 100. As a result, the multi-legged stand adopts a roughly cylindrical shape when folded, featuring a more flat appearance and further reducing the storage space required.

For example, the support member 700 may be a clamp for holding the electronic terminal, the clamp including a clamp body and two clamping portions; where the two clamping portions are configured to respectively clamp the opposite sides of the electronic terminal, the clamp body is elastically extendable to adjust the clamping width of the clamp, and the clamping portions are storable within the clamp body.

For example, the support member 700 is a suction cup for adhering to the electronic terminal, such as a suction cup that can adhere to the back of the electronic terminal.

For example, the support member 700 is a magnetic component for magnetically adhering to the electronic terminal, such as an electromagnet or a permanent magnet.

For example, the support member 700 is a tray for supporting the electronic terminal, with the electronic terminal placed on the tray.

For example, the support member 700 is a snap-fitting portion for snap-fitting the electronic terminal, with the snap-fitting portion configured to snap-fit the electronic terminal.

The present disclosure further provides a usage method of a multi-legged stand, where the multi-legged stand may be any of the aforementioned embodiments of the multi-legged stand, and the steps for using the multi-legged stand are as follows.

Opening the multi-legged stand: when the multi-legged stand is in the folded state, the user holds the handheld portion 210 and strikes or presses the force-bearing portion 510 of the multi-legged stand against the ground, table surface, or other support surface, causing the preliminary opening assembly 500 to push open the at least three support leg assemblies 300, thereby transforming the multi-legged stand from the folded state to the preliminarily opened state; the user releases the handheld portion 210, and the sliding sleeve assembly 200 slides downward under the combined effect of its own weight, the weight and inertial effect of the at least three support leg assemblies 300 and the connecting assembly 400, causing the at least three support leg assemblies 300 to splay to maximum extent.

Folding the multi-legged stand: when the multi-legged stand is in the splayed state, the user grips and lifts the handheld portion 210 upward; the support rod assembly 100 slides downward relative to the sliding sleeve assembly 200, causing the at least three support leg assemblies 300 to quickly fold via the connecting assembly 400, and the at least three support leg assemblies 300 remain folded relative to the support rod assembly 100 due to the folding force.

By using the above multi-legged stand and its usage method, the splaying and folding operations of the multi-legged stand can be performed with one hand, thereby greatly simplifying the splaying and folding steps of the multi-legged stand, reducing the difficulty of its splaying and folding operations, and significantly improving the convenience of its splaying and folding operations.

Finally, it should be noted that the above embodiments are provided solely to illustrate the technical solutions of the present disclosure and are not intended to limit them. Although the present disclosure has been described in detail with reference to the aforementioned embodiments, those skilled in the art will understand that modifications may be made to the technical solutions described in the aforementioned embodiments, or equivalent replacements may be made to some of the technical features; such modifications or replacements do not cause the corresponding technical solutions to deviate from the spirit and scope of the technical solutions of the embodiments of the present disclosure.

What is claimed is:

1. A multi-legged stand, comprising:
a support rod assembly,
a sliding sleeve assembly,
a connecting assembly, and
at least three support leg assemblies;
wherein the support rod assembly extends along a length direction of the support rod assembly, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;
in a case where the at least three support leg assemblies are in a folded state relative to the support rod assembly, the at least three support leg assemblies are subjected to a folding force to keep folded relative to the support rod assembly;
wherein the multi-legged stand further comprises a preliminary opening assembly movably connected to the support rod assembly; the preliminary opening assembly is configured to, in response to being subjected to an external action, abut against the at least three support leg assemblies to overcome the folding force and push open the at least three support leg assemblies, causing the at least three support leg assemblies to transition from the folded state to a preliminarily opened state relative to the support rod assembly.

2. The multi-legged stand according to claim 1, wherein in a case where the at least three support leg assemblies are in the preliminarily opened state relative to the support rod assembly, a self-weight of a movable component promotes sliding of the sliding sleeve assembly, promoting the at least three support leg assemblies to splay relative to the support rod assembly; the movable component comprises the sliding sleeve assembly, the at least three support leg assemblies, and the connecting assembly;

the sliding sleeve assembly comprises a handheld portion configured for a top end of the support rod assembly to extend from the handheld portion, and the at least three support leg assemblies are rotatably connected to the handheld portion;

in a case where the handheld portion is manually lifted, the at least three support leg assemblies perform folding relative to the support rod assembly and are folded relative to the support rod assembly by the folding force.

3. The multi-legged stand according to claim 2, wherein during a process where the handheld portion is manually lifted to fold the at least three support leg assemblies, a self-weight of the at least three support leg assemblies promotes folding of the at least three support leg assemblies, an inertial effect of the at least three support leg assemblies promotes the folding of the at least three support leg assemblies, a self-weight of the support rod assembly promotes the folding of the at least three support leg assemblies, and an inertial effect of the support rod assembly promotes the folding of the at least three support leg assemblies.

4. The multi-legged stand according to claim 2, wherein a sliding clearance exists between an outer peripheral wall of the support rod assembly and an inner peripheral wall of the sliding sleeve assembly.

5. The multi-legged stand according to claim 2, wherein the folding force causing the at least three support leg assemblies to remain in the folded state relative to the support rod assembly is a suction force or a magnetic attraction force.

6. The multi-legged stand according to claim 1, wherein the support rod assembly comprises a support rod body and a mounting member fixedly connected to a bottom end of the support rod body; the sliding sleeve assembly is slidably sleeved on the support rod body; the preliminary opening assembly is movably connected to the mounting member; the connecting assembly is rotatably connected to the mounting member.

7. The multi-legged stand according to claim 1, wherein the multi-legged stand further comprises a support member for supporting an electronic terminal, and the support member is connected to a top end of the support rod assembly; in a case where the at least three support leg assemblies are in a splayed state, the support member is capable of extending from a top end of a handheld portion to secure the electronic terminal.

8. A multi-legged stand, comprising:
a support rod assembly,
a sliding sleeve assembly,
a connecting assembly, and
at least three support leg assemblies;
wherein the support rod assembly extends along a length direction of the support rod assembly, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;
in a case where the at least three support leg assemblies are in a folded state relative to the support rod assembly, the at least three support leg assemblies are subjected to a folding force to keep folded relative to the support rod assembly;
wherein the multi-legged stand further comprises a preliminary opening assembly movably connected to the support rod assembly; the preliminary opening assembly is configured to, in response to being subjected to an external action, overcome the folding force and push open the at least three support leg assemblies, causing the at least three support leg assemblies to transition from the folded state to a preliminarily opened state relative to the support rod assembly;
wherein the preliminary opening assembly comprises a force-bearing portion exposed relative to the at least three support leg assemblies in the folded state;
wherein the preliminary opening assembly further comprises at least three actuating portions disposed on a bottom end of the support rod assembly; the external action comprises a force applied to the force-bearing portion along a first direction; the at least three actuating portions are configured to rotate around a rotational axis in a case where the external action is applied, for preliminarily opening the at least three support leg assemblies; the first direction is along the rotational axis.

9. The multi-legged stand according to claim 8, wherein in the folded state, the at least three support leg assemblies are arranged around an outer periphery of the support rod assembly, and a number of the at least three actuating portions is same as a number of the at least three support leg assemblies; each actuating portion is disposed between corresponding adjacent two support leg assemblies; an inner surface of each support leg assembly has a contact surface located between corresponding adjacent two actuating portions; the contact surface is configured to contact a corresponding actuating portion when the actuating portions rotate, for gradually preliminarily opening the at least three support leg assemblies.

10. The multi-legged stand according to claim 9, wherein the contact surfaces of the at least three support leg assemblies enclose to define a rotational space, and a cross-sectional area of the rotational space decreases gradually from bottom to top.

11. The multi-legged stand according to claim 9, wherein an inner peripheral wall of the support leg assembly is a concave arc surface that mates with an outer peripheral wall of the support rod assembly, and the outer peripheral wall of the support leg assembly is a convex arc surface; outer peripheral walls of the at least three support leg assemblies together form an outer peripheral surface of the multi-legged stand; the contact surface is a plane connecting two adjacent joint surfaces of the at least three support leg assemblies.

12. The multi-legged stand according to claim 8, wherein the preliminary opening assembly is in a screw cooperation with the support rod assembly.

13. The multi-legged stand according to claim 12, wherein the preliminary opening assembly comprises a movable member, an actuating member, and a force-bearing member, with the at least three actuating portions arranged on the actuating member; the movable member is in a screw cooperation with the support rod assembly,
in a case where the preliminary opening assembly is subjected to the external action, the movable member moves helically relative to the support rod assembly, causing the at least three actuating portions to push open and gradually preliminarily open the at least three support leg assemblies;

the movable member is disposed on a side of the actuating member, and the force-bearing member is disposed on an opposite side of the actuating member; a bottom end of the force-bearing member forms the force-bearing portion;

wherein the multi-legged stand further comprises an elastic member configured to provide an elastic force to the movable member; after the external action is removed, the elastic force drives the preliminary opening assembly to return to an initial position.

14. The multi-legged stand according to claim 13, wherein in a case where the at least three support leg assemblies are in the folded state, a height of the force-bearing portion protruding from the at least three support leg assemblies is greater than or equal to 1 mm; in a case where the force-bearing portion is subjected to the external action, a rotation angle of the at least three actuating portions is greater than or equal to 1 degree.

15. The multi-legged stand according to claim 8, wherein the preliminary opening assembly comprises a movable member, an actuating member, and a force-bearing member; the movable member is in a sliding cooperation with the support rod assembly and in a peripheral limited cooperation with the support rod assembly around a rotational axis of the movable member;

the actuating member is arranged with the at least three actuating portions, and the force-bearing member is fixed connected to a bottom of the movable member; a bottom end of the force-bearing member forms the force-bearing portion;

the movable member is in a screw cooperation with the actuating member; in a case where the force-bearing portion is subjected to the external action, the movable member drives the actuating member to rotate around the rotational axis;

wherein the multi-legged stand further comprises an elastic member configured to provide an elastic force to the movable member; after the external action is removed, the elastic force drives the preliminary opening assembly to return to an initial position.

16. The multi-legged stand according to claim 15, wherein the actuating member comprises a rotatable portion, with the at least three actuating portions connected to the rotatable portion; the rotatable portion is rotatably connected to the support rod assembly, and the movable member is in a screw cooperation with the rotatable portion;

the elastic member is a reset spring, and the reset spring is sleeved around an outer periphery of the movable member and sandwiched between the force-bearing member and the actuating member.

17. The multi-legged stand according to claim 15, wherein the movable member comprises a guide portion that extends from a top end of the actuating member and is slidably connected to the bottom end of the support rod assembly; one of the guide portion and the support rod assembly defines a guide slot, and the other of the guide portion and the support rod assembly is arranged with a protrusion that is slidably connected to the guide slot.

18. The multi-legged stand according to claim 8, wherein the preliminary opening assembly comprises an actuating member, and the actuating member has a polygonal structure; the at least three actuating portions are at least three angular portions of the polygonal structure.

19. A multi-legged stand, comprising:
a support rod assembly,
a sliding sleeve assembly,
a connecting assembly, and
at least three support leg assemblies;
wherein the support rod assembly extends along a length direction of the support rod assembly, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;
in a case where the at least three support leg assemblies are in a folded state relative to the support rod assembly, the at least three support leg assemblies are subjected to a folding force to keep folded relative to the support rod assembly;
wherein the multi-legged stand further comprises a preliminary opening assembly movably connected to the support rod assembly; the preliminary opening assembly is configured to, in response to being subjected to an external action, overcome the folding force and push open the at least three support leg assemblies, causing the at least three support leg assemblies to transition from the folded state to a preliminarily opened state relative to the support rod assembly;
wherein the support rod assembly comprises a support rod body and a mounting member fixedly connected to a bottom end of the support rod body; the sliding sleeve assembly is slidably sleeved on the support rod body; the preliminary opening assembly is movably connected to the mounting member; the connecting assembly is rotatably connected to the mounting member;
wherein the mounting member comprises an abutment surface that protrudes from an outer peripheral wall of the support rod body;
the sliding sleeve assembly comprises a handheld portion configured to allow a top end of the support rod assembly to extend from the handheld portion, and the support leg assembly is rotatably connected to the handheld portion;
the sliding sleeve assembly further comprises a positioning cylinder connected to a bottom end of the handheld portion, wherein a cross-sectional area of the positioning cylinder is less than a cross-sectional area of the handheld portion, for the at least three support leg assemblies to form an enclosure; the positioning cylinder is slidably sleeved on an outer periphery of the support rod body;
in a case where the at least three support leg assemblies are splayed to a maximum extent relative to the support rod body, the positioning cylinder abuts against the abutment surface; in a case where the at least three support leg assemblies are splayed to a maximum extent relative to the support rod body and stand on a support surface, the support rod assembly and the preliminary opening assembly are both located above the support surface.

20. A multi-legged stand, comprising:
a support rod assembly,
a sliding sleeve assembly,
a connecting assembly, and at least three support leg assemblies;

wherein the support rod assembly extends along a length direction of the support rod assembly, and the sliding sleeve assembly is slidably sleeved on a periphery of the support rod assembly along the length direction of the support rod assembly; the at least three support leg assemblies are rotatably connected to the sliding sleeve assembly, and the connecting assembly is rotatably connected to the at least three support leg assemblies and the support rod assembly; the connecting assembly is configured to splay or fold the at least three support leg assemblies in conjunction with the sliding sleeve assembly sliding relative to the support rod assembly;

in a case where the at least three support leg assemblies are in a folded state relative to the support rod assembly, the at least three support leg assemblies are subjected to a folding force to keep folded relative to the support rod assembly;

wherein the multi-legged stand further comprises a preliminary opening assembly movably connected to the support rod assembly; the preliminary opening assembly is configured to, in response to being subjected to an external action, overcome the folding force and push open the at least three support leg assemblies, causing the at least three support leg assemblies to transition from the folded state to a preliminarily opened state relative to the support rod assembly;

wherein in a case where the at least three support leg assemblies are in the preliminarily opened state relative to the support rod assembly, a self-weight of a movable component promotes sliding of the sliding sleeve assembly, promoting the at least three support leg assemblies to splay relative to the support rod assembly; the movable component comprises the sliding sleeve assembly, the at least three support leg assemblies, and the connecting assembly;

the sliding sleeve assembly comprises a handheld portion configured for a top end of the support rod assembly to extend from the handheld portion, and the at least three support leg assemblies are rotatably connected to the handheld portion;

in a case where the handheld portion is manually lifted, the at least three support leg assemblies perform folding relative to the support rod assembly and are folded relative to the support rod assembly by the folding force;

wherein during a process where the handheld portion is manually lifted to fold the at least three support leg assemblies, a self-weight of the at least three support leg assemblies promotes folding of the at least three support leg assemblies, an inertial effect of the at least three support leg assemblies promotes the folding of the at least three support leg assemblies, a self-weight of the support rod assembly promotes the folding of the at least three support leg assemblies, and an inertial effect of the support rod assembly promotes the folding of the at least three support leg assemblies;

wherein the folding force causing the at least three support leg assemblies to remain in the folded state relative to the support rod assembly is a magnetic attraction force;

during a process where the at least three support leg assemblies are switched from a splayed state to the folded state relative to the support rod assembly, the magnetic attraction force is configured to promote the folding of the at least three support leg assemblies relative to the support rod assembly;

in a case where the at least three support leg assemblies are in the folded state relative to the support rod assembly, the magnetic attraction force is configured to maintain the at least three support leg assemblies folded relative to the support rod assembly.

21. The multi-legged stand according to claim 20, wherein the connecting assembly comprises at least three connecting rods, and the at least three connecting rods are correspondingly matched with the support leg assemblies in a one-to-one correspondence, with an end of each connecting rod rotatably connected to the support rod assembly and another end of the connecting rod rotatably connected to a bottom end of corresponding support leg assembly; in the folded state, the at least three support leg assemblies and the at least three connecting rods are magnetically connected.

22. The multi-legged stand according to claim 21, wherein an inner wall surface on the bottom end of each support leg assembly is arranged with a magnetic attraction body, and the magnetic attraction body is made of a permanent magnetic material; each connecting rod is at least partially made of a soft magnetic material or a permanent magnetic material; in the folded state, the magnetic attraction body of each support leg assembly magnetically attracts a corresponding connecting rod.

23. The multi-legged stand according to claim 20, wherein an inner peripheral wall of the support leg assembly is a concave arc surface that mates with an outer peripheral wall of the support rod assembly, and the outer peripheral wall of the support leg assembly is a convex arc surface; in the folded state, side walls of each adjacent support leg assemblies are joined together; outer peripheral walls of the at least three support leg assemblies collectively form an outer peripheral surface of the multi-legged stand, and a connection point between the outer peripheral walls of each adjacent support leg assemblies is recessed to define an anti-pinch groove.

24. The multi-legged stand according to claim 20, wherein each of the at least three support leg assemblies is an arc-shaped plate; in the folded state, two side walls of each adjacent two support leg assemblies are joined together; one of the two side walls of the adjacent two support leg assemblies defines a plurality of positioning slots arranged at intervals along an extension direction of a corresponding support leg assembly on which the one of the side walls is located, and the other of the two side walls is arranged with a plurality of positioning protrusions that are adapted to mate with the plurality of positioning slots in a one-to-one correspondence.

* * * * *